United States Patent
Karczewicz et al.

(10) Patent No.: US 9,661,338 B2
(45) Date of Patent: May 23, 2017

(54) CODING SYNTAX ELEMENTS FOR ADAPTIVE SCANS OF TRANSFORM COEFFICIENTS FOR VIDEO CODING

(75) Inventors: Marta Karczewicz, San Diego, CA (US); Muhammed Zeyd Coban, San Diego, CA (US); Peisong Chen, San Diego, CA (US); Hsiao-Chiang Chuang, West Lafayette, IN (US); Rajan L. Joshi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1167 days.

(21) Appl. No.: 13/178,438

(22) Filed: Jul. 7, 2011

(65) Prior Publication Data

US 2012/0008675 A1 Jan. 12, 2012

Related U.S. Application Data

(60) Provisional application No. 61/363,127, filed on Jul. 9, 2010, provisional application No. 61/374,573, filed
(Continued)

(51) Int. Cl.
*H04N 19/194* (2014.01)
*H04N 19/159* (2014.01)
(Continued)

(52) U.S. Cl.
CPC .......... *H04N 19/194* (2014.11); *H04N 19/11* (2014.11); *H04N 19/122* (2014.11);
(Continued)

(58) Field of Classification Search
CPC ...... H04N 19/11; H04N 19/122; H04N 19/13; H04N 19/132; H04N 19/14; H04N 19/157;
(Continued)

(56) References Cited

U.S. PATENT DOCUMENTS 5,768,434 A 6/1998 Ran
6,917,711 B1 7/2005 Wang et al.
(Continued)

FOREIGN PATENT DOCUMENTS

EP 1370087 A1 12/2003
EP 1679903 A2 7/2006
(Continued)

OTHER PUBLICATIONS

Jizheng Xu; Bing Zeng; Feng Wu, "An overview of directional transforms in image coding," Circuits and Systems (ISCAS), Proceedings of 2010 IEEE International Symposium on , vol. , No. , pp. 3036,3039, May 30, 2010-Jun. 2, 2010.*
(Continued)

*Primary Examiner* — Behrooz Senfi
*Assistant Examiner* — Maria Vazquez Colon

(57) ABSTRACT

In one example, an apparatus for encoding video data includes a video encoder configured to scan a two-dimensional block of transform coefficients to produce a one-dimensional vector of the transform coefficients, determine values indicative of whether the transform coefficients in the one-dimensional vector are significant; and entropy encode at least one of the values using a context model selected based on at least a percentage of significant coefficients in a predetermined number of the values encoded before the at least one of the values.

27 Claims, 14 Drawing Sheets

Related U.S. Application Data on Aug. 17, 2010, provisional application No. 61/377,420, filed on Aug. 26, 2010.

(51) Int. Cl.

| | |
|---|---|
| *H04N 19/176* | (2014.01) |
| *H04N 19/46* | (2014.01) |
| *H04N 19/196* | (2014.01) |
| *H04N 19/13* | (2014.01) |
| *H04N 19/122* | (2014.01) |
| *H04N 19/129* | (2014.01) |
| *H04N 19/61* | (2014.01) |
| *H04N 19/96* | (2014.01) |
| *H04N 19/593* | (2014.01) |
| *H04N 19/11* | (2014.01) |
| *H04N 19/132* | (2014.01) |
| *H04N 19/14* | (2014.01) |
| *H04N 19/157* | (2014.01) |
| *H04N 19/60* | (2014.01) |
| *H04N 19/85* | (2014.01) |

(52) U.S. Cl.
CPC .......... *H04N 19/129* (2014.11); *H04N 19/13* (2014.11); *H04N 19/132* (2014.11); *H04N 19/14* (2014.11); *H04N 19/157* (2014.11); *H04N 19/159* (2014.11); *H04N 19/176* (2014.11); *H04N 19/196* (2014.11); *H04N 19/46* (2014.11); *H04N 19/593* (2014.11); *H04N 19/61* (2014.11); *H04N 19/96* (2014.11); *H04N 19/60* (2014.11); *H04N 19/85* (2014.11)

(58) Field of Classification Search
CPC .. H04N 19/159; H04N 19/176; H04N 19/194; H04N 19/196; H04N 19/46; H04N 19/593; H04N 19/61; H04N 19/96; H04N 19/60; H04N 19/85; H04N 19/129
See application file for complete search history.

(56) References Cited

U.S. PATENT DOCUMENTS

| | | |
|---|---|---|
| 7,190,840 B2 | 3/2007 | Said |
| 7,215,707 B2 | 5/2007 | Lee et al. |
| 7,233,623 B1 | 6/2007 | Pau et al. |
| 7,266,149 B2 | 9/2007 | Holcomb et al. |
| 7,289,674 B2 | 10/2007 | Karczewicz |
| 7,379,608 B2 | 5/2008 | Marpe et al. |
| 7,702,013 B2 | 4/2010 | Schwarz et al. |
| 7,751,478 B2 | 7/2010 | Kim et al. |
| 7,782,954 B2 | 8/2010 | Liang et al. |
| 8,406,299 B2 | 3/2013 | Karczewicz |
| 2003/0081850 A1* | 5/2003 | Karczewicz ......... H04N 19/176 382/247 |
| 2003/0138150 A1 | 7/2003 | Srinivasan |
| 2003/0231795 A1 | 12/2003 | Karczewicz |
| 2005/0036549 A1 | 2/2005 | He et al. |
| 2005/0123207 A1 | 6/2005 | Marpe et al. |
| 2005/0271288 A1 | 12/2005 | Suzuki et al. |
| 2006/0104527 A1 | 5/2006 | Koto et al. |
| 2006/0120456 A1 | 6/2006 | Tasaka et al. |
| 2007/0025631 A1 | 2/2007 | Kim et al. |
| 2007/0036215 A1 | 2/2007 | Pan et al. |
| 2007/0206872 A1 | 9/2007 | Song |
| 2008/0159389 A1 | 7/2008 | Lee et al. |
| 2008/0232463 A1 | 9/2008 | Lu et al. |
| 2008/0260027 A1 | 10/2008 | Karczewicz |
| 2008/0260030 A1 | 10/2008 | Karczewicz |
| 2008/0285644 A1* | 11/2008 | Seo ...................... H04N 19/159 375/240.2 |
| 2008/0310504 A1* | 12/2008 | Ye ..................... H04N 19/00812 375/240.02 |
| 2008/0310512 A1 | 12/2008 | Ye et al. |
| 2008/0310745 A1 | 12/2008 | Ye et al. |
| 2009/0052534 A1 | 2/2009 | Wang et al. |
| 2009/0060362 A1 | 3/2009 | Harmanci et al. |
| 2009/0123066 A1 | 5/2009 | Moriya et al. |
| 2010/0020867 A1 | 1/2010 | Wiegand et al. |
| 2010/0054334 A1 | 3/2010 | Yoo et al. |
| 2010/0054615 A1* | 3/2010 | Choi et al. .................... 382/233 |
| 2010/0128995 A1 | 5/2010 | Drugeon et al. |
| 2010/0172409 A1* | 7/2010 | Reznik et al. ............. 375/240.2 |
| 2010/0208802 A1 | 8/2010 | Tsukuba et al. |
| 2010/0284459 A1 | 11/2010 | Jeong et al. |
| 2011/0317757 A1 | 12/2011 | Coban et al. |
| 2012/0170649 A1 | 7/2012 | Chen et al. |
| 2013/0051459 A1* | 2/2013 | Kirchhoffer ........... H04N 19/50 375/240.07 |

FOREIGN PATENT DOCUMENTS

| | | |
|---|---|---|
| EP | 2168381 A2 | 3/2010 |
| JP | 2005176073 A | 6/2005 |
| JP | 2007189276 A | 7/2007 |
| JP | 2007267123 A | 10/2007 |
| JP | 2008154155 A | 7/2008 |
| JP | 2008193627 A | 8/2008 |
| JP | 2009513056 A | 3/2009 |
| JP | 2009118233 A | 5/2009 |
| JP | 2011223068 A | 11/2011 |
| KR | 1019980034151 | 8/1998 |
| WO | 2008044658 A1 | 4/2008 |
| WO | 2008131042 A1 | 10/2008 |
| WO | 2008157431 A2 | 12/2008 |
| WO | WO2008157360 A2 | 12/2008 |
| WO | WO2009080133 A1 | 7/2009 |
| WO | WO2011031332 A1 | 3/2011 |
| WO | 2012006568 A1 | 1/2012 |
| WO | 2012006574 A2 | 1/2012 |

OTHER PUBLICATIONS

Yung-Lyul Lee, Ki-Hun Han, Dong-Gyu Sim, and Jeongil Seo, "Adaptive Scanning for H.264/AVC Intra Coding," ETRI Journal, vol. 28, No. 5, Oct. 2006.*

McCann, Ken, et al. "Samsung's response to the call for proposals on video compression technology." Joint Collaborative Team on Video Coding (JCT-VC), JCTVC-A124 (2010).*

Marpe et al. ("Context-based adaptive binary arithmetic coding in the H. 264/AVC video compression standard". Circuits and Systems for Video Technology, IEEE Transactions on, 13(7), 620-636. 2003).*

McCann et al. ("Samsung's response to the call for proposals on video compression technology." Joint Collaborative Team on Video Coding (JCT-VC), JCTVC-A124 (2010)).*

Marpe et al. ("Context-based adaptive binary arithmetic coding in the H.264/AVC video compressin standard".Circuits and Systems for Video Technology, IEEE Transactions on,13(7),620-636,2003).*

McCann et al. ("Samsung's response to the call for proposals on video compression technology." Joint Collaborative Team on Video Coding (JCT-VC), JCTVC-A124 (2010).*

Dong et al.,"Introduction to Test Model under Consideration (TmuC)" (Jun. 27, 2010).

Li et al., Prediction Based Adaptive Transform Coefficients Scanning for Inter-Frame Video Coding pp. 4205-4208 (2010).

Marpe et al., "Marpe et al., "Context—Based Adaptive Binary Arithmetic Coding in the H.264/AVC Video Compression Standard" pp. 620-636 (2003)".

McCann, et al., "Samsung's Response to the Call for Proposals on Video Compression Technology," Joint Collaborative Team on Video Coding (JCT-VC) of ITU-T SG-16 WP3 and ISO/IEC JTC1/SC29/WG11, 1st meeting, Document: JCTVC-A124, Dresden, DE, Apr. 15-23, 2010, 42 pp.

Pan et al., Fast Mode Decision Algorithm for Intraprediction in H.264/AVC Video Coding pp. 813-822 (2005).

(56) References Cited

OTHER PUBLICATIONS

Witten et al., "Arithmetic Coding for Data Compression", Communications of the ACM, vol. 30, No. 6, pp. 520-540 (1987).

Wang, et al., "A fast transform domain based algorithm for H.264/AVC intra prediction", 2007 IEEE International Conference on Multimedia and Expo, Beijing, CN, Jul. 2-5, 2007, pp. 1563-1566.

Yeo et al., "TE7: Results for Mode-Dependent Fast Separable KLT for Block-based Intra Coding," Joint Collaborative Team on Video Coding (JCT-VC), of ITU-T SG16 WP3 and ISO/IEC JTC1/SC29/WG11, 3rd Meeting: Guangzhou, CN, Oct. 7-10, 2010, Document: JCTVC-0037, 4 pp.

Sezer et al., "Robust Learning of 2-D Separable Transforms for Next-Generation Video Coding," Mitsubishi Electric Research Laboratories, Inc., Cambridge, MA, Mar. 2011, 12 pp.

U.S. Appl. No. 13/178,434 entitled "Signaling Selected Directional Transform for Video Coding," to Karczewicz et al., filed Jul. 7, 2011.

U.S. Appl. No. 13/178,427 entitled "Video Coding Using Directional Transforms," to Karczewicz et al., filed Jul. 7, 2011.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Jul. 14-22, 2011, 226 pp.

Han et al., "Improved Video Compression Efficiency Through Flexible Unit Representation and Corresponding Extension of Coding Tools," IEEE Transactions on Circuits and Systems for Video Technology, vol. 20, No. 12, Dec. 2010, pp. 1709-1720.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Karczewicz et al., "Video coding technology proposal by Qualcomm," Document JCTVC-A121, 1st Meeting: Dresden, DE, Apr. 15-23, 2010, 25 pp.

Mrak et al., "A context modeling algorithm and its application in video compression," Proceedings of the International Conference on Image Processing (ICIP), Barcelona, Spain, Sep. 14-17, 2003, vol. 3, pp. 845-848.

Said, "Introduction to Arithmetic Coding—Theory and Practice," Technical Report, Apr. 21, 2004, pp. 1-64, Retrieved from the Internet: URL: http://www.hpl.hp.com/techreports/2004/HPL-2004-76.pdf.

International Preliminary Report on Patentability—PCT/US2011/043437—The International Bureau of WIPO Geneva, Switzerland, Dec. 3, 2012, 21 pp.

Saxena et al., "Jointly optimal intra prediction and adaptive primary transform," Document JCTVC-C108, WG11 No. m18131, 3rd Meeting: Guangzhou, CN, Oct. 7-15, 2010, 21 pp.

Seregin et al., "Low-complexity adaptive coefficients scanning," Document JCTVC-C205, WG11 No. m18243, 3rd Meeting: Guangzhou, CN, Oct. 7-15, 2010, 4 pp.

Sohn et al., "One Dimensional Transform for H.264 Based Intra Coding," Picture Coding Symposium, Nov. 7-9, 2011, Lisbon, 4 pp.

Ye et al., "Improved Intra Coding," Document VCEG-AG11, Filename VCEG-AG11.doc, 33rd Meeting: Shenzhen, China, Oct. 20, 2007, 6 pp.

Zhang et al., "Enhanced intra prediction and transform for video coding," Proceedings of the 2010 IEEE 17th International Conference on Image Processing, Sep. 26-29, 2010, Hong Kong, pp. 3381-3384.

Second Written Opinion of international application No. PCT/US2011/043437, dated Aug. 24, 2012, 15 pp.

Invitation to Pay Additional Fees from international application No. PCT/US2011/043437, dated Nov. 20, 2011, 7 pp.

International Search Report and Written Opinion—PCT/US2011/043437—ISA/EPO—Jan. 27, 2012.

Amonou, I. et al., "Video coding technology proposal by France Telecom, NTT, NTT DoCoMo, Panasonic and Technicolor," Joint Collaborative Team on Video Coding, Document: JCTVC-A114, Apr. 15-23, 2010, 42 pp.

Zhao X., et al., "Rate-distortion optimized transform for intra-frame coding", IEEE Acoustics Speech and Signal Processing, Mar. 14, 2010, 4 pp.

Ye, et al., "Improved H.264 Intra Coding Based on Bi-Directional Intra Prediction, Directional Transform, and Adaptive Coefficient Scanning", Image Processing, 2008, ICIP 2008, 15th IEEE International Conference on, Oct. 12-15, 2008, pp. 2116-2119.

Suzuki, "Recent Trend of MPEG-4 Visual," Technical Report of the Information Processing Society of Japan (IPSJ), vol. 2004, No. 25 (2004-AVM-44), IPSJ, Mar. 5, 2004, pp. 85-90, ISSN: 0919-6072.

Joshi, "CE7: Mode dependent intra residual coding," 5th Meeting, Geneva, CH, Mar. 16-23, 2011, Document: JCTVC-E098, 9 pp.

Saito, et al., "HD-SDI H.264 Very low delay encoder/decoder device 'EHH-1000E/D' and its application," Image Information Industrial, Feb. 2009, Issue vol. 41, No. 2, Sangyo Kaihatsukiko Inc., Feb. 1, 2009, pp. 15-20 [Note: Decision of Rejection from Japanese Application No. 2013-519730 acts as concise translation of relevant Japanese article].

Decision of Rejection from Japanese Application No. 2013-519730, dated May 2, 2014, 7 pp.

Korean Patent Abstracts, Jeong, Je-Chang and Kim, Dong-Hyung, "Apparatus and method for fast mode selection", XP002660082 abstract & KR100865690 B1 (IUCF HYU [KR]) Oct. 28, 2008 (Oct. 28, 2008).

Davies et al., "Suggestion for a Test Model," Document JCTVC-A033, 1st meeting: Dresden, DE, Apr. 15-23, 2010, 30 pp.

Partial International Search Report—PCT/US2011/043437—ISA/EPO—Nov. 30, 2011.

Xiaopeng, et al., "A novel coefficient scanning scheme for directional spatial prediction-based image compression", Multimedia and EXPO, 2003. Proceedings. 2003 International Conference on Jul. 6-9, 2003, Piscataway, NJ, vol. 2, pp. 557-560, XP010650616.

ITU-T H.265, Series H: Audiovisual and Multimedia Systems, Infrastructure of audiovisual services—Coding of moving video, High efficiency video coding, The International Telecommunication Union, Apr. 2013, 317 pages.

ITU-T H.265, Series H: Audiovisual and Multimedia Systems, Infrastructure of audiovisual services—Coding of moving video, High efficiency video coding, The International Telecommunication Union, Oct. 2014, 540 pp.

ITU-T H.265, Series H: Audiovisual and Multimedia Systems, Infrastructure of audiovisual services—Coding of moving video, High efficiency video coding, The International Telecommunication Union, Apr. 2015, 643 pp.

Zheng, et al., "CE11: Mode Dependent Coefficient Scanning", JCT-VC Meeting MPEG Meeting; Jan. 20-28, 2011; Daegu; (Joint Collaborative Team on Video Coding of ISO/IEC JTC1/SC29/WG11and ITU-T SG.16); No. JCTVC-D393, XP030008432, ISSN: 0000-0013, 5 pp.

Business Communication: "Business Communication", Kabushiki Kaisha Business Communication Sha, vol. 44, No. 6, Jun. 1, 2007, 6 pp.

ITU-T H.264, Series H: Audiovisual and Multimedia Systems, Infrastructure of audiovisual services—Coding of moving video, Advanced video coding for generic audiovisual services, Mar. 2005, 343 pp.

Kim et al., "Enhanced intra coding," ITU—Telecommunications Standardization Sector, Video Coding Experts Group (VCEG), VCEG-AH11, Jan. 12-13, 2008, 6 pp.

Choi et al., "Adaptive Coefficient Scanning Based on the Intra Prediction Mode," ETRI Journal, vol. 29, No. 5, Oct. 2007, pp. 694-696.

"Test Model under Consideration", Joint Collaborative Team on Video Coding (JCT-VC) of ITU-T SG16 WP3 and ISO/IEC JTC1/

(56) References Cited

OTHER PUBLICATIONS

SC29/WG11, Jul. 21-28, 2010; Document: JCTVC-B205, Status: Output Document (draft000), Jul. 28, 2010, 152 pp.

Lee, et.al., "High-Efficiency Video Compression Framework Based on Flexible Unit Representation," Proceedings of the Second APSIPA Annual Summit and Conference, Dec. 17, 2010, pp. 623-631.

Suzuki, et al., "Description of Video Coding Technology Proposal by Sony," Apr. 15-23, 2010; Joint Collaborative Team on Video Coding (JCT-VC) of ITU-T SG16 WP3 and ISO/IEC JTC1/SC29/WG11, Document JCTVC-A103, 1st Meeting: Dresden, DE, May 8, 2010, 51 pp.

Yeo, et. al., "Choice of Transforms in MDDT for Unified Intra Prediction", Joint Collaborative Team on Video Coding (JCT-VC) of ITU-T SG16 WP3 and ISO/IEC JTC1/SC29/WG11, Oct. 7-15, 2010, Document: JCTVC-0039 (version 1), URL: http://phenix.it-sudparis.eu/jct/doc_end_user/documents/3_Guangzhou/wg11/JCTVC-C039-m18060-v1-JCTVC-C039.zip, Oct. 2, 2010, 4 pp.

Yeo, et. al., "Mode-Dependent Fast Separable KLT for Block-based Intra Coding," Jul. 21-28, 2010; [online] Joint collaborative Team on Video Coding (JCT-VC) of ITU-T SG16 WP3 and ISO/IEC JTC1/SC29/WG11, Jul. 28, 2010, Document: JCTVC-B024, URL : http://phenix.it-sudparis.eu/jct/doc_end_user/documents/2_Geneva/wg11/JCTVC-B024.zip, 7 pp.

\* cited by examiner

CODING SYNTAX ELEMENTS FOR ADAPTIVE SCANS OF TRANSFORM COEFFICIENTS FOR VIDEO CODING

This application claims the benefit of U.S. Provisional Application No. 61/363,127, filed Jul. 9, 2010, U.S. Provisional Application No. 61/374,573, filed Aug. 17, 2010, and U.S. Provisional Application No. 61/377,420, filed Aug. 26, 2010, each of which is hereby incorporated by reference in its entirety.

CROSS-REFERENCE TO RELATED APPLICATIONS

The present Application for Patent is related to the following co-pending U.S. Patent application:
"VIDEO CODING USING DIRECTIONAL TRANSFORMS" by Joshi et al., U.S. application Ser. No. 13/178,427, filed Jul. 7, 2011, expressly incorporated by reference herein; and "SIGNALING SELECTED DIRECTIONAL TRANSFORM FOR VIDEO CODING" by Joshi et al., U.S. application Ser. No. 13/178,434, expressly incorporated by reference herein.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the upcoming High Efficiency Video Coding (HEVC) standard (also referred to as H.265), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

SUMMARY

In general, this disclosure describes techniques for coding video data. This disclosure describes techniques for transforming residual video data and scanning transform coefficients during a video coding process. In general, blocks of a picture to be coded may be intra-mode encoded (e.g., encoded relative to other blocks of the same picture) or inter-mode encoded (e.g., encoded relative to blocks of a previously coded picture). In either case, a video encoder forms predictive data and residual data. The video encoder may transform the residual value, using one or more various transforms, such as discrete sine transforms, discrete cosine transforms, directional transforms and/or rotational transforms. The video encoder may be configured to select one or more transforms to apply based on certain criteria such as, for example, a prediction direction used when intra-mode encoding the block.

The video encoder may calculate transform coefficients by transforming residual data for a block of video data, where the residual data corresponds to pixel difference values between an original block and a predicted block. The transform coefficients may correspond to a two-dimensional matrix having the same size (in terms of the number of coefficients) as the block that was transformed. The video encoder may scan the transform coefficients to convert the two-dimensional matrix into a one-dimensional array, thereby serializing the transform coefficients. In accordance with the techniques of this disclosure, the video encoder may apply a predetermined scan pattern selected based on the transform(s) used to transform the block. In some examples, in accordance with the techniques of this disclosure, the video encoder may apply an adaptive scan pattern, rather than a predetermined scan pattern, where the video encoder may periodically update the adaptive scan pattern. The scan pattern may be based on the transform(s) and/or intra-prediction mode used to predict the block, in some examples.

In one example, a method of encoding video data includes calculating a residual block for a block of video data based on a predicted block formed using an intra-prediction mode, and transforming the residual block using a transform mapped from the intra-prediction mode.

In another example, an apparatus for encoding video data, the apparatus comprising a video encoder configured to calculate a residual block for a block of video data based on a predicted block formed using an intra-prediction mode, and transform the residual block using a transform mapped from the intra-prediction mode.

In another example, an apparatus for encoding video data includes means for calculating a residual block for a block of video data based on a predicted block formed using an intra-prediction mode, and means for transforming the residual block using a transform mapped from the intra-prediction mode.

In another example, a computer program product includes a computer-readable storage medium having stored thereon instructions that, when executed, cause a processor of a device for encoding video data to calculate a residual block for a block of video data based on a predicted block formed using an intra-prediction mode, and transform the residual block using a transform mapped from the intra-prediction mode.

In another example, a method of decoding video data includes determining an intra-prediction mode to be used to predict a block of video data, and inverse transforming transformed residual data of the block using an inverse transform mapped from the intra-prediction mode.

In another example, an apparatus for decoding video data includes a video decoder configured to determine an intra-prediction mode to be used to predict a block of video data, and to inverse transform transformed residual data of the block using an inverse transform mapped from the intra-prediction mode.

In another example, an apparatus for decoding video data includes means for determining an intra-prediction mode to be used to predict a block of video data, and means for inverse transforming transformed residual data of the block using an inverse transform mapped from the intra-prediction mode.

In another example, a computer program product comprising a computer-readable storage medium having stored thereon instructions that, when executed, cause a processor of a device for decoding video data to determine an intra-prediction mode to be used to predict a block of video data, and inverse transform transformed residual data of the block using an inverse transform mapped from the intra-prediction mode.

In another example, a method of encoding video data includes receiving an indication of a first intra-prediction mode in a first set of intra-prediction modes for a block of video data, determining a second intra-prediction mode from a second set of intra-prediction modes, smaller than the first set of intra-prediction modes, to which the first intra-prediction mode is mapped, determining a directional transform to which the second intra-prediction mode is mapped, and applying the directional transform to residual data of the block.

In another example, an apparatus for encoding video data includes a video encoder configured to receive an indication of a first intra-prediction mode in a first set of intra-prediction modes for a block of video data, determine a second intra-prediction mode from a second set of intra-prediction modes, smaller than the first set of intra-prediction modes, to which the first intra-prediction mode is mapped, determine a directional transform to which the second intra-prediction mode is mapped, and apply the directional transform to residual data of the block.

In another example, an apparatus for encoding video data includes means for receiving an indication of a first intra-prediction mode in a first set of intra-prediction modes for a block of video data, means for determining a second intra-prediction mode from a second set of intra-prediction modes, smaller than the first set of intra-prediction modes, to which the first intra-prediction mode is mapped, means for determining a directional transform to which the second intra-prediction mode is mapped, and means for applying the directional transform to residual data of the block.

In another example, a computer program product comprising a computer-readable medium having stored thereon instructions that, when executed, cause a processor of a device for encoding video data to receive an indication of a first intra-prediction mode in a first set of intra-prediction modes for a block of video data, determine a second intra-prediction mode from a second set of intra-prediction modes, smaller than the first set of intra-prediction modes, to which the first intra-prediction mode is mapped, determine a directional transform to which the second intra-prediction mode is mapped, and apply the directional transform to residual data of the block.

In another example, a method of decoding video data includes receiving an indication of a first intra-prediction mode in a first set of intra-prediction modes for a block of encoded video data, determining a second intra-prediction mode from a second set of intra-prediction modes, smaller than the first set of intra-prediction modes, to which the first intra-prediction mode is mapped, determining an inverse directional transform to which the second intra-prediction mode is mapped, and applying the inverse directional transform to transformed residual data of the block.

In another example, an apparatus for decoding video data includes a video decoder configured to receive an indication of a first intra-prediction mode in a first set of intra-prediction modes for a block of encoded video data, determine a second intra-prediction mode from a second set of intra-prediction modes, smaller than the first set of intra-prediction modes, to which the first intra-prediction mode is mapped, determine an inverse directional transform to which the second intra-prediction mode is mapped, and apply the inverse directional transform to transformed residual data of the block.

In another example, an apparatus for decoding video data includes means for receiving an indication of a first intra-prediction mode in a first set of intra-prediction modes for a block of encoded video data, means for determining a second intra-prediction mode from a second set of intra-prediction modes, smaller than the first set of intra-prediction modes, to which the first intra-prediction mode is mapped, means for determining an inverse directional transform to which the second intra-prediction mode is mapped, and means for applying the inverse directional transform to transformed residual data of the block.

In another example, a computer program product comprising a computer-readable medium having stored thereon instructions that, when executed, cause a processor of a device for decoding video data to receive an indication of a first intra-prediction mode in a first set of intra-prediction modes for a block of encoded video data, determine a second intra-prediction mode from a second set of intra-prediction modes, smaller than the first set of intra-prediction modes, to which the first intra-prediction mode is mapped, determine an inverse directional transform to which the second intra-prediction mode is mapped, and apply the inverse directional transform to transformed residual data of the block.

In another example, a method of encoding video data includes selecting an intra-prediction mode to use to encode a block of video data, and determining whether the block includes a sub-block of a size for which multiple transforms are possible based on the size of the sub-block and the selected intra-prediction mode. When the block includes the sub-block of the size for which multiple transforms are possible based on the size of the sub-block and the selected intra-prediction mode, the method includes selecting one of the multiple possible transforms, transforming the sub-block using the selected one of the multiple possible transforms, and providing an indication of the selected one of the multiple possible transforms for the size of the block.

In another example, an apparatus for encoding video data includes a video encoder configured to select an intra-prediction mode to use to encode a block of video data, determine whether the block includes a sub-block of a size for which multiple transforms are possible based on the size of the sub-block and the selected intra-prediction mode, when the block includes the sub-block of the size for which multiple transforms are possible based on the size of the sub-block and the selected intra-prediction mode, select one of the multiple possible transforms, transform the sub-block using the selected one of the multiple possible transforms, and provide an indication of the selected one of the multiple possible transforms for the size of the block.

In another example, an apparatus for encoding video data includes means for selecting an intra-prediction mode to use to encode a block of video data, means for determining whether the block includes a sub-block of a size for which multiple transforms are possible based on the size of the sub-block and the selected intra-prediction mode, when the block includes the sub-block of the size for which multiple transforms are possible based on the size of the sub-block and the selected intra-prediction mode, means for selecting one of the multiple possible transforms, means for transforming the sub-block using the selected one of the multiple possible transforms, and means for providing an indication of the selected one of the multiple possible transforms for the size of the block.

In another example, a computer program product comprising a computer-readable medium having stored thereon instructions that, when executed, cause a processor of a device for encoding video data to select an intra-prediction mode to use to encode a block of video data, determine whether the block includes a sub-block of a size for which multiple transforms are possible based on the size of the sub-block and the selected intra-prediction mode, when the block includes the sub-block of the size for which multiple transforms are possible based on the size of the sub-block and the selected intra-prediction mode, select one of the multiple possible transforms, transform the sub-block using the selected one of the multiple possible transforms, and provide an indication of the selected one of the multiple possible transforms for the size of the block.

In another example, a method of decoding video data includes receiving a first indication of an intra-prediction mode to use to decode a block of video data, determining whether the block includes a sub-block of a size for which multiple transforms are possible based on the size of the sub-block and the indicated intra-prediction mode, when the block includes the sub-block of the size for which multiple inverse transforms are possible based on the size of the sub-block and the indicated intra-prediction mode, receiving a second indication of one of the multiple possible inverse transforms, and inverse transforming the sub-block using the indicated one of the multiple possible inverse transforms.

In another example, an apparatus for decoding video data includes a video decoder configured to receive a first indication of an intra-prediction mode to use to decode a block of video data, determine whether the block includes a sub-block of a size for which multiple transforms are possible based on the size of the sub-block and the indicated intra-prediction mode, when the block includes the sub-block of the size for which multiple inverse transforms are possible based on the size of the sub-block and the indicated intra-prediction mode, receive a second indication of one of the multiple possible inverse transforms, and inverse transform the sub-block using the indicated one of the multiple possible inverse transforms.

In another example, an apparatus for decoding video data includes means for receiving a first indication of an intra-prediction mode to use to decode a block of video data, means for determining whether the block includes a sub-block of a size for which multiple transforms are possible based on the size of the sub-block and the indicated intra-prediction mode, when the block includes the sub-block of the size for which multiple inverse transforms are possible based on the size of the sub-block and the indicated intra-prediction mode, means for receiving a second indication of one of the multiple possible inverse transforms, and means for inverse transforming the sub-block using the indicated one of the multiple possible inverse transforms.

In another example, a computer program product comprising a computer-readable medium having stored thereon instructions that, when executed, cause a processor of a device for decoding video data to receive a first indication of an intra-prediction mode to use to decode a block of video data, determine whether the block includes a sub-block of a size for which multiple transforms are possible based on the size of the sub-block and the indicated intra-prediction mode, when the block includes the sub-block of the size for which multiple inverse transforms are possible based on the size of the sub-block and the indicated intra-prediction mode, receive a second indication of one of the multiple possible inverse transforms, and inverse transform the sub-block using the indicated one of the multiple possible inverse transforms.

In another example, a method of encoding video data includes scanning a two-dimensional block of transform coefficients to produce a one-dimensional vector of the transform coefficients, determining values indicative of whether the transform coefficients in the one-dimensional vector are significant, and entropy encoding at least one of the values using a context model selected based on at least a percentage of significant coefficients in a predetermined number of the values encoded before the at least one of the values.

In another example, an apparatus for encoding video data includes a video encoder configured to scan a two-dimensional block of transform coefficients to produce a one-dimensional vector of the transform coefficients, determine values indicative of whether the transform coefficients in the one-dimensional vector are significant, and entropy encode at least one of the values using a context model selected based on at least a percentage of significant coefficients in a predetermined number of the values encoded before the at least one of the values.

In another example, an apparatus for encoding video data includes means for scanning a two-dimensional block of transform coefficients to produce a one-dimensional vector of the transform coefficients, means for determining values indicative of whether the transform coefficients in the one-dimensional vector are significant, and means for entropy encoding at least one of the values using a context model selected based on at least a percentage of significant coefficients in a predetermined number of the values encoded before the at least one of the values.

In another example, a computer program product comprising a computer-readable medium having stored thereon instructions that, when executed, cause a processor of a device for encoding video data to scan a two-dimensional block of transform coefficients to produce a one-dimensional vector of the transform coefficients, determine values indicative of whether the transform coefficients in the one-dimensional vector are significant, and entropy encode at least one of the values using a context model selected based on at least a percentage of significant coefficients in a predetermined number of the values encoded before the at least one of the values.

In another example, a method of decoding video data includes receiving values indicative of whether encoded transform coefficients in a received one-dimensional vector of encoded transform coefficients are significant, entropy decoding at least one of the values using a context model selected based on at least a percentage of significant coefficients in a predetermined number of the values decoded before the at least one of the values, and inverse scanning the one-dimensional vector to produce two-dimensional block of the transform coefficients.

In another example, an apparatus for decoding video data includes a video decoder configured to receive values indicative of whether encoded transform coefficients in a received one-dimensional vector of encoded transform coefficients are significant, entropy decode at least one of the values using a context model selected based on at least a percentage of significant coefficients in a predetermined number of the values decoded before the at least one of the values, and inverse scan the one-dimensional vector to produce two-dimensional block of the transform coefficients.

In another example, an apparatus for decoding video data includes means for receiving values indicative of whether encoded transform coefficients in a received one-dimensional vector of encoded transform coefficients are significant, means for entropy decoding at least one of the values using a context model selected based on at least a percentage of significant coefficients in a predetermined number of the values decoded before the at least one of the values, and means for inverse scanning the one-dimensional vector to produce two-dimensional block of the transform coefficients.

In another example, a computer program product comprising a computer-readable medium having stored thereon instructions that, when executed, cause a processor of a device for decoding video data to receive values indicative of whether encoded transform coefficients in a received one-dimensional vector of encoded transform coefficients are significant, entropy decode at least one of the values using a context model selected based on at least a percentage of significant coefficients in a predetermined number of the values decoded before the at least one of the values, and inverse scan the one-dimensional vector to produce two-dimensional block of the transform coefficients.

In one example, a method of encoding video data includes transforming residual data for a block of video data using a first transform to produce an intermediate, two-dimensional block of transform coefficients, transforming the intermediate, two-dimensional block of transform coefficients using a rotational transform to produce a two-dimensional block of transform coefficients, selecting a set of statistics associated with at least one of the first transform and the rotational transform, wherein the set of statistics provides likelihoods that locations in the two-dimensional block of transform coefficients will be non-zero, and adaptively scanning the two-dimensional block of transform coefficients based on the selected set of statistics.

In another example, an apparatus for encoding video data includes a video encoder configured to transform residual data for a block of video data using a first transform to produce an intermediate, two-dimensional block of transform coefficients, transform the intermediate, two-dimensional block of transform coefficients using a rotational transform to produce a two-dimensional block of transform coefficients, select a set of statistics associated with at least one of the first transform and the rotational transform, wherein the set of statistics provides likelihoods that locations in the two-dimensional block of transform coefficients will be non-zero, and adaptively scan the two-dimensional block of transform coefficients based on the selected set of statistics.

In another example, an apparatus for encoding video data includes means for transforming residual data for a block of video data using a first transform to produce an intermediate, two-dimensional block of transform coefficients, means for transforming the intermediate, two-dimensional block of transform coefficients using a rotational transform to produce a two-dimensional block of transform coefficients, means for selecting a set of statistics associated with at least one of the first transform and the rotational transform, wherein the set of statistics provides likelihoods that locations in the two-dimensional block of transform coefficients will be non-zero, and means for adaptively scanning the two-dimensional block of transform coefficients based on the selected set of statistics.

In another example, a computer program product comprising a computer-readable medium having stored thereon instructions that, when executed, cause a processor of a device for encoding video data to transform residual data for a block of video data using a first transform to produce an intermediate, two-dimensional block of transform coefficients, transform the intermediate, two-dimensional block of transform coefficients using a rotational transform to produce a two-dimensional block of transform coefficients, select a set of statistics associated with at least one of the first transform and the rotational transform, wherein the set of statistics provides likelihoods that locations in the two-dimensional block of transform coefficients will be non-zero, and adaptively scan the two-dimensional block of transform coefficients based on the selected set of statistics.

In another example, a method of decoding video data includes receiving an indication that residual data for a block of video data was transformed using both a first transform and a rotational transform to produce a two-dimensional block of transform coefficients, selecting a set of statistics associated with at least one of the first transform and the rotational transform, wherein the set of statistics provides likelihoods that locations in the two-dimensional block of transform coefficients will be non-zero, and adaptively inverse scanning a received one-dimensional vector including an encoded version of the residual data for the block based on the selected set of statistics to produce a two-dimensional matrix of transform coefficients for the block.

In another example, an apparatus for decoding video data includes a video decoder configured to receive an indication that residual data for a block of video data was transformed using both a first transform and a rotational transform to produce a two-dimensional block of transform coefficients, select a set of statistics associated with at least one of the first transform and the rotational transform, wherein the set of statistics provides likelihoods that locations in the two-dimensional block of transform coefficients will be non-zero, and adaptively inverse scanning a received one-dimensional vector including an encoded version of the residual data for the block based on the selected set of statistics to produce a two-dimensional matrix of transform coefficients for the block.

In another example, an apparatus for decoding video data includes means for receiving an indication that residual data for a block of video data was transformed using both a first transform and a rotational transform to produce a two-dimensional block of transform coefficients, means for selecting a set of statistics associated with at least one of the first transform and the rotational transform, wherein the set of statistics provides likelihoods that locations in the two-dimensional block of transform coefficients will be non-zero, and means for adaptively inverse scanning a received one-dimensional vector including an encoded version of the residual data for the block based on the selected set of statistics to produce a two-dimensional matrix of transform coefficients for the block.

In another example, a computer program product comprising a computer-readable medium having stored thereon instructions that, when executed, cause a processor of a device for decoding video data to receive an indication that residual data for a block of video data was transformed using both a first transform and a rotational transform to produce a two-dimensional block of transform coefficients, select a set of statistics associated with at least one of the first transform and the rotational transform, wherein the set of statistics provides likelihoods that locations in the two-dimensional block of transform coefficients will be non-zero, and adaptively inverse scan a received one-dimensional vector including an encoded version of the residual data for the block based on the selected set of statistics to produce a two-dimensional matrix of transform coefficients for the block.

In another example, a method of decoding video data includes receiving information indicating that an intra-prediction mode for a block of video data is a DC intra-prediction mode, determining whether an edge is present in the block of video data, after determining that the edge is present in the block, determining an angle for the edge, based on the information indicating that the intra-prediction mode is the DC intra-prediction mode and the determination that the edge is present in the block, inverse transforming the block using a directional inverse transform mapped from a directional intra-prediction mode having an angle that approximates the angle of the edge, and decoding the inverse transformed block.

In another example, an apparatus for decoding video data includes a video decoder configured to receive information indicating that an intra-prediction mode for a block of video data is a DC intra-prediction mode, determine whether an edge is present in the block of video data, after determining that the edge is present in the block, determine an angle for the edge, based on the information indicating that the intra-prediction mode is the DC intra-prediction mode and the determination that the edge is present in the block, inverse transform the block using a directional inverse transform mapped from a directional intra-prediction mode having an angle that approximates the angle of the edge, and decode the inverse transformed block.

In another example, an apparatus for decoding video data includes means for receiving information indicating that an intra-prediction mode for a block of video data is a DC intra-prediction mode, means for determining whether an edge is present in the block of video data, means for determining, after determining that the edge is present in the block an angle for the edge, means for inverse transforming, after determining the angle of the edge, the block using a directional inverse transform mapped from a directional intra-prediction mode having an angle that approximates the angle of the edge based on the information indicating that the intra-prediction mode is the DC intra-prediction mode and the determination that the edge is present in the block, and means for decoding the inverse transformed block.

In another example, a computer program product includes a computer-readable medium having stored thereon instructions that, when executed, cause a processor to receive information indicating that an intra-prediction mode for a block of video data is a DC intra-prediction mode, determine whether an edge is present in the block of video data, after determining that the edge is present in the block, determine an angle for the edge, and based on the information indicating that the intra-prediction mode is the DC intra-prediction mode and the determination that the edge is present in the block, inverse transform the block using a directional inverse transform mapped from a directional intra-prediction mode having an angle that approximates the angle of the edge, and decode the inverse transformed block.

In another example, a method of encoding video data includes determining that a block to be intra-prediction encoded contains an edge within the block, calculating a residual block for the block based on a prediction value calculated using an edge directed intra-prediction mode, based on the determination that the edge is present in the block and the selection of the edge-based intra-prediction mode, transforming the residual block using a directional transform mapped from a directional intra-prediction mode having an angle that approximates an angle of the edge, and outputting information representative of the transformed residual block and information indicating that the block was predicted using a DC intra-prediction mode.

In another example, an apparatus for encoding video data includes a video encoder configured to determine that a block to be intra-prediction encoded contains an edge within the block, calculate a residual block for the block based on a prediction value calculated using an edge directed intra-prediction mode, based on the determination that the edge is present in the block and the selection of the edge-based intra-prediction mode, transform the residual block using a directional transform mapped from a directional intra-prediction mode having an angle that approximates an angle of the edge, and output information representative of the transformed residual block and information indicating that the block was predicted using a DC intra-prediction mode.

In another example, an apparatus for encoding video data includes means for determining that a block to be intra-prediction encoded contains an edge within the block, means for calculating a residual block for the block based on a prediction value calculated using an edge directed intra-prediction mode, means for transforming, based on the determination that the edge is present in the block and the selection of the edge-based intra-prediction mode, the residual block using a directional transform mapped from a directional intra-prediction mode having an angle that approximates an angle of the edge, and means for outputting information representative of the transformed residual block and information indicating that the block was predicted using a DC intra-prediction mode.

In another example, a computer program product includes a computer-readable storage medium having stored thereon instructions that, when executed, cause a processor to determine that a block to be intra-prediction encoded contains an edge within the block, calculate a residual block for the block based on a prediction value calculated using an edge directed intra-prediction mode, based on the determination that the edge is present in the block and the selection of the edge-based intra-prediction mode, transform the residual block using a directional transform mapped from a directional intra-prediction mode having an angle that approximates an angle of the edge, and output information representative of the transformed residual block and information indicating that the block was predicted using a DC intra-prediction mode.

The details of one or more examples are set forth in the accompanying drawings and the description below. Other features, objects, and advantages will be apparent from the description and drawings, and from the claims.

DETAILED DESCRIPTION

Figure 1:
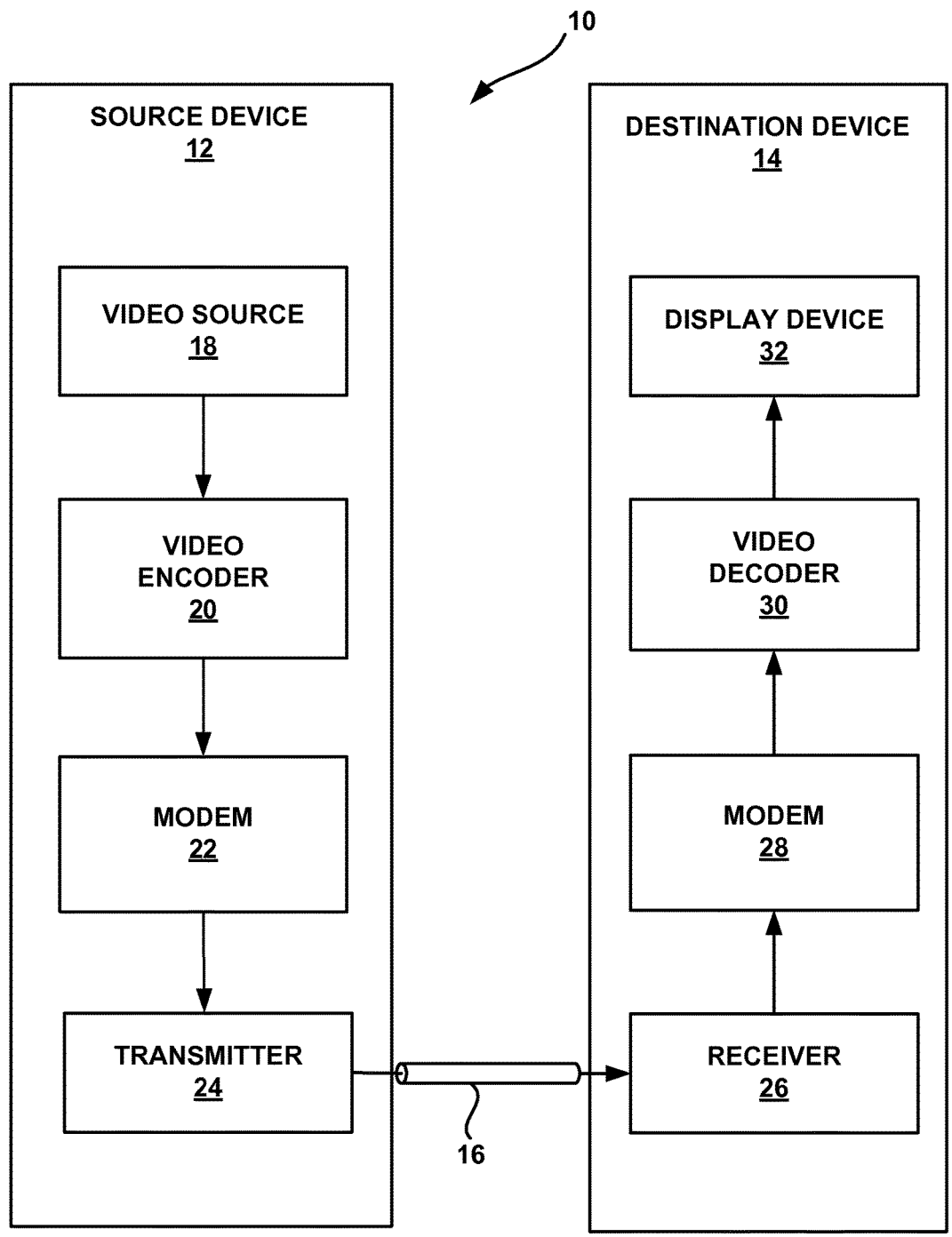
FIG. 1 is a block diagram illustrating an example video encoding and decoding system that may utilize techniques for encoding and decoding transform units of a coding unit.

In general, this disclosure describes techniques for coding video data. More specifically, this disclosure describes techniques relating to transforming residual data and scanning transform coefficients during a video coding process. Encoded video data may include prediction data and residual data. A video encoder may produce the prediction data during an intra-prediction mode or an inter-prediction mode. Intra-prediction generally involves predicting a block of a picture relative to neighboring, previously coded blocks of the same picture. Inter-prediction generally involves predicting a block of a picture relative to data of a previously coded picture.

Following intra- or inter-prediction, a video encoder may calculate a residual value for the block. The residual value generally corresponds to the difference between the predicted data for the block and the true value of the block. To further compress the residual value of a block, the residual value may be transformed into a set of transform coefficients that compact as much data (also referred to as "energy") as possible into as few coefficients as possible. The transform coefficients correspond to a two-dimensional matrix of coefficients that is the same size as the original block. In other words, there are just as many transform coefficients as pixels in the original block. However, due to the transform, many of the transform coefficients may have values equal to zero.

In some cases a secondary transform, such as a rotational transform, may be applied to a subset of the transform coefficients generated by the first transform. For example, after transforming a 16×16 residual block into 16×16 matrix of transform coefficients, a rotational transform may be applied to the 8×8 block of lowest frequency transform coefficients. While this example describes a rotational transform as a secondary transform, other secondary transforms (e.g., KLTs, DCTs, and the like) may also be applied as secondary transforms. Such secondary transforms may also be selected based on a signaled intra-prediction mode for the block.

References to "DCT transforms" should be understood to include both fixed-point implementations and floating point implementations. That is, an implementation of a DCT transform may actually comprise an approximation of a DCT, such that the DCT transform has integer coefficients (that is, fixed point coefficients) rather than rational number coefficients.

In some examples, a transform may comprise a non-separable transform. Non-separable transforms are typically computationally expensive, and therefore, video coding devices may instead apply separable transforms. In general, separable transforms include a horizontal component applied to rows of the block and a vertical component applied to columns of the block. In this manner, a separable transform may have a row transform component and a column transform component, also referred to as two orthogonal transform components. Two matrices may be used to define a separable transform, each of the matrices corresponding to one of the orthogonal transform components. A non-separable transform may include only one matrix that, when applied, produces a conceptually similar result to application of the separable transform, but through relatively more intensive calculations.

Transforming a block of residual data produces a set of transform coefficients for the block. The video encoder may then quantize the transform coefficients to further compress the video data. Quantization generally involves mapping values within a relatively large set to values in a relatively small set, thus reducing the amount of data needed to represent the quantized transform coefficients. Following quantization, the video encoder may scan the transform coefficients, producing a one-dimensional vector from the two-dimensional matrix including the quantized transform coefficients. The video encoder may zero out certain coefficients prior to or following the scan, e.g., all but the upper-left corner of the matrix or all coefficients in the array from a position N to the end of the array.

The video encoder may then entropy encode the resulting array, to even further compress the data. In some examples, the video encoder may be configured to use variable length codes (VLCs) to represent various possible quantized transform coefficients of the array, e.g., using context-adaptive variable-length coding (CAVLC). In other examples, the video encoder may be configured to use binary arithmetic coding to encode the resulting quantized coefficients, e.g., using context-adaptive binary arithmetic coding (CABAC).

This disclosure describes several techniques related to transformation, quantization, scanning, and entropy encoding of residual values during a video coding process. The techniques may be applied by both video encoding and decoding units, including video encoder/decoders (CODECs) and processing units configured to perform video encoding and/or decoding. References to "video coding units" or "video coding devices" should be understood to refer to units or devices capable of encoding, decoding, or both encoding and decoding video data.

Efforts are currently in progress to develop a new video coding standard, currently referred to as High Efficiency Video Coding (HEVC). The upcoming standard is also referred to as H.265. The standardization efforts are based on a model of a video coding device referred to as the HEVC Test Model (HM). The HM presumes several capabilities of video coding devices over devices according to, e.g., ITU-T H.264/AVC. For example, whereas H.264 provides nine intra-prediction encoding modes, HM provides as many as thirty-four intra-prediction encoding modes.

HM refers to a block of video data as a coding unit (CU), which may include one or more prediction units (PUs) and/or one or more transform units (TUs). Syntax data within a bitstream may define a largest coding unit (LCU), which is a largest coding unit in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU). This disclosure also uses the term "block" to refer to any of a CU, PU, or TU.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, 4 sub-CUs of a leaf-CU will also be referred to as leaf-CUs although there is no explicit splitting of the original leaf-CU. For example if a CU at 16×16 size is not split further, the four 8×8 sub-CUs will also be referred to as leaf-CUs although the 16×16 CU was never split.

Moreover, TUs of leaf-CUs may also be associated with respective quadtree data structures. That is, a leaf-CU may include a quadtree indicating how the leaf-CU is partitioned into TUs. This disclosure refers to the quadtree indicating how an LCU is partitioned as a CU quadtree and the quadtree indicating how a leaf-CU is partitioned into TUs as a TU quadtree. The root node of a TU quadtree generally corresponds to a leaf-CU, while the root node of a CU quadtree generally corresponds to an LCU. TUs of the TU quadtree that are not split are referred to as leaf-TUs.

A leaf-CU may include one or more prediction units (PUs). In general, a PU represents all or a portion of the corresponding CU, and may include data for retrieving a reference sample for the PU. For example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the leaf-CU defining the PU(s) may also describe, for example, partitioning of the CU into one or more PUs. Partitioning modes may differ depending on whether the CU is uncoded, intra-prediction mode encoded, or inter-prediction mode encoded. For intra coding, a PU may be treated the same as a leaf transform unit described below.

A leaf-CU may include one or more transform units (TUs). The transform units may be specified using a TU quadtree structure, as discussed above. That is, a split flag may indicate whether a leaf-CU is split into four transform units. Then, each transform unit may be split further into 4 sub TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the predictive values corresponding to the TU and the original block. The residual value may be transformed, quantized, and scanned. For inter coding, a video encoder may perform prediction at the PU level and may calculate a residual for each PU. The residual values corresponding to a leaf-CU may be transformed, quantized, and scanned. For inter coding, a leaf-TU may be larger or smaller than a PU. For intra coding, a PU may be collocated with a corresponding leaf-TU. In some examples, the maximum size of a leaf-TU may be the size of the corresponding leaf-CU.

In general, this disclosure uses the terms CU and TU to refer to leaf-CU and leaf-TU, respectively, unless noted otherwise. In general, the techniques of this disclosure relate to transforming, quantizing, scanning, and entropy encoding data of a CU. As an example, the techniques of this disclosure include selection of a transform to use to transform a residual value of an intra-predicted block based on an intra-prediction mode used to predict the block. This disclosure also uses the term "directional transform" or "designed transform" to refer to such a transform that depends on intra-prediction mode direction. That is, a video encoder may select a directional transform to apply to a transform unit (TU). As noted above, intra-prediction includes predicting a TU of a current CU of a picture from previously coded CUs and TUs of the same picture. More specifically, a video encoder may intra-predict a current TU of a picture using a particular intra-prediction mode.

The techniques of this disclosure include associating certain transforms with intra-prediction modes. Thus, there may be a one-to-one correspondence between intra-prediction modes and transforms in accordance with techniques of this disclosure. In some examples, there may be a many-to-one correspondence between intra-prediction modes and transforms thereof. For example, a large set of intra-prediction modes may be mapped to a smaller set of intra-prediction modes, and each of the smaller set of intra-prediction modes may be mapped one-to-one to respective transforms.

The transforms may also be mapped to respective scan patterns. In some examples, intra-prediction modes may be mapped to both transforms and scans, while in other examples, intra-prediction modes may be mapped to transforms, and transforms may be mapped to scans. In various examples, various combinations of transforms and coefficient scans may be used. For example, intra-prediction modes may be mapped to mode dependent directional transforms, and a zig-zag scan may be used in all cases.

In some examples, rather than mapping intra-prediction modes to transforms and/or scan patterns, video encoder 20 may be configured to signal a combination of one or more transforms and a scan pattern to apply. Likewise, video decoder 30 may be configured to determine a transform and scan pattern to apply based on a received indication, rather than a mapping between an intra-prediction mode and the transforms and scan pattern.

The transforms may include a discrete cosine transform (DCT) and eight directional transforms, also referred to as Karhunen-Loève transforms (KLTs). The DCT is generally a sum of cosine functions having different frequencies, where the functions are applied to the residual values. The KLTs generally each include two matrices. Each matrix in the KLT is the same size as the residual block to be transformed. The KLTs may be derived from training set data or derived analytically assuming a model for the video frames and/or prediction residual.

An HM encoder may be configured with thirty-four intra-prediction modes for certain block sizes. Therefore, to support a one-to-one mapping between directional intra-prediction modes and directional transforms, HM encoders and decoders would need to store up to 68 matrices for each supported transform size. Furthermore, the block sizes for which all thirty-four intra-prediction modes are supported may be relatively large blocks, e.g., 16×16 pixels, 32×32 pixels, or even larger.

In some examples, this disclosure provides techniques for reducing the number of directional transforms that encoders and decoders need to support. That is, encoders and decoders may support fewer directional transforms than the number of available intra-prediction modes. An encoder according to these techniques, for example, may map a relatively large set of intra-prediction modes to a subset of the intra-prediction modes. Each of the intra-prediction modes in the subset may be associated with a directional transform. That is, the intra-prediction modes in the subset may have a one-to-one correspondence with a set of directional transforms. Therefore, the intra-prediction modes in the large set may have a many-to-one correspondence with the set of directional transforms.

For example, each of the 34 HM directional intra-prediction modes may be mapped to one of the eight directional intra-prediction modes of H.264. The video encoder may therefore select a directional prediction mode to intra-predict a value for a current TU, determine an intra-prediction mode from the subset to which the selected mode is mapped, then use the directional transform mapped to the intra-prediction mode from the subset to transform the current TU. In addition, each of the directional transforms may be associated with a respective scan pattern. Thus, the encoder may perform the scan associated with the directional transform to produce a vector of transform coefficients that can then be quantized. Moreover, the encoder may be configured with a maximum size for the vector. That is, the encoder may stop scanning the transform coefficients upon reaching the maximum size, whether or not the next coefficient to be scanned is non-zero.

By applying the techniques described above, the encoder need not signal the transform used for a particular TU when the techniques described above are used. That is, the encoder and decoder may each be configured with the many-to-one mapping of intra-prediction modes of the large set to intra-prediction modes of the subset, and the one-to-one mapping of intra-prediction modes of the subset to directional transforms. Thus, by signaling the intra-prediction mode from the large set, the decoder can derive the transform used to transform the block. Moreover, these techniques may be implemented by legacy devices that have limited memory that can be allocated to storage of matrices for the various directional transforms.

An HM encoder may be configured such that the available set of intra-prediction modes for a block differs based on the size of the block. That is, the size of a CU may determine the number of intra-prediction modes available for the CU, from which the encoder may select an intra-prediction mode to predict values used to calculate coefficients of the TUs. Table 1 below illustrates one example of a correspondence between CU sizes and the number of intra-prediction modes available for CUs of that size. In this disclosure, 4 sub-CUs of a leaf-CU are also referred to as leaf-CUs, although there is no explicit splitting of the original leaf-CU. If the leaf-CU has the smallest CU size, these 4 sub-CUs can select different intra prediction modes. Hence, the table has an entry for 4×4 CU size.

TABLE 1

| CU Size | Number of Intra-Prediction Modes |
|---------|----------------------------------|
| 4 × 4   | 17                               |
| 8 × 8   | 34                               |
| 16 × 16 | 34                               |
| 32 × 32 | 34                               |
| 64 × 64 | 5                                |

In general, a video encoder may signal a prediction direction for a block, in order for a video decoder to properly decode the block. In some examples, a video encoder may be configured to determine a single prediction direction for a CU that may be applied to all TUs belonging to the CU. However, as noted above in Table 1, certain sizes of blocks have less intra-prediction modes available compared to other sizes of blocks. Such cases can be resolved by allowing the number of prediction directions at the CU block size to be used for the TU blocks sizes. Alternatively, the intra-prediction modes of a larger set may be mapped to intra-prediction modes of a smaller set, e.g., a subset. As discussed above, there may be a many-to-one relationship between intra-prediction modes of the larger set and intra-prediction modes of a smaller set.

TU quadtree structures may lead to decomposition of a large block (CU) into smaller blocks (TUs). The spatial prediction mode of the root block (for the CU) may be explicitly signaled in the bitstream. The resulting smaller TU quadtree blocks (TUs) may inherit their prediction modes from that of the root block of the TU quadtree (which corresponds to the CU). However, the number of spatial prediction directions supported by the smaller blocks (TUs) can be different from that of the root block (CU). This can be resolved by allowing more prediction directions for the smaller blocks (TUs). Alternatively, the prediction modes of the smaller blocks (TUs) may be derived from that of the root block (CU) by a many-to-one or one-to-one mapping according to a predetermined criterion such as minimizing the prediction direction angle difference between the intra prediction direction for the CU and the supported prediction directions in the smaller block. Directional transforms and scan patterns may be selected based on this mapping.

In this manner, the video encoder may signal an intra-prediction direction once for a CU. Assuming that the CU includes a TU of a size that does not support the signaled intra-prediction direction, the video encoder may determine the intra-prediction mode for the TU based on the mapping. That is, the video encoder may intra-predict a predicted block used to calculate a TU using the intra-prediction mode of the smaller set to which the signaled intra-prediction mode of the larger set is mapped. Likewise, a video decoder may include the same configuration, such that the video decoder can determine intra-prediction modes for each TU of a received CU. Alternatively, the number of prediction modes for a TU may be increased to match the number of prediction modes for the corresponding CU.

In some examples, for some intra-prediction modes, multiple transforms may be possible for TUs of particular sizes.

In such cases, a video decoder might not be able to derive the transform to apply to the TU solely from the intra-prediction mode. Thus, the video encoder may need to signal the transform to use for TUs of sizes for which multiple transforms are possible. Rather than signaling the transform for each such TU, this information may be signaled at the CU level. In such a case, this transform may apply to all TUs contained in the CU. For TUs of sizes for which only one transform is mapped to the signaled intra-prediction mode, the mapped transform may be used.

Moreover, the syntax specifying the transform need only be present if the CU includes a TU of a size for which multiple transforms are possible. For TUs for which only one transform is possible, the video encoder and decoder may determine the transform to use based on the selected intra-prediction mode. However, for TUs of a size for which multiple transforms are possible, the video encoder may explicitly signal the transform to use for all similarly-sized TUs in the CU, e.g., by signaling the transform to use at the root of the TU quadtree for the CU.

In this manner, if a video decoder encounters a TU of a size for which multiple transforms are possible based on the intra-prediction mode for the CU corresponding to the TU, the decoder may determine the transform to apply based on the explicit signaling. For other TUs, the video decoder may use the transform associated with the intra-prediction mode signaled for the CU.

In some examples, a video encoder may apply more than one transform (e.g., more than one separable transform) to a residual value for a CU. For example, the video encoder may transform a TU of the CU once using a first transform, producing a first set of transform coefficients, then apply a second transform to the first set of transform coefficients, producing a second set of transform coefficients. This process of applying two or more transforms to a TU may be referred to as a cascaded transform. In some examples, the second transform may be applied only to a subset of coefficients produced by the first transform. It should be understood that the second transform may comprise a second separable transform, while the first transform may comprise a first separable transform. Thus, cascaded transforms may be applied by applying four matrices total to the coefficients: two for the first separable transform and another two for the second separable transform.

In some examples, the second transform (that is, the second separable transform) may correspond to a rotational transform (ROT). A rotational transform can generally be considered to change the coordinate system of the transform basis. For example, a video encoder may first apply a directional transform, then a rotational transform, to a TU. As another example, the video encoder may first apply a DCT to a TU, then apply a rotational transform to the TU. The video encoder may be configured with multiple rotational transforms. The video encoder may further be configured to apply a rotational transform following certain directional transforms and/or in conjunction with certain intra-prediction modes. That is, the video encoder may be configured to apply a rotational transform for certain combinations of directional transforms and certain intra-prediction modes. The different rotational transforms may be indexed by a certain value, e.g., the angle of rotation. In some examples, not all of the coefficients are transformed using a rotational transform. For example, a video encoder may be configured to only rotationally transform low-frequency transform coefficients of a TU.

Furthermore, in some examples, the techniques of this disclosure include intra-mode predicting a TU having a detected edge within the TU. For example, a video coding unit may detect the presence of an edge in a neighboring block, and then determine that the edge continues into the current TU. Edge-handing prediction modes may be provided for intra-predicting such a TU. The video encoder may determine whether to predict the TU using the edge-based prediction mode or another directional intra-prediction mode. When an edge is determined to exist in the TU, and when the edge-based prediction mode is selected, a value indicative of DC prediction mode may be used to signal the intra-prediction mode used, but due to determination of existence of the edge, this value may be interpreted to indicate the edge-handling prediction mode. Moreover, the angle of the edge may be determined and mapped to a directional transform in a manner similar to the mapping of directional intra-prediction modes to directional transforms discussed above. Similarly, a scan pattern mapped to the directional transform may also be used in this example.

This disclosure also provides techniques for scanning transform coefficients in order to produce a one-dimensional vector that can then be entropy encoded. In accordance with these techniques, a video encoder may be configured to select a fixed scan pattern based on various factors, or to perform an adaptive scan. For example, a video encoder may include a set of fixed scan patterns. The video encoder may select one of the fixed scan patterns based on various criteria, such as, for example, an intra-prediction mode, a transform selected for a TU, whether the TU is transformed using a cascaded transform, a rotational transform selected for the TU, or any combination thereof. For example, the video encoder may select one of a set of predefined scans based on an intra-prediction mode, a secondary transform, or a combination thereof. In some examples, the video encoder may select a scan index based on one or more of the factors discussed above, where the scan index may correspond to either a fixed or an adaptive scan.

In some examples, a video encoder may be configured to adaptively scan transform coefficients. The video encoder may store an initial, fixed scan pattern. As the video encoder encodes blocks of a picture, the video encoder may update the scan pattern adaptively. The video encoder may, for example, collect statistics indicative of whether coefficients at locations tend to be zero-valued, and if a coefficient at a particular location is commonly zero-valued, the video encoder may elect to scan that coefficient later than other coefficients that commonly have non-zero values. Moreover, the video encoder may store separate fixed scans and/or scan statistics for various combinations of factors, such as, for example, an intra-prediction mode, a transform selected for a TU, whether the TU is transformed using a cascaded transform, a rotational transform selected for the TU, or any combination thereof. In some examples, a video encoder may store separate statistics for each combination of cascaded transforms, e.g., a first transform followed by a rotational transform. In some examples, the video encoder may use an adaptive scan when the video encoder applies a cascaded transform, and a fixed scan when the video encoder applies a single transform.

As noted above, scanning a two-dimensional matrix of transform coefficients produces a one-dimensional vector that can then be entropy encoded. In some examples, a video encoder may entropy encode the transform coefficients using context-adaptive binary arithmetic coding (CABAC). The video encoder may also entropy-encode syntax elements such as, for example, a significant coefficient flag and a last coefficient flag. When adaptively scanning transform coefficients, a video encoder may set the value of the significant coefficient flag to indicate whether the coefficient is significant or not. The video encoder may, for example, be configured to determine that a coefficient is significant when the value of the coefficient is non-zero. The video encoder may also set the value of the last coefficient flag to indicate the last coefficient in the vector produced by the adaptive scan. A video decoder may use these syntax elements to update locally stored statistics, in order to inverse adaptively scan the entropy encoded coefficients. This disclosure provides techniques for selecting a context model when performing CABAC to encode such syntax elements. The video encoder may select the context model based on, for example, an intra-prediction mode for the CU being encoded, among other elements.

FIG. 1 is a block diagram illustrating an example video encoding and decoding system 10 that may utilize techniques for encoding and decoding transform units of a coding unit. As shown in FIG. 1, system 10 includes a source device 12 that transmits encoded video to a destination device 14 via a communication channel 16. Source device 12 and destination device 14 may comprise any of a wide range of devices. In some cases, source device 12 and destination device 14 may comprise wireless communication devices, such as wireless handsets, so-called cellular or satellite radiotelephones, or any wireless devices that can communicate video information over a communication channel 16, in which case communication channel 16 is wireless.

The techniques of this disclosure, however, which concern encoding and decoding of transform units, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless or wired media suitable for transmission or storage of encoded video data.

In the example of FIG. 1, source device 12 includes a video source 18, video encoder 20, a modulator/demodulator (modem) 22 and a transmitter 24. Destination device 14 includes a receiver 26, a modem 28, a video decoder 30, and a display device 32. In accordance with this disclosure, video encoder 20 of source device 12 may be configured to apply the techniques for encoding and decoding of transform units of this disclosure. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for encoding and decoding of transform units may be performed by any digital video encoding and/or decoding device. Although the techniques of this disclosure are generally performed by a video encoding device or a video decoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. Again, the video encoding process may implement one or more of the techniques described herein to encode and decode transform units. The information communicated over channel 16 may include syntax information defined by video encoder 20, which is also used by video decoder 30, that includes syntax elements that describe characteristics and/or processing of coding units or other units of coded video data, e.g., groups of pictures (GOPs), slices, frames and the like. A CU quadtree data structure may form part of the syntax information for a largest coding unit. That is, each LCU may include syntax information in the form of a CU quadtree, which may describe how the LCU is split into sub-CUs as well as signaling information on how the LCU and sub-CUs are encoded. Likewise, TU quadtree data structures may form part of the syntax information for leaf-CUs of the LCU, which may describe how the respective leaf-CUs are split into TUs.

Video decoder 30 may use the CU quadtree and TU quadtrees to determine how to decode CUs of a received picture, including TUs of the CUs. Video decoder 30 may then decode the CUs and send decoded video data to display device 32. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the ITU-T H.264 standard, alternatively referred to as MPEG-4, Part 10, Advanced Video Coding (AVC). As another example, video encoder 20 and video decoder 30 may operate according to the High Efficiency Video Coding (HEVC) standard, and may conform to the HEVC Test Model (HM). The techniques of this disclosure, however, are not limited to any particular coding standard. Other examples include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented in software, a device may store instructions for the software in a suitable, non-transitory computer-readable medium and execute the instructions using one or more processors to perform the techniques of this disclosure. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on coding units within individual video frames in order to encode the video data. A coding unit may correspond to an LCU or a sub-CU, and the term CU may refer to an LCU or a sub-CU. Header information for an LCU may describe the size of the LCU, the number of times the LCU may be split (referred to as CU depth in this disclosure), and other information. Each video frame may include a plurality of slices, and each slice may include a plurality of LCUs.

In some examples prediction may be performed for various CU sizes. The size of an LCU may be defined by syntax information. Assuming that the size of a particular leaf-node CU is 2N×2N, intra-prediction sizes may include 2N×2N or N×N, in some examples, and inter-prediction symmetric sizes may include 2N×2N, 2N×N, N×2N, or N×N. In some examples, asymmetric splitting may be used for inter-prediction with sizes of 2N×nU, 2N×nD, nL×2N, and nR×2N. In asymmetric splitting, one direction of a CU is not split, while the other direction is split into 25% and 75%. Which portion of the CU is the 25% split is indicated by an "n" followed by an indication of "Up", "Down," "Left," or "Right." Thus, for example, "2N×nU" refers to a 2N×2N CU that is split horizontally with a 0.2N×0.5N PU on top and a 2N×1.5N PU on bottom.

In this disclosure, "N×N" and "N by N" may be used interchangeably to refer to the pixel dimensions of a block (e.g., CU, PU, or TU) in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

PUs of a CU may comprise pixel data in the spatial domain (also referred to as the pixel domain), while TUs of the CU may be transformed to produce coefficients in the transform domain, e.g., following application of a transform such as a discrete cosine transform (DCT), an integer transform, a wavelet transform, or a conceptually similar transform to residual video data. The residual data generally represents pixel differences between values of a PU and the values of collocated, unencoded pixels from the input video data. The coefficients may further be quantized. The transformed coefficients of the TU may be said to be in the frequency domain.

Video encoder 20 may implement any or all of the techniques of this disclosure to improve encoding of transform units of a coding unit. Likewise, video decoder 30 may implement any or all of these techniques to improve decoding of transform units of a coding unit. In general the techniques of this disclosure are directed to the transforming of coefficients of transform units following calculation of the coefficients based on intra-mode prediction. However, certain aspects of this disclosure may also be implemented with respect to inter-prediction encoding. For purposes of example, these techniques are described relative to intra-prediction encoding of TUs. It should be understood that certain aspects of these techniques may also be performed in conjunction with inter-prediction encoding.

Video encoder 20 may receive an LCU and determine whether to split the LCU into four quadrants, each comprising a sub-CU, or whether to encode the LCU without splitting. Following a decision to split an LCU into sub-CUs, video encoder 20 may determine whether to split each sub-CU into four quadrants, each comprising a sub-CU. Video encoder 20 may continue to recursively determine whether to split a CU, with a maximum number of splits indicated by the LCU depth. Video encoder 20 may provide a CU quadtree data structure indicative of the splitting of an LCU and sub-CUs of the LCU. The LCU may correspond to a root node of the CU quadtree. Each node of the CU quadtree may correspond to a CU of the LCU. Moreover, each node may include a split flag value indicative of whether the corresponding CU is split.

If the LCU is split, for example, video encoder 20 may set the value of the split flag in the root node to indicate that the LCU is split. Then, video encoder 20 may set values of child nodes of the root node to indicate which, if any, of the sub-CUs of the LCU are split. A CU that is not split may correspond to a leaf node of the CU quadtree data structure, where a leaf node has no child nodes. Moreover, each leaf-node CU may include one or more TUs, as indicated by a TU quadtree for the leaf-node CU.

Video encoder 20 may encode each sub-CU of the LCU corresponding to a leaf node in the quadtree data structure. For purposes of example, this disclosure describes the techniques relative to intra-prediction encoding of TUs corresponding to the leaf-node CU. In intra-mode encoding, video encoder 20 may form prediction units (PUs) for each TU corresponding to a leaf-node in the TU quadtree data structure. In some examples, video encoder 20 may select one of thirty-four different intra-prediction modes for the CU and signal the selected intra-prediction mode in the root node of the TU quadtree. Starting with a first, largest TU (equal in size to the leaf-node CU in the CU quadtree), video encoder 20 may determine whether to partition the largest TU, and, recursively, whether to partition sub-TUs of the parent TU. Video encoder 20 may further signal an intra-prediction mode in the leaf-node CU quadtree for the CU including the TU quadtree, where the signaled intra-prediction mode may describe the intra-prediction mode to be used to calculate predicted values for each of the TUs in the TU quadtree corresponding to the CU. Video encoder 20 retrieves the prediction data for the TUs from neighboring, previously coded video data, according to the selected intra-prediction mode. In this manner, PUs of a CU predicted using an intra-prediction mode are the same size as TUs of the CU.

In accordance with the techniques of this disclosure, if the selected intra-prediction mode is not available for the current CU, e.g., due to its size, video encoder 20 may select an intra-prediction mode to which the mode signaled at the root of the quadtree is mapped. That is, video encoder 20 may include information that maps each of the modes of a large set of modes to modes of a smaller set, e.g., a subset of the large set, in a many-to-one correspondence. Video encoder 20 may then intra-predict one or more PUs for the CU using the intra-prediction mode from the smaller set. In this manner, video encoder 20 need only signal one intra-prediction mode for the LCU, although video encoder 20 may use multiple modes to intra-predict sub-CUs of the LCU without explicitly signaling each of the modes and the sub-CUs for which the modes are used. Therefore, multiple intra-prediction modes may be used without increasing the amount of information included in the bitstream, thereby reducing overhead. In another embodiment, a larger number of prediction directions may be allowed at the CU level to enable using the same intra-prediction mode for the LCU irrespective of sub-CU sizes or PU sizes.

Video encoder 20 may further be configured with edge-based prediction modes for predicting TUs in a CU that video encoder 20 determines include an edge. In general, an edge corresponds to a high-frequency change along a relatively straight line through the TU. For example, an edge may occur along the boundary of an object represented in the TU contrasted against a background also represented in the TU. To detect an edge in a TU, video encoder 20 may calculate gradients for pixels in the TU and determine whether the gradients identify a line though the TU. After determining that a current TU includes an edge, video encoder 20 may determine whether to use the edge-based prediction mode. If such an edge is detected, and when the edge-based prediction mode is selected, video encoder 20 may signal the use of the edge-based prediction mode using a value that would otherwise indicate use of DC prediction mode. That is, after detecting the presence of an edge in a current block, video encoder 20 may select an intra-prediction mode from a set including the edge-based prediction mode and other directional prediction modes (but excluding DC mode), and when the edge-based prediction mode is selected, signal the use of the edge-based prediction mode as if signaling use of the DC prediction mode.

Following intra-predictive or inter-predictive coding to produce predicted data for a TU of a CU, video encoder 20 may calculate residual data, comprising coefficients of the TUs representative of pixel-by-pixel differences between the predicted data and the original data for the TU. Video encoder 20 may form one or more TUs including residual data for the CU in this manner. Video encoder 20 may then transform the TUs. In accordance with the techniques of this disclosure, video encoder 20 may select a transform to apply to a TU based on an intra-prediction mode used to intra-mode predict data for the TU.

In some examples, video encoder 20 may include configuration data that provides a many-to-one mapping between a large set of intra-prediction modes, and a smaller set of intra-prediction modes. For example, video encoder 20 may include configuration data that provides a mapping between the 34 intra-prediction modes of HM and the nine intra-prediction modes of H.264. Moreover, video encoder 20 may include configuration data that provides a mapping between the smaller set of intra-prediction modes and directional transforms. The set of directional transforms may be the same size as the smaller set of intra-prediction modes, such that there is a one-to-one mapping between the smaller set of intra-prediction modes and the set of directional transforms. In this manner, the configuration data for video encoder 20 may provide an indirect, many-to-one mapping between the large set of intra-prediction modes and the set of directional transforms. Alternatively, in some examples, there may be a one-to-one mapping of the large set of directional transforms to a large set of directional transforms or other designed transforms, such as discrete cosine transforms, discrete sine transforms, or other conceptually similar transforms. In any case, using the mapping, video encoder 20 may select a transform for each TU based on the intra-prediction mode selected for a CU including the TU.

In some examples, there may be multiple directional transforms possible for a TU of a particular size. In some examples, video encoder 20 may signal a selected intra-prediction mode (e.g., a selected intra-prediction direction) at the root of a TU quadtree data structure corresponding to a CU (that is, a leaf-node CU in the CU quadtree), and the selected intra-prediction mode may apply to all TUs of the CU. If all TUs in the CU have sizes for which only one transform is possible, then video encoder 20 may proceed according to the example above, in which the transform can be derived from a signaled intra-prediction mode for the LCU. If at least one TU in the CU is of a size for which multiple transforms are possible, however, then video encoder 20 may select one of the possible transforms and signal the selected transform in the root node of the TU quadtree. Accordingly, video encoder 20 may use the signaled transform to transform each TU in the CU having a size associated with multiple possible transforms. In this manner, video encoder 20 may explicitly signal a transform, without consuming excess additional bandwidth.

In some examples, when video encoder 20 applies an edge-based intra-prediction mode to predict a value for a TU, video encoder 20 may select a transform to apply to the TU based on an angle of the edge. As discussed above, video encoder 20 may determine that an edge is present in a current TU based on detection of an edge in a neighboring TU that shares a boundary with the current TU. In accordance with the techniques of this disclosure, video encoder 20 may calculate a relative angle of the edge and use the angle of the edge to select a directional transform, in a manner similar to selecting a directional transform for an intra-prediction mode. For example, video encoder 20 may compare the angle of the edge to angles for the directional intra-prediction modes, determine a directional intra-prediction mode having an angle that is closest to the angle of the edge, and then transform the edge-based prediction mode-predicted TU using the transform that is mapped to the determined intra-prediction mode.

In some examples, video encoder 20 may be configured to apply more than one transform to a TU, which this disclosure refers to as a cascaded transform. For example, the first transform may correspond to a discrete cosine transform (DCT) or a Karhunen-Loève Transform (KLT), also generally referred to as a directional transform. When a directional transform is selected based on an intra-prediction mode mapped to the directional transform, the transform may be referred to as a mode-dependent directional transform (MDDT). This disclosure also refers to a transform selected based on an intra-prediction mode as a designed transform, which may include directional transforms, discrete cosine transforms, discrete sine transforms, or other conceptually similar transforms selected specifically for a prediction mode.

The second transform may correspond to a rotational transform. In some examples, video encoder 20 may be configured with multiple rotational transforms. Video encoder 20 may select one of the rotational transforms to apply through calculating Rate-Distortion costs for each of the rotational transforms, in some examples. Video encoder 20 may be configured to apply the rotational transform to a smaller number of coefficients than the first transform. In accordance with the techniques of this disclosure, video encoder 20 may include configuration data for mode-dependent rotational transforms (MDROT), including a column transform matrix and a row transform matrix. The intra-prediction modes may be mapped both to a first transforms, e.g., one of the MDDTs, as well as one of the rotational transforms, e.g., one of the MDROTs. Thus, a signaled intra-prediction mode for a CU may also provide an indication of a first transform to apply to a TU of the LCU and a second transform to apply to the TU. Although MDROTs are described as examples, it should be understood that the second transform may comprise other transforms, such as directional transforms, By transforming coefficients of a TU, video encoder 20 produces a matrix of transform coefficients. This matrix has the same size as the TU. In general, the transform process prepares the residual data for quantization, which further compresses the data. Quantization generally refers to a process in which the transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a vector that can be entropy encoded. For example, following a conventional transform or a mode-dependent transform, video encoder 20 may be configured to apply a zig-zag scan. Video encoder 20 may also be configured to apply a scan based on an intra-prediction mode and/or one or more transforms applied to the block. In some examples, video encoder 20 may perform an adaptive scan following transformation and quantization of coefficients of a TU. In some examples, video encoder 20 may comprise configuration data defining different scanning schemes for each possible transform scheme. For example, video encoder 20 may include configuration data comprising a one-to-one mapping between a set of directional transforms and a set of predefined scan patterns. The scan patterns may be defined based on empirical testing of scans following a particular directional transform, to optimize the placement of transform coefficients in the vector following the corresponding directional transform. Alternatively, video encoder 20 may include configuration data defining scan indices to which intra-prediction modes (or transform schemes) may be mapped, where the scan indices may indicate either predefined scans or adaptive scans.

Accordingly, each directional transform may have an associated scan pattern that is relatively optimized for that directional transform, based on empirical testing. As noted above, video encoder 20 need not signal the directional transform or scan pattern used for a particular TU, assuming that there is a mapping between an intra-prediction mode signaled in a TU quadtree for a CU including the TU and the directional transform and scan pattern. In various examples, the scan patterns can be dependent on a selected first transform (e.g., DCT or MDDT), selected second transform (e.g., MDROT, DCT, or other secondary separable transform), or a combination of both. In some examples, one of two cascaded transforms may comprise a designed transform applied in a particular direction (e.g., horizontal or vertical), and video encoder 20 may select a scan order generally corresponding to the same direction or an orthogonal direction, based on the configuration data.

In examples where video encoder 20 applies a cascaded transform to a TU, video encoder 20 may adaptively scan coefficients resulting from resulting from the cascaded transform. To perform an adaptive scan, video encoder 20 may generally track statistics indicative of whether a particular position in the matrix of transform coefficients is more or less likely to be significant (e.g., non-zero). Video encoder 20 may adapt the scan pattern over time such that the scan pattern corresponds to these statistical likelihoods. That is, the adaptive scan pattern may attempt to ensure that the transform coefficients having a relatively higher probability of being significant (e.g., non-zero) are scanned before transform coefficients having a relatively lower probability of being significant. Alternatively, video encoder 20 may select a scan index to which the cascaded transform is mapped.

Video encoder 20 may track scan statistics for each possible cascaded transform separately. For example, the likelihood that a particular coefficient location in the transform matrix may differ based on the first and second transforms applied during cascaded transformation. Therefore, video encoder 20 may track separate, independent sets of statistics for each possible cascaded transform. As an example, assuming intra-prediction modes are mapped to both an MDDT and an MDROT (or other secondary separable transform), video encoder 20 may track independent statistics for each combination of MDDT and MDROT (or other secondary transform) applied to TUs. As another example, video encoder 20 may be configured to perform cascaded transform only when video encoder 20 applies a DCT to a TU. Thus, video encoder 20 may perform adaptive scanning, and track independent statistics for performing adaptive scanning, based on a selected MDROT (or other secondary separable transform) for the TU applied following the DCT.

In some examples, whether using an adaptive scan or a predetermined scan, video encoder 20 may zero out coefficients in the array following the san. That is, video encoder 20 may set values for coefficients a positions N through the end of the array equal to zero. The value of N may relate to the size of the CU and/or the size of the TU. In some examples, video encoder 20 may zero out transform coefficients in the matrix prior to be scanned, e.g., all coefficients in the matrix other than the coefficients in the upper-left corner of the matrix.

After scanning the transform matrix to form a one-dimensional vector, video encoder 20 may entropy encode the one-dimensional vector, e.g., according to content adaptive variable length coding (CAVLC), context adaptive binary arithmetic coding (CABAC), syntax-based context-adaptive binary arithmetic coding (SBAC), or another entropy coding methodology.

To perform CAVLC, video encoder 20 may select a variable length code for a symbol to be transmitted. Codewords in VLC may be constructed such that relatively shorter codes correspond to more likely symbols, while longer codes correspond to less likely symbols. In this way, the use of VLC may achieve a bit savings over, for example, using equal-length codewords for each symbol to be transmitted.

To perform CABAC, video encoder 20 may select a context model to apply to a certain context to encode symbols to be transmitted. The context may relate to, for example, whether neighboring values are non-zero or not. Video encoder 20 may also entropy encode syntax elements, such as a significant coefficient flag and a last coefficient flag produced when performing an adaptive scan. In accordance with the techniques of this disclosure, video encoder 20 may select the context model used to encode these syntax elements based on, for example, an intra-prediction direction, a scan position of the coefficient corresponding to the syntax elements, block type, and/or transform type, among other factors used for context model selection.

Video decoder 30 may operate in a manner essentially symmetrical to that of video encoder 20. For example, video decoder 30 may receive entropy encoded data representative of an encoded CU, including encoded TU data. This received data may include information indicative of an intra-prediction mode used to encode the PU data, assuming the CU was intra-prediction encoded. Video decoder 30 may inverse entropy encode the received data, forming encoded quantization coefficients. When video encoder 20 entropy encodes data using a variable length code algorithm, video decoder 30 may use one or more VLC tables to determine a symbol corresponding to a received codeword. When video encoder 20 entropy encodes data using an arithmetic coding algorithm, video decoder 30 may use a context model to decode the data, which may correspond to the same context model used by video encoder 20 to encode the data.

Video decoder 30 may then inverse scan the decoded coefficients, using an inverse scan that mirrors the scan used by video encoder 20. To inverse adaptively scan the coefficients, video decoder 30 may decode syntax elements including significant coefficient flags and last coefficient flags to regenerate the statistics used by video encoder 20 to perform the adaptive scan. Video decoder 30 may thereby form a two-dimensional matrix, from the one-dimensional vector resulting from the entropy decoding process.

Next, video decoder 30 may inverse quantize the coefficients in the two-dimensional matrix produced by the inverse scan. Video decoder 30 may then apply one or more inverse transforms to the two-dimensional matrix. The inverse transforms may correspond to the transforms applied by video encoder 20. Video decoder 30 may determine the inverse transforms to apply based on, for example, the intra-prediction mode used to calculate coefficients for the TU, and if multiple transforms are available for a TU of a particular size, information signaled at the root of a TU quadtree corresponding to the CU including the TU currently being decoded. In this manner, video decoder 30 may select one or more inverse transforms to be applied to inverse quantized coefficients for a TU to reproduce the TU, based on an intra-prediction mode signaled for the TU. Moreover, video decoder 30 may calculate a predicted value for the TU using an intra-prediction mode corresponding to a signaled indication of the intra-prediction mode, e.g., in the TU quadtree. In some examples, video decoder 30 may determine that an edge is present in the TU, based on an edge detected in a neighboring TU, and, when a DC mode is signaled, instead use an edge-based mode to predict a value for the TU.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device, such as a cellular telephone.

Figure 2:
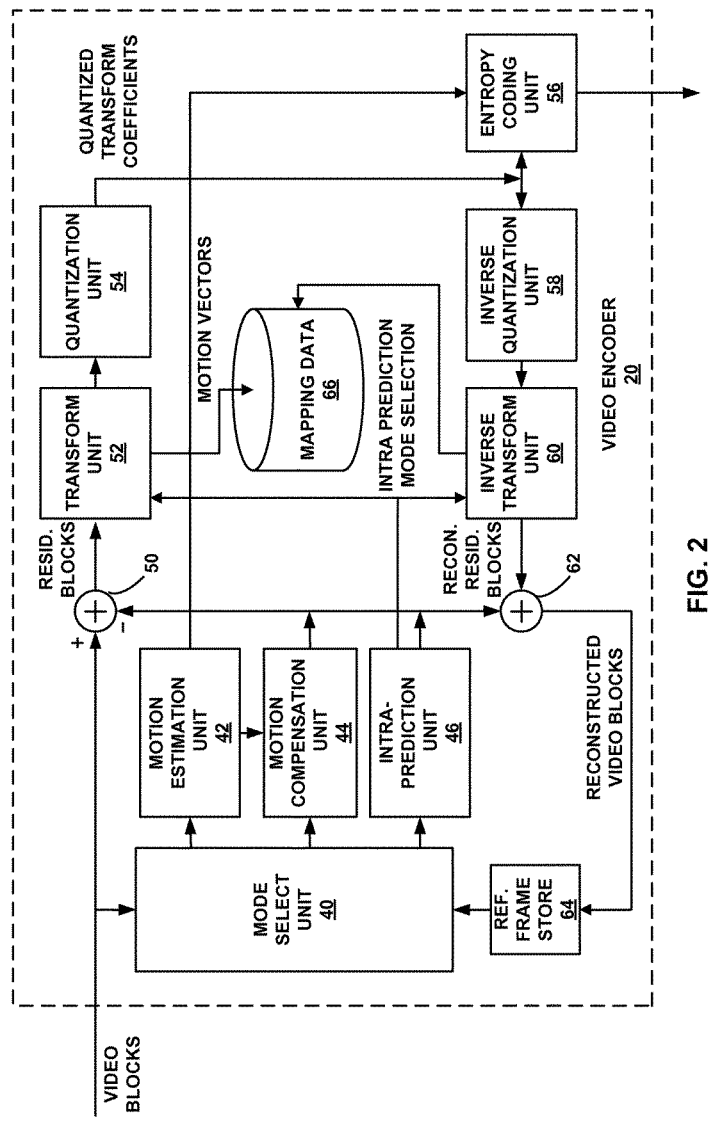
FIG. 2 is a block diagram illustrating an example of a video encoder that may implement any or all of the techniques for encoding transform units of video data described in this disclosure.

FIG. 2 is a block diagram illustrating an example of video encoder 20 that may implement any or all of the techniques for encoding transform units of video data described in this disclosure. Video encoder 20 may perform intra- and inter-coding of CUs within video frames. Intra-coding relies on spatial prediction to reduce or remove spatial redundancy in video within a given video frame. Inter-coding relies on temporal prediction to reduce or remove temporal redundancy between a current frame and previously coded frames of a video sequence. Intra-mode (I-mode) may refer to any of several spatial based compression modes and inter-modes such as uni-directional prediction (P-mode) or bi-directional prediction (B-mode) may refer to any of several temporal-based compression modes.

As shown in FIG. 2, video encoder 20 receives a current video block within a video frame to be encoded. In the example of FIG. 2, video encoder 20 includes motion compensation unit 44, motion estimation unit 42, intra-prediction unit 46, reference frame store 64, summer 50, transform unit 52, quantization unit 54, and entropy coding unit 56. Transform unit 52 illustrated in FIG. 2 is the unit that performs the actual transformation, not to be confused with a TU of a CU. For video block reconstruction, video encoder 20 also includes inverse quantization unit 58, inverse transform unit 60, and summer 62. In addition, video encoder 20 may include configuration data, such as mapping data 66. A deblocking filter (not shown in FIG. 2) may also be included to filter block boundaries to remove blockiness artifacts from reconstructed video. If desired, the deblocking filter would typically filter the output of summer 62.

During the encoding process, video encoder 20 receives a video frame or slice to be coded. The frame or slice may be divided into multiple video blocks, e.g., largest coding units (LCUs). Motion estimation unit 42 and motion compensation unit 44 perform inter-predictive coding of the received video block relative to one or more blocks in one or more reference frames to provide temporal compression. Intra-prediction unit 46 may perform intra-predictive coding of the received video block relative to one or more neighboring blocks in the same frame or slice as the block to be coded to provide spatial compression.

Mode select unit 40 may select one of the coding modes, intra or inter, e.g., based on error results (sometimes referred to as distortion), and provides the resulting intra- or inter-coded block to summer 50 to generate residual block data and to summer 62 to reconstruct the encoded block for use in a reference frame. Some video frames may be designated I-frames, where all blocks in an I-frame are encoded in an intra-prediction mode. In some cases, intra-prediction unit 46 may perform intra-prediction encoding of a block in a P- or B-frame, e.g., when motion search performed by motion estimation unit 42 does not result in a sufficient prediction of the block.

Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a prediction unit in a current frame relative to a reference sample of a reference frame. A reference sample is a block that is found to closely match the portion of the CU including the PU being coded in terms of pixel difference, which may be determined by sum of absolute difference (SAD), sum of square difference (SSD), or other difference metrics. Motion compensation, performed by motion compensation unit 44, may involve fetching or generating values for the prediction unit based on the motion vector determined by motion estimation. Again, motion estimation unit 42 and motion compensation unit 44 may be functionally integrated, in some examples.

Motion estimation unit 42 calculates a motion vector for a prediction unit of an inter-coded frame by comparing the prediction unit to reference samples of a reference frame stored in reference frame store 64. In some examples, video encoder 20 may calculate values for sub-integer pixel positions of reference frames stored in reference frame store 64. For example, video encoder 20 may calculate values of one-quarter pixel positions, one-eighth pixel positions, or other fractional pixel positions of the reference frame. Therefore, motion estimation unit 42 may perform a motion search relative to the full pixel positions and fractional pixel positions and output a motion vector with fractional pixel precision. Motion estimation unit 42 sends the calculated motion vector to entropy coding unit 56 and motion compensation unit 44. The portion of the reference frame identified by a motion vector may be referred to as a reference sample. Motion compensation unit 44 may calculate a prediction value for a prediction unit of a current CU, e.g., by retrieving the reference sample identified by a motion vector for the PU.

Intra-prediction unit 46 may intra-prediction encode the received block, as an alternative to inter-prediction performed by motion estimation unit 42 and motion compensation unit 44. Intra-prediction unit 46 may encode the received block relative to neighboring, previously coded blocks, e.g., blocks above, above and to the right, above and to the left, or to the left of the current block, assuming a left-to-right, top-to-bottom encoding order for blocks (such as a raster scan ordering). Intra-prediction unit 46 may be configured with a variety of different intra-prediction modes. For example, intra-prediction unit 46 may be configured with a certain number of directional prediction modes, e.g., 34 directional prediction modes, based on the size of the CU being encoded.

Intra-prediction unit 46 may select an intra-prediction mode by, for example, calculating error values for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, intra-prediction unit 46 may calculate an error value for the prediction mode based on pixel differences between the PU and the received block to be encoded. Intra-prediction unit 46 may continue testing intra-prediction modes until an intra-prediction mode that yields an acceptable error value is discovered. Intra-prediction unit 46 may then send the PU to summer 50.

In accordance with the techniques of this disclosure, intra-prediction unit 46 may be configured to predict a block including an edge using an edge-based prediction mode. In particular, intra-prediction unit 46 may analyze pixels of neighboring, previously coded blocks to determine whether an edge is detected in at least one of the neighboring blocks, and whether the edge crosses a border between the previously coded block and the current block. To detect the edge, intra-prediction unit 46 may calculate gradients for pixels in the neighboring, previously coded blocks in both the horizontal and vertical directions. When the gradients for a plurality of pixels in one of the neighboring blocks are relatively perpendicular to a common line that crosses a border between the neighboring block and the current block, intra-prediction unit 46 may determine that the current block also includes an edge (in particular, an edge along the line detected as described above). It should be understood that the term "edge" in this context refers to a high frequency change along a relatively straight line within a block of pixels, and not to the border or boundary between separately coded blocks.

Accordingly, when an edge is detected in the block, intra-prediction unit 46 may determine whether to predict the block using an edge-based prediction mode or a directional intra-prediction mode. When intra-prediction unit 46 selects the edge-based prediction mode, intra-prediction unit 46 may signal that DC prediction mode was used to predict the block, in order to avoid increasing the number of values needed to signal intra-prediction modes. Thus, as discussed in greater detail with respect to FIG. 3, a video decoder such as video decoder 30 may be configured to interpret an indication (e.g., a signal or syntax information) that DC prediction mode was used to predict a block as an indication of an edge-based prediction mode when the video decoder determines that an edge is present in the block.

Video encoder 20 forms a residual block by subtracting the prediction data calculated by motion compensation unit 44 or intra-prediction unit 46 from the original video block being coded. Summer 50 represents the component or components that perform this subtraction operation. The residual block may correspond to a two-dimensional matrix of values, where the number of values in the residual block is the same as the number of pixels in the PU corresponding to the residual block. The values in the residual block may correspond to the differences between collocated pixels in the PU and in the original block to be coded.

Transform unit 52 may form one or more transform units (TUs) from the residual block. Transform unit 52 applies a transform, such as a discrete cosine transform (DCT), a directional transform, or a conceptually similar transform, to the TU, producing a video block comprising transform coefficients. In accordance with the techniques of this disclosure, intra-prediction unit 46 may send an indication of the intra-prediction mode selected for the TU to transform unit 52, e.g., by signaling the mode in a node of a TU quadtree corresponding to the TU. Accordingly, transform unit 52 may select a transform to apply to the TU based on the indication of the intra-prediction mode received from intra-prediction unit 46.

In some examples, transform unit 52 is configured to select a transform, such as a directional transform, to apply to the TU based on an intra-prediction mode used to predict the TU. That is, mapping data 66 may store configuration data that describes a transform to be applied based on the intra-prediction mode used to predict the TU. In this manner, transform unit 52 may transform a residual block using a transform mapped to an intra-prediction mode used to calculate the residual block. Likewise, mapping data 66 may map an intra-prediction mode, a transform, or both, to a particular scan index, which may be used to select a scan to be applied to quantized transform coefficients of the block.

In some examples, mapping data 66 may store configuration data including a many-to-one mapping between a large set of intra-prediction modes and a smaller set of intra-prediction modes. The smaller set may comprise a subset of the intra-prediction modes. In some examples, the large set may comprise intra-prediction modes supported by the HEVC Test Model, while the smaller set may comprise intra-prediction modes supported by H.264. Mapping data 66 may also include a mapping, such as a one-to-one mapping, between the smaller set of intra-prediction modes and transforms. The smaller set of intra-prediction modes may be one-to-one mapped to directional transforms that are designed to provide the empirically best transform results for the corresponding intra-prediction mode.

In some examples, intra-prediction modes of the large set and of the smaller set may be associated with respective prediction angles. The mapping between the large set of prediction modes and the smaller set may therefore be determined by selecting a prediction angle of one of the intra-prediction modes in the smaller set that approximates the prediction angle of an intra-prediction modes of the large set. Let $\alpha$ represent the prediction angle of one of the intra-prediction modes of the large set, and let $\beta i$ represent the prediction angle of the $i^{th}$ intra-prediction mode of the smaller set. To map the intra-prediction mode to one of the intra-prediction modes of the smaller set, video encoder 20 may, given $\alpha$, find $\beta i$ such that equation 1 below is satisfied:

$$\arg_{\{\beta i\}} \min(\min(abs(\alpha-\beta i), abs(-\alpha-\beta i))) \quad (1)$$

Transform unit 52 may receive the indication of the selected intra-prediction mode from intra-prediction unit 46, then query mapping data 66 to determine a transform to use to transform a TU including the residual values received from summer 50. If the TU is of a size for which multiple possible transforms are possible, transform unit 52 or another unit of video encoder 20 may select a transform for TUs of that size, such that transform unit 52 may apply the same transform to all TUs of that size in the same CU. In some examples, transform unit 52 may further be configured to perform a rotational transform cascaded from the first transform. That is, following the first transform, transform unit 52 may select and apply a rotational transform to the transform coefficients. Transform unit 52 may select the rotational transform based on, for example, the intra-prediction mode used to predict the PU for the current TU.

As discussed above, in some examples, intra-prediction unit 46 is configured to determine whether a block includes an edge (that is, a high-frequency change between pixels within the block). When an edge is detected, intra-prediction unit 46 may select either an edge-based prediction mode or a conventional directional intra-prediction mode. That is, intra-prediction unit 46 may substitute DC prediction mode for the edge-based prediction mode. In some examples, when the block is predicted using the edge-based prediction mode, transform unit 52 selects a transform (such as a directional transform) mapped to the direction of an intra-prediction mode having an angle that closely approximates an angle of the edge. That is, transform unit 52 in some examples determines an angle of the edge within the block and selects a transform that is mapped to a directional intra-prediction mode having an angle that closely approximates (e.g., has a minimum distance relative to) the angle of the edge. In some examples, transform unit 52 is configured to select a transform that is mapped to a directional intra-prediction mode having an angle that closely approximates the angle of an edge detected in a block.

Video encoder 20 may also signal the use of the edge-based prediction mode using a value that would otherwise be used to signal use of DC prediction mode. Thus, although DC prediction mode is signaled, the edge-based prediction mode may be used to predict the block. Likewise, although the edge-based prediction mode may be used to predict the block, transform unit 52 may use the transform mapped to the intra-prediction mode having an angle that approximates the angle of the edge detected in the block.

Mapping data 66 may provide configuration data that indicates that when an edge is detected in a block for which DC prediction mode is signaled, transform unit 52 is to select a transform having an angle that approximates the angle of the edge. Moreover, as discussed above, mapping data 66 may include a mapping from intra-prediction modes and angles for the intra-prediction modes (which may define the intra-prediction modes) to directional transforms. Accordingly, transform unit 52 may query mapping data 66 to determine an intra-prediction mode having an angle that closely approximates the angle of an edge in a block, as well as to determine the transform that is mapped to the determined intra-prediction mode.

In this manner, video encoder 20 is an example of a video encoder configured to calculate a residual block for a block of video data based on a predicted block formed using an intra-prediction mode, and transform the residual block using a transform mapped to the intra-prediction mode. Video encoder 20 is also an example of a video encoder configured to receive an indication of a first intra-prediction mode in a first set of intra-prediction modes for a block of video data, determine a second intra-prediction mode from a smaller set of intra-prediction modes to which the first intra-prediction mode is mapped, determine a directional transform to which the second intra-prediction mode is mapped, and apply the directional transform to residual data of the block.

Furthermore, video encoder 20 is also an example of a video encoder configured to select an intra-prediction mode to use to encode a block of video data, determine whether the block includes a sub-block of a size for which multiple transforms are possible based on the size of the sub-block and the selected intra-prediction mode, when the block includes the sub-block of the size for which multiple transforms are possible based on the size of the sub-block and the selected intra-prediction mode, select one of the multiple possible transforms, transform the sub-block using the selected one of the multiple possible transforms, and provide an indication of the selected one of the multiple possible transforms for the size of the block.

Moreover, video encoder 20 is an example of a video encoder configured to determine that a block to be intra-prediction encoded contains an edge within the block, calculate a residual block for the block based on a prediction value calculated using an edge directed intra-prediction mode, transform the residual block using a directional transform mapped to a directional intra-prediction mode having an angle that approximates an angle of the edge, and output information representative of the transformed residual block and information indicating that the block was predicted using a DC intra-prediction mode.

Transform unit 52 may send the resulting transform coefficients to quantization unit 54. Quantization unit 54 may then quantize the transform coefficients. In some examples, quantization unit 54 may then perform a scan of the matrix including the quantized transform coefficients. Alternatively, entropy coding unit 56 may perform the scan. This disclosure describes entropy coding unit 56 as performing the scan, although it should be understood that, in other examples, other processing units, such as quantization unit 54, may perform the scan.

In some examples, entropy coding unit 56 may receive an indication of the selected intra-prediction mode from intra-prediction unit 46 or from transform unit 52. Entropy coding unit 56 may select a scan to apply to the matrix of transform coefficients, to convert the two-dimensional matrix into a one-dimensional vector. In some examples, entropy coding unit 56 selects a scan from a predetermined set of scans. Mapping data 66 may map the smaller set of intra-prediction modes to the predetermined set of scans. Entropy coding unit 56 may select the scan based on various characteristics of the current TU, such as, for example, block type (inter or intra), the intra-prediction mode (assuming an intra-coded block), and/or a type of transform applied to the TU (e.g., DCT or KLT).

In some examples, entropy coding unit 56 may be configured to perform an adaptive scan. Initially (e.g., for a first TU of a current frame), entropy coding unit 56 may use a predetermined scan pattern. Over time, entropy coding unit 56 may update the scan pattern to perform the adaptive scan. In general, the goal of the adaptive scan is to determine a probability that a particular transform coefficient will be non-zero. Then, the scan order generally proceeds from coefficients with the highest probability of being non-zero to the lowest probability of being non-zero. Entropy coding unit 56 may determine these probabilities over time using various statistics and calculations. Moreover, entropy coding unit 56 may track separate statistics for each intra-prediction mode, transform, cascaded transform, or any combination thereof.

Entropy coding unit 56 may use a high-dynamic-range table and dynamically-updating scan tables to determine the probabilities of transform coefficients being non-zero, and to determine the adaptive scan order. Assuming an N×N TU, each of these tables may be N×N tables with values corresponding to the transform coefficients of the TU. The high-dynamic-range table may be a fixed, pre-determined table providing probabilities that each transform coefficient is non-zero. This table may be calculated based on a set of training data. Moreover, this table may be used to provide the starting point for the adaptive scan order.

Entropy coding unit 56 may update the dynamically-updating scan table over time to reflect recently determined statistics for transform coefficients. Entropy coding unit 56 may keep a count of the number of times each coefficient in a particular location in the N×N transform matrix is non-zero. That is, for each TU of a current frame, entropy coding unit 56 may increment values in the dynamically-updating scan table corresponding to non-zero coefficients in the current transform block, specifically, in the dynamically-updating scan table associated with the intra-prediction mode, transform, and/or cascaded transform for the current CU. For example, if the transform coefficient in row 2 and column 1 is non-zero, entropy coding unit 56 may add one to the value in the dynamically updating scan table in row 2 and column 1. Entropy coding unit 56 may also periodically normalize the values in the dynamically-updating scan table, to prevent the values from exceeding a maximum value.

To perform the adaptive scan for a first TU of a current frame, entropy coding unit 56 may scan based on the high-dynamic-range table alone. Entropy coding unit 56 may also initialize the dynamically-updating scan table by, e.g., setting all values in the dynamically-updating scan table to zero. For each non-zero coefficient in the transform block, entropy coding unit 56 may add one to the collocated value in the dynamically-updating scan table associated with the intra-prediction mode and transform or cascaded transform for the current TU. For subsequent TUs using the same intra-prediction mode and transform or cascaded transform, entropy coding unit 56 may first refer to the dynamically-updating scan table to determine which of the transform coefficients is most likely to be non-zero, then scan in order of decreasing likelihood of coefficients being non-zero. In some cases, two or more values in the dynamically-updating scan table may be equal. In such a case, entropy coding unit 56 refers to the high-dynamic-range table to determine which coefficient to scan next. In this manner, entropy coding unit 56 may perform an adaptive scan for each intra-prediction mode, transform, or cascaded transform (or any combination thereof) based on a combination of a high-dynamic-range table and a dynamically-updating scan table.

By scanning the two-dimensional matrix of transform coefficients, entropy coding unit 56 may produce a one-dimensional array including the transform coefficients. Entropy coding unit 56 may then scan the TU to form an array and quantize the transform coefficients in the array following the scan to further reduce bit rate. The quantization process may reduce the bit depth associated with some or all of the coefficients. The degree of quantization may be modified by adjusting a quantization parameter.

Entropy coding unit 56 may also entropy encode syntax elements for the coefficients of the matrix prior to or during the adaptive scan. The syntax elements may include a significant coefficient flag that indicates whether a particular coefficient is significant (e.g., non-zero) and a last coefficient flag that indicates whether a particular coefficient is the last coefficient scanned in the adaptive scan. A video decoder may use these syntax elements to reconstruct the dynamically updating scan table, such that the video decoder can inverse scan the coefficients encoded by entropy coding unit 56.

To entropy encode the syntax elements, entropy coding unit 56 may perform CABAC and select context models based on, for example, the number of significant coefficients in the previously scanned N coefficients, where N is an integer value that may be related to the size of the block being scanned. Entropy coding unit 56 may also select the context model based on a prediction mode used to calculate residual data that was transformed into the block of transform coefficients, and a type of transform used to transform the residual data into the block of transform coefficients. When the corresponding prediction data was predicted using an intra-prediction mode, entropy coding unit 56 may further base the selection of the context model on the direction of the intra-prediction mode.

In this manner, video encoder 20 represents an example of a video encoder configured to transform residual data for a block of video data using a first transform to produce an intermediate, two-dimensional block of transform coefficients, transform the intermediate, two-dimensional block of transform coefficients using a rotational transform to produce a two-dimensional block of transform coefficients, select a set of statistics associated with at least one of the first transform and the rotational transform, wherein the set of statistics provides likelihoods that locations in the two-dimensional block of transform coefficients will be non-zero, and adaptively scan the two-dimensional block of transform coefficients based on the selected set of statistics.

Video encoder 20 also represents an example of a video encoder configured to scan a two-dimensional block of transform coefficients to produce a one-dimensional vector of the transform coefficients, determine values indicative of whether the transform coefficients in the one-dimensional vector are significant, and entropy encode at least one of the values using a context model selected based on at least a percentage of significant coefficients in a predetermined number of the values encoded before the at least one of the values.

In some examples, transform unit 52 may be configured to zero out certain transform coefficients (that is, transform coefficients in certain locations). For example, transform unit 52 may be configured to zero out all transform coefficients outside of the upper-left quadrant of the TU following the transform. As another example, entropy coding unit 56 may be configured to zero out transform coefficients in the array following a certain position in the array. In some examples, entropy coding unit 56 may quantize a two-dimensional matrix, and entropy coding unit 56 may perform the scan. In any case, video encoder 20 may be configured to zero out a certain portion of the transform coefficients, e.g., before or after the scan. The phrase "zero out" is used to mean setting the value of the coefficient equal to zero, but not necessarily skipping or discarding the coefficient.

Following quantization, entropy coding unit 56 entropy codes the quantized transform coefficients. For example, entropy coding unit 56 may perform content adaptive variable length coding (CAVLC), context adaptive binary arithmetic coding (CABAC), or another entropy coding technique. Following the entropy coding by entropy coding unit 56, the encoded video may be transmitted to another device or archived for later transmission or retrieval. In the case of context adaptive binary arithmetic coding, context may be based on neighboring blocks.

In some cases, entropy coding unit 56 or another unit of video encoder 20 may be configured to perform other coding functions, in addition to entropy coding. For example, entropy coding unit 56 may be configured to determine coded block pattern (CBP) values for the blocks. Also, in some cases, entropy coding unit 56 may perform run length coding of the coefficients in a block.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame store 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame store 64. The reconstructed video block may be used by motion estimation unit 42 and motion compensation unit 44 as a reference block to inter-code a block in a subsequent video frame.

Figure 3:
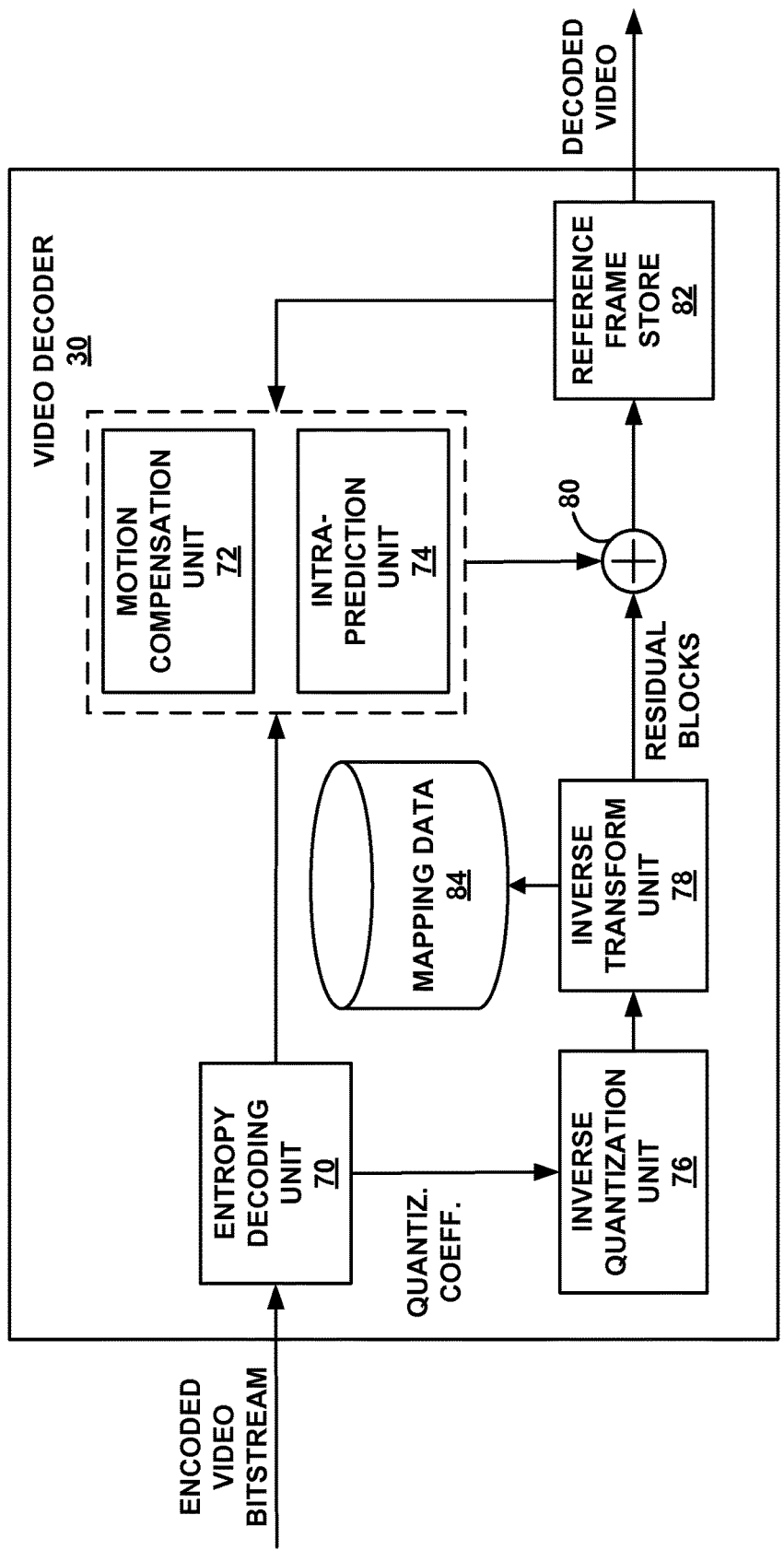
FIG. 3 is a block diagram illustrating an example of a video decoder, which decodes an encoded video sequence.

FIG. 3 is a block diagram illustrating an example of video decoder 30, which decodes an encoded video sequence. In the example of FIG. 3, video decoder 30 includes an entropy decoding unit 70, motion compensation unit 72, intra prediction unit 74, inverse quantization unit 76, inverse transformation unit 78, reference frame store 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70. Intra-prediction unit 74 may generate prediction data for a current block of a current frame based on a signaled intra-prediction mode and data from previously decoded blocks of the current frame.

In some examples, entropy decoding unit 70 or inverse quantization unit 76 may scan the received values using a scan mirroring that used by video encoder 20. In the example of FIG. 3, video decoder 30 includes mapping data 84, which may include data similar or identical to that of mapping data 66. Accordingly, video decoder 30 may select a scan based on, for example, an indication of an intra-coding mode for a current block (e.g., presented at the root node of a quadtree for the LCU including the current block), a transform for the current block, a cascaded transform for the current block, or the other factors used by video encoder 20 to select the scan. Likewise, video decoder 30 may be configured to perform an adaptive scan, or to select a predetermined scan based on these factors. In this manner, video decoder 30 may produce a two-dimensional matrix of quantized transform coefficients from a received, one dimensional array of coefficients.

Inverse quantization unit 76 inverse quantizes, i.e., de-quantizes, the quantized transform coefficients provided in the bitstream and decoded by entropy decoding unit 70. The inverse quantization process may include a conventional process, e.g., as defined by the H.264 decoding standard or by HEVC. The inverse quantization process may include use of a quantization parameter $QP_Y$ calculated by video encoder 20 for the CU to determine a degree of quantization and, likewise, a degree of inverse quantization that should be applied.

Inverse transform unit 58 applies an inverse transform, e.g., an inverse DCT, an inverse integer transform, an inverse rotational transform, or an inverse directional transform. In some examples, inverse transform unit 78 may determine an inverse transform based on an intra-prediction mode signaled for a received intra-prediction encoded block. If the block is of a size for which more than one transform is possible, based on the intra-prediction mode, then inverse transform unit 78 may determine a transform to apply to the current block based on a signaled transform at the root node of a quadtree for an LCU including the current block. In some examples, inverse transform unit 78 may apply a cascaded inverse transform, e.g., first an inverse rotational transform followed by an inverse directional transform.

In some examples, e.g., where the signaled intra-prediction mode is DC prediction mode, inverse transform unit 58 (or another unit of video decoder 30) may determine whether an edge is present in the current block. Inverse transform unit 58 may determine whether the edge is present using techniques that correspond substantially to those described with respect to video encoder 20 of FIG. 2. If an edge is present in the current block, inverse transform unit 78 may determine an angle of the edge within the block and select an inverse transform that is mapped to an intra-prediction mode having an angle that approximates the angle of the edge.

As discussed above, mapping data 84 may provide angles for intra-prediction modes and mappings between intra-prediction modes and inverse transforms. Accordingly, inverse transform unit 78 may query mapping data 84 to determine an inverse transform mapped to an intra-prediction mode having an angle that closely approximates the angle of the edge, when DC prediction mode is signaled. Furthermore, intra-prediction unit 74 may apply an edge-based prediction mode to predict the block, rather than DC prediction mode as signaled for the block, when the edge is detected in the block. Mapping data 84 may also provide a mapping from an intra-prediction mode, a secondary transform such as a rotational transform, or a combination thereof, to a scan index, to select an inverse scan for received quantized transform coefficients.

Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Motion compensation unit 72 and intra-prediction unit 74 use some of the syntax information (e.g., provided by a quadtree) to determine sizes of LCUs used to encode frame(s) of the encoded video sequence, split information that describes how each CU of a frame of the encoded video sequence is split (and likewise, how sub-CUs are split), modes indicating how each split is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence.

Summer 80 combines the residual blocks with the corresponding prediction blocks generated by motion compensation unit 72 or intra-prediction unit 74 to form decoded blocks. If desired, a deblocking filter may also be applied to filter the decoded blocks in order to remove blockiness artifacts. The decoded video blocks are then stored in reference frame store 82, which provides reference blocks for subsequent motion compensation and also produces decoded video for presentation on a display device (such as display device 32 of FIG. 1).

In this manner, video decoder 30 is an example of a video decoder configured to determine an intra-prediction mode to be used to predict a block of video data, and to inverse transform transformed residual data of the block using an inverse transform mapped to the intra-prediction mode. Video decoder 30 is also an example of a video decoder configured to receive an indication of a first intra-prediction mode in a first set of intra-prediction modes for a block of encoded video data, determine a second intra-prediction mode from a smaller set of intra-prediction modes to which the first intra-prediction mode is mapped, determine an inverse directional transform to which the second intra-prediction mode is mapped, and apply the inverse directional transform to transformed residual data of the block.

Video decoder 30 is also an example of a video decoder configured to receive a first indication of an intra-prediction mode to use to decode a block of video data, determine whether the block includes a sub-block of a size for which multiple transforms are possible based on the size of the sub-block and the indicated intra-prediction mode, when the block includes the sub-block of the size for which multiple inverse transforms are possible based on the size of the sub-block and the indicated intra-prediction mode, receive a second indication of one of the multiple possible inverse transforms, and inverse transform the sub-block using the indicated one of the multiple possible inverse transforms.

Video decoder 30 is also an example of a video decoder configured to receive values indicative of whether encoded transform coefficients in a received one-dimensional vector of encoded transform coefficients are significant, entropy decode at least one of the values using a context model selected based on at least a percentage of significant coefficients in a predetermined number of the values decoded before the at least one of the values, and inverse scan the one-dimensional vector to produce two-dimensional block of the transform coefficients.

Video decoder 30 is also an example of a video decoder configured to receive an indication that residual data for a block of video data was transformed using both a first transform and a rotational transform to produce a two-dimensional block of transform coefficients, select a set of statistics associated with at least one of the first transform and the rotational transform, wherein the set of statistics provides likelihoods that locations in the two-dimensional block of transform coefficients will be non-zero, and adaptively inverse scanning a received one-dimensional vector including an encoded version of the residual data for the block based on the selected set of statistics to produce a two-dimensional matrix of transform coefficients for the block.

Video decoder 30 is further an example of a video decoder configured to receive information indicating that an intra-prediction mode for a block of video data is a DC intra-prediction mode, determine an angle for an edge in the block of video data based on the indication of the DC intra-prediction mode for the block, inverse transform the block using a directional inverse transform mapped to a directional intra-prediction mode having an angle that approximates the angle of the edge, and decode the inverse transformed block.

Figure 4:
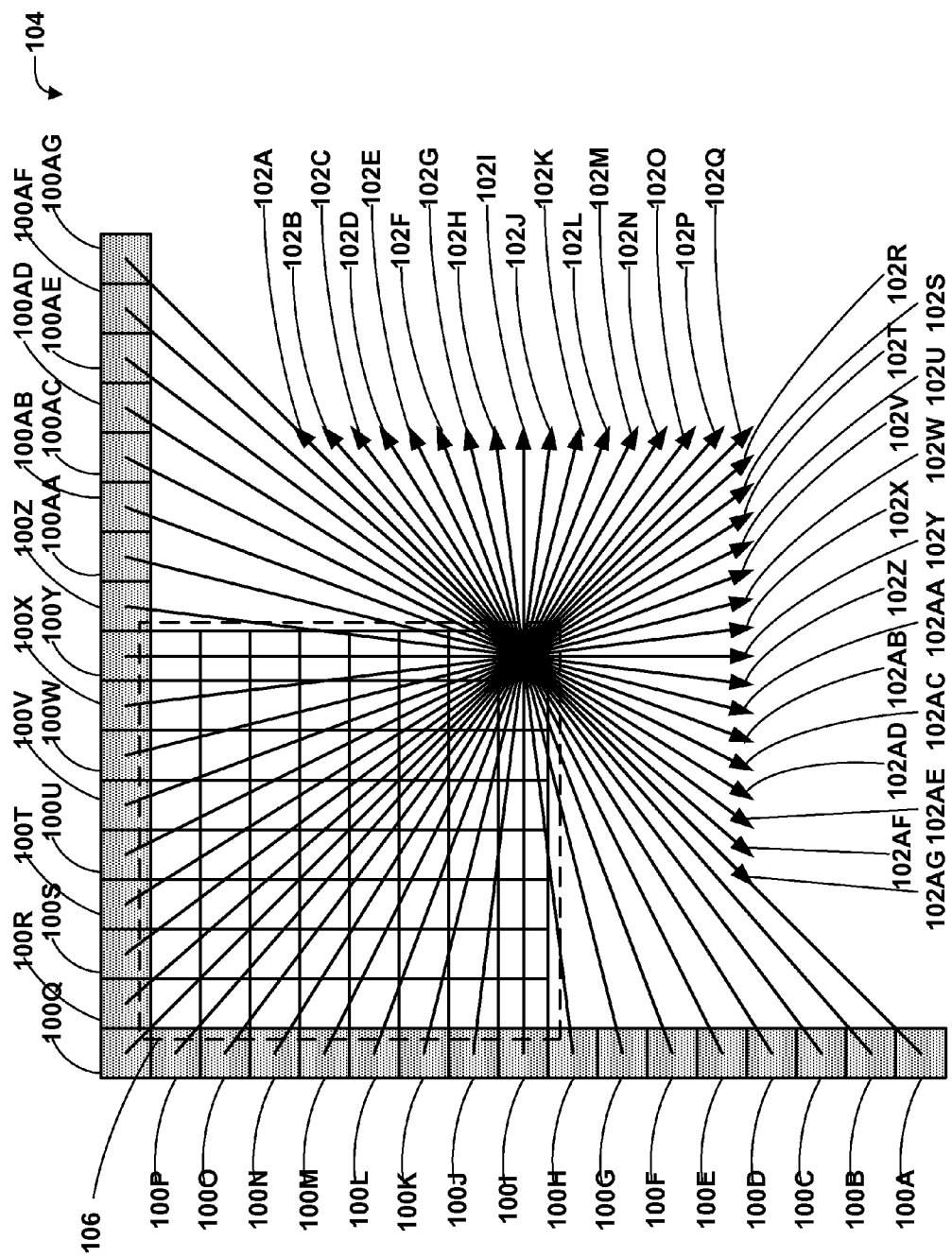
FIG. 4 is a conceptual diagram illustrating a graph that depicts an example set of prediction directions associated with various intra-prediction modes.

FIG. 4 is a conceptual diagram illustrating graph 104 depicting an example set of directions associated with intra-prediction modes. In the example of FIG. 4, block 106 can be predicted from neighboring pixels 100A-100AG (neighboring pixels 100) depending on a selected intra-prediction mode. Arrows 102A-102AG (arrows 102) are representative of directions or angles associated with various intra-prediction modes. The example of FIG. 4 is representative of intra-prediction modes provided by the HM. However, in other examples, more or fewer intra-prediction modes may be provided. Although the example of block 106 is an 8×8 pixel block, in general, a block may have any number of pixels, e.g., 4×4, 8×8, 16×16, 32×32, 64×64, 128×128, etc. Although the HM provides for square PUs, the techniques of this disclosure may also be applied to other block sizes, e.g., N×M blocks, where N is not necessarily equal to M.

An intra-prediction mode may be defined according to an angle of the prediction direction relative to, for example, a horizontal axis that is perpendicular to the vertical sides of block 106. Thus, each of arrows 102 may represent a particular angle of a prediction direction of a corresponding intra-prediction mode. In some examples, an intra-prediction direction mode may be defined by an integer pair (dx, dy), which may represent the direction the corresponding intra-prediction mode uses for context pixel extrapolation. That is, the angle of the intra-prediction mode may be calculated as dy/dx. In other words, the angle may be represented according to the horizontal offset dx and the vertical offset dy. The value of a pixel at location (x, y) in block 106 may be determined from the one of neighboring pixels 100 through which a line passes that also passes through location (x, y) with an angle of dy/dx.

In some examples, each of the intra-prediction modes corresponding to angles represented by arrows 102 may be mapped to a particular transform. Two or more intra-prediction modes may be mapped to the same transform, in some examples. The transforms may correspond to directional transforms, KLTs, rotational transforms, discrete cosine transforms, discrete sine transforms, Fourier transforms, or other transforms that are specifically selected for particular intra-prediction modes. Such transforms may be generally referred to as "designed" transforms, in that the transforms are selected for particular intra-prediction modes.

As discussed above, in some examples, a set of intra-prediction modes may be mapped, by a many-to-one correspondence, to a smaller set, e.g., a subset, of intra-prediction modes. Stated another way, the angles for the intra-prediction modes in a large set of modes may be mapped to the angles of intra-prediction modes in a smaller set of modes. In some examples, the mapping may be realized using a mathematical formula. For example, the formula may provide a mapping that minimizes the absolute prediction angle difference between the actual prediction direction angle, referred to here as α, and prediction direction angles of a smaller set of intra-prediction modes, referred to here as βi's. Given a prediction direction angle α, the formula may provide a βi such that formula (1) above is satisfied. Formula (1) is restated below for convenience:

$$\arg_{\{\beta i\}}\min(\min(\text{abs}(\alpha-\beta i),\text{abs}(-\alpha-\beta i))) \qquad (1)$$

In one example, the smaller set of intra-prediction modes may have angles that are the same as arrows 102E, 102I, 102M, 102Q, 102U, 102Y, 102AC, and 102AG. Thus, each of the angles of arrows 102 may be mapped to one of the angles for arrows 102E, 102I, 102M, 102Q, 102U, 102Y, 102AC, and 102AG. As one example, angles for arrows 102A-102E may be mapped to the angle for arrow 102E, angles for arrows 102F-102I may be mapped to the angle for arrow 102I, angles for arrows 102J-102M may be mapped to the angle for arrow 102M, angles for arrows 102N-102Q may be mapped to the angle for arrow 102Q, angles for arrows 102R-102U may be mapped to the angle for arrow 102U, angles for arrows 102V-102Y may be mapped to the angle for arrow 102Y, angles for arrows 102Z-102AC may be mapped to the angle for arrow 102AC, and angles for arrows 102AD-102AG may be mapped to the angle for arrow 102AG.

Other mappings may also be provided. In some examples, video encoder 20 and video decoder 30 may be configured with a variety of different mappings, and video encoder 20 may provide information indicative of the mapping used for a particular bitstream, e.g., in header data, a sequence parameter set (SPS), or other signaled data.

As discussed above, in some examples, a video coding device (such as video encoder 20 or video decoder 30) may be configured to determine whether an edge is present in a block. For example, the video coding device may be configured to determine whether an edge is present in block 106 based on an analysis of pixels of one or more neighboring blocks, where the neighboring blocks may include one or more of neighboring pixels 100. In general, a neighboring, previously coded block may share a border with block 106, where the border may correspond to one or more of neighboring pixels 100. For example, a left-neighboring block to block 106 may include neighboring pixels 100I-100P, which define a border between the left-neighboring block and block 106.

The video coding device may be configured to calculate gradients for pixels in a neighboring, previously coded block to determine whether an edge is present in the neighboring, previously coded block. The video coding device may further determine whether the edge crosses (that is, intersects) a border between the neighboring, previously coded block and a current block, such as block 106. With respect to the example of the left-neighboring block to block 106 described above, the video coding device may determine whether gradients for pixels in the left-neighboring block indicate the presence of an edge that intersects the border between the left-neighboring block and block 106, where the border is defined by pixels 100I-100P, in this example. When the video coding device determines that gradients for pixels in the left-neighboring block indicate the presence of an edge and that the edge crosses the border defined by pixels 100I-100P, the video coding device may determine that the edge proceeds into block 106, and as such, that block 106 includes an edge.

In some examples, when the video coding device determines that a signaled intra-prediction mode for block 106 is DC prediction mode, and that block 106 includes an edge, the video coding device may predict block 106 using an edge-based intra-prediction mode. Moreover, the video coding device may determine an angle of the edge. The video coding device may then determine an angle of a prediction mode, generally indicated by arrows 102, that most closely approximates the angle of the edge. The video coding device may then select a transform (which may correspond to an inverse transform when decoding) that is mapped to the intra-prediction mode having the angle that most closely approximates the angle of the edge, and apply the selected transform to residual data of block 106. During an encoding process, the video coding device may apply the transform to a TU of block 106, whereas during a decoding process, the video coding device may apply an inverse transform to transformed residual data for block 106.

Figure 5:
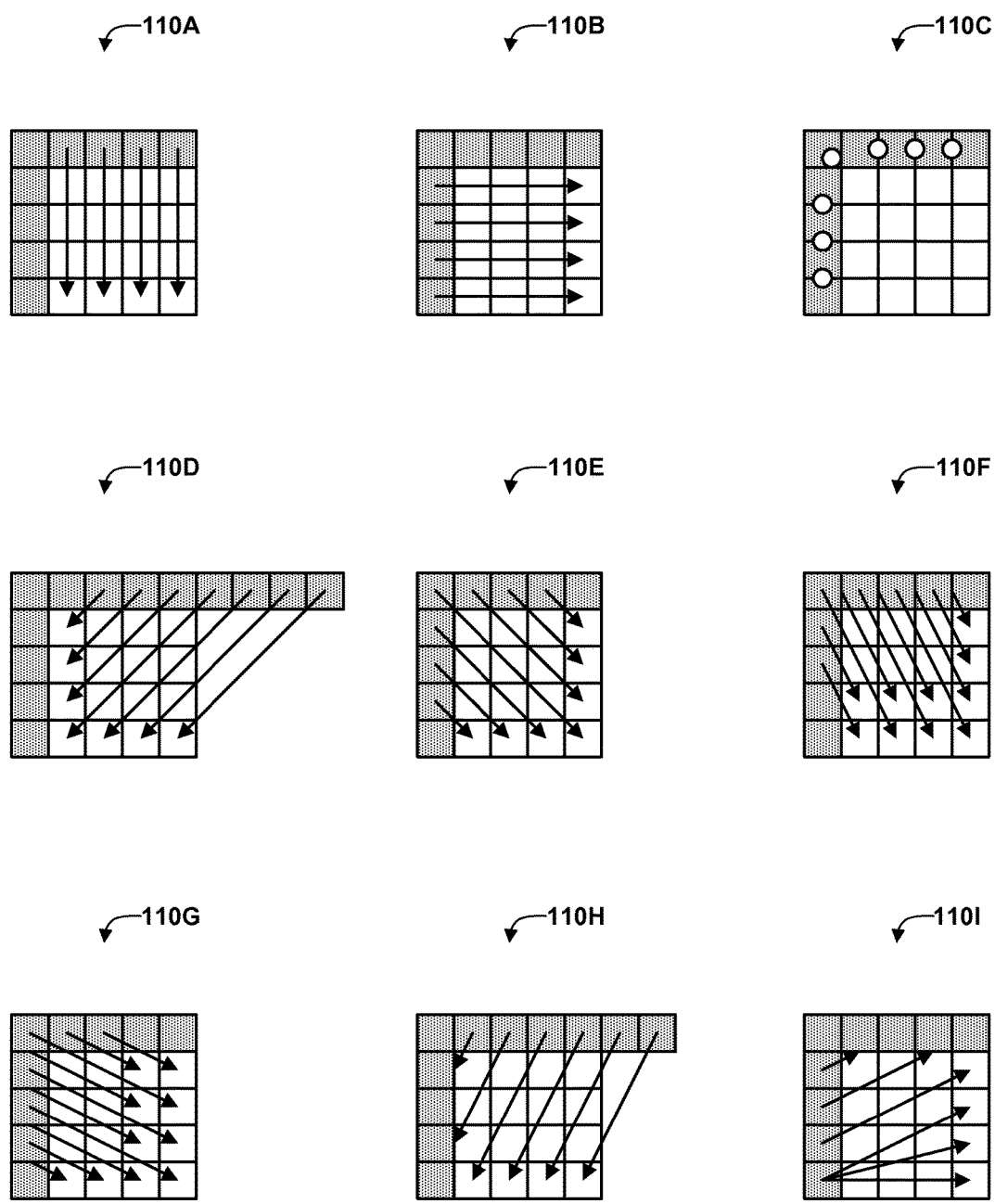
FIG. 5 is a conceptual diagram illustrating various intra-prediction modes specified by the ITU-T H.264/AVC standard.

FIG. 5 is a conceptual diagram illustrating intra-prediction modes 110A-110I (intra-prediction modes 110) of H.264. Intra-prediction mode 110C corresponds to a DC intra-prediction mode, and is therefore not necessarily associated with an actual angle. The remaining intra-prediction modes 110 may be associated with an angle, similar to angles of arrows 102 of FIG. 4. For example, the angle of intra-prediction mode 110A corresponds to arrow 102Y, the angle of intra-prediction mode 110B corresponds to arrow 102I, the angle of intra-prediction mode 110D corresponds to arrow 102AG, the angle of intra-prediction mode 110E corresponds to arrow 102Q, the angle of intra-prediction mode 110F corresponds to arrow 102U, the angle of intra-prediction mode 110G corresponds to arrow 102M, the angle of intra-prediction mode 110H corresponds to arrow 102AD, and the angle of intra-prediction mode 110I corresponds to arrow 102E.

Angles of arrows 102 that do not directly correspond to one of intra-prediction modes 110 may be mapped to one of intra-prediction modes 110. For example, the angle for one of intra-prediction modes 110 that approximates the angle of one of arrows 102 may correspond to the angle to which the one of arrows 102 is mapped.

Each of intra-prediction modes 110 may be mapped to a particular transform, e.g., with a one-to-one correspondence. For example, a video coding device, such as video encoder 20 or video decoder 30, may include configuration data that maps intra-prediction mode 110C to a DCT, and each of the other intra-prediction modes 110 to a particular directional transform, e.g., a KLT. Accordingly, angles for each of the intra-prediction modes associated with arrows 102 (FIG. 4) may be mapped to angles of intra-prediction modes 110 (FIG. 5). Intra-prediction modes 110 may, in turn, be mapped to transforms, e.g., directional transforms. In this manner, angles for each of the intra-prediction modes associated with arrows 102 (FIG. 4) may be mapped to directional transforms. Accordingly, video encoder 20 and video decoder 30 may determine a directional transform to apply to a TU based on an intra-prediction mode selected for a PU corresponding to the TU.

Figure 6:
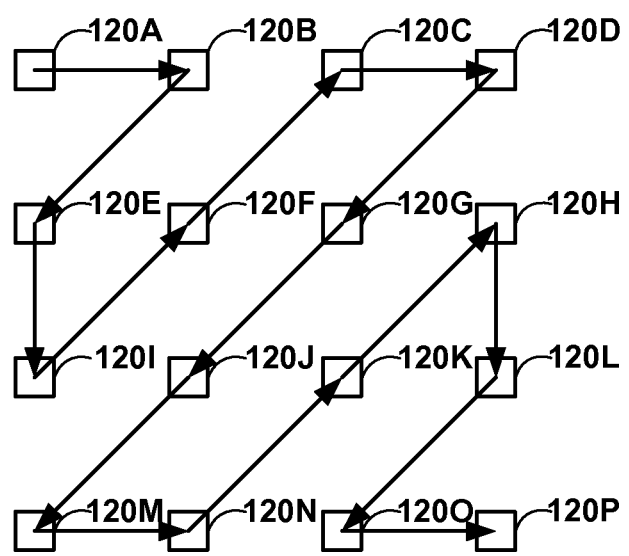
FIG. 6 is a conceptual diagrams illustrating a zig-zag scan for a block of transform coefficients.

FIG. 6 is a conceptual diagram illustrating an example zig-zag scan of coefficients 120A-120P (coefficients 120). Coefficeints 120 generally correspond to quantized transform coefficients, resulting from transformation and quantization of pixels of a TU. Video encoder 20 may be configured to scan a block of coefficients using the zig-zag scan of FIG. 6 following, e.g., application of a DCT to a residual block. In this example, the zig-zag scan starts at coefficient 120A, then proceeds to coefficient 120B, then to coefficient 120E, then to coefficient 120I, then to coefficient 120F, then to coefficient 120C, then to coefficient 120D, then to coefficient 120G, then to coefficient 120J, then to coefficient 120M, then to coefficient 120N, then to coefficient 120K, then to coefficient 120H, then to coefficient 120L, then to coefficient 120O, and finally to coefficient 120P.

By performing this scan, the two-dimensional arrangement of coefficients for pixels may be converted into a one-dimensional array including values for each of coefficients 120. These values may be arranged in the array in the order of the scan. For example, the value for coefficient 120A may be first in the array, followed by values for coefficients 120B, 120E, 120I, 120F, and so on.

Other predefined scan patterns may also be defined for other transforms. For example, each directional transform may be associated with a scan pattern that is designed to place low frequency coefficients resulting from the directional transform earlier in an array than higher frequency coefficients. One of the directional transforms may cause lower frequency coefficients to occur along the far left column of a block of transform coefficients, in which case a corresponding scan may be defined that starts at coefficient 120A, then proceeds to coefficient 120E, then to coefficient 120I, then to coefficient 120M, then to 120B, and so on. As another example, another one of the directional transforms may cause lower frequency coefficients to occur along the top row of a block of transform coefficients, in which case a corresponding scan may be defined that starts at coefficient 120A, then proceeds to coefficient 120B, then to coefficient 120C, then to coefficient 120D, then to coefficient 120E, and so on.

In some examples, video encoder 20 may be configured to perform an adaptive scan, rather than a predefined scan. The adaptive scan may vary over time based on statistics indicative of whether particular coefficients (that is, coefficients corresponding to coefficients 120) are significant. Moreover, video encoder 20 may calculate separate sets of statistics based on, for example, an intra-prediction mode selected to predict a block, an index of a rotational transform to apply following an initial transform, or other factors.

In some examples, video encoder 20 may include two tables for these statistics: a high-dynamic-range table and a dynamically-updating scan table. Assuming that the block to be scanned has N×N coefficients, each of these two tables may also have N×N sizes. The high-dynamic-range table may be a fixed, pre-determined table providing probabilities that each transform coefficient is non-zero. This table may be calculated based on a set of training data. Moreover, this table may be used to provide the starting point for the adaptive scan order. In general, the high-dynamic-range table may be static (that is, unchanged) for a bitstream.

The dynamically-updating scan table may be updated over time to reflect recently determined statistics for transform coefficients. In particular, video encoder 20 may keep a count of the number of times each coefficient is non-zero. That is, for each transform block, video encoder 20 may increment values in the dynamically-updating scan table corresponding to non-zero coefficients in the current transform block. For example, if the transform coefficient corresponding to coefficient 120E is non-zero, video encoder 20 may add one to the value in the dynamically updating scan table corresponding to coefficient 120E. The values in the dynamically-updating scan table may also be periodically normalized, to prevent the values from exceeding a maximum value.

To perform the adaptive scan for a first transform unit of a frame, video encoder 20 may scan based on the high-dynamic-range table alone. Video encoder 20 may also initialize the dynamically-updating scan table by, e.g., setting all values in the dynamically-updating scan table to zero. For each non-zero coefficient in the transform block, video encoder 20 may add one to the collocated value in the dynamically-updating scan table. For subsequent blocks, video encoder 20 may first refer to the dynamically-updating scan table to determine which of the transform coefficients is most likely to be non-zero, then scan in order of decreasing likelihood of coefficients being non-zero. In some cases, two or more values in the dynamically-updating scan table may be equal. In such a case, quantization unit 54 refers to the high-dynamic-range table to determine which coefficient to scan next. In this manner, quantization unit 54 may perform an adaptive scan based on a combination of a high-dynamic-range table and a dynamically-updating scan table.

The high-dynamic-range table may be the same for all adaptive scan statistics, in some examples. Thus, video encoder 20 may include dynamically-updating scan tables specific to, for example, the selected intra-prediction mode, the rotational transform index, or a combination thereof. In some examples, video encoder 20 may be configured to select from among predetermined, static scans when a rotational transform is not applied, and to perform an adaptive scan when a rotational transform is applied, and moreover, to select statistics for performing the adaptive scan based on either or both of the selected intra-prediction mode and the index of the selected rotational transform. Alternatively, video encoder 20 may be configured to select a predefined scan based on an index of the rotational transform, an intra-prediction mode, or a combination thereof. Video decoder 30 may be configured similarly to video encoder 20 to select an appropriate scan.

Figure 7A:
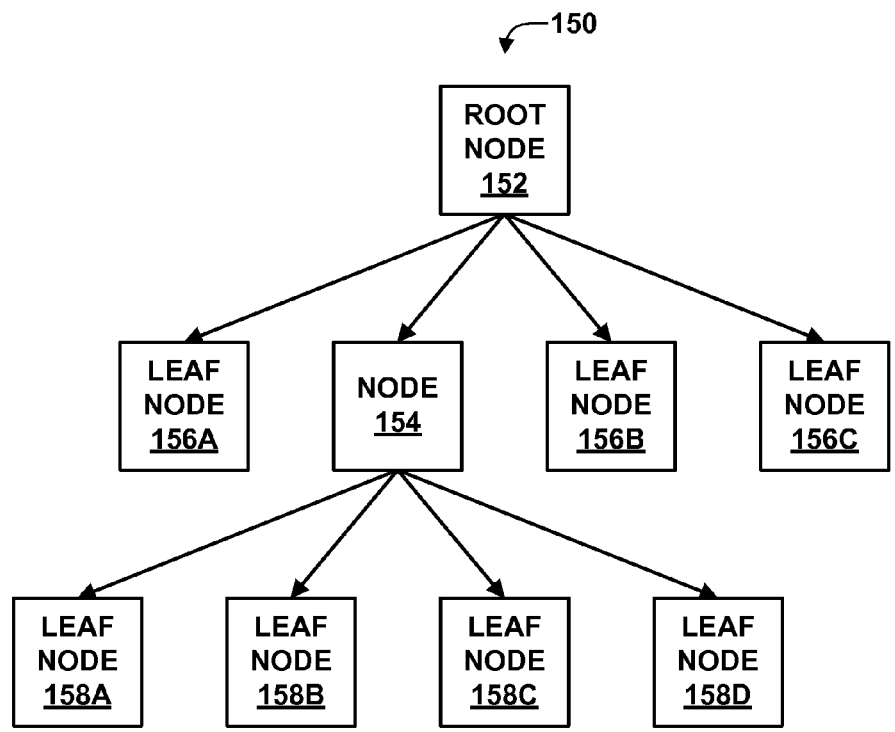
FIGS. 7A and 7B are conceptual diagrams illustrating an example quadtree and a corresponding largest coding unit (LCU).
Figure 7B:
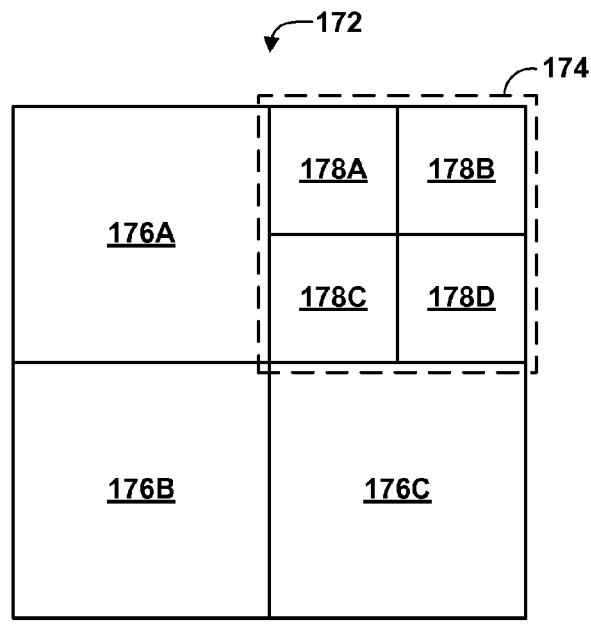

FIGS. 7A and 7B are conceptual diagrams illustrating an example quadtree 150 and a corresponding largest coding unit 172. FIG. 7A depicts an example quadtree 150, which includes nodes arranged in a hierarchical fashion. Each node in a quadtree, such as quadtree 150, may be a leaf node with no children, or have four child nodes. In the example of FIG. 7A, quadtree 150 includes root node 152. Root node 152 has four child nodes, including leaf nodes 156A-156C (leaf nodes 156) and node 154. Because node 154 is not a leaf node, node 154 includes four child nodes, which in this example, are leaf nodes 158A-158D (leaf nodes 158).

Quadtree 150 may include data describing characteristics of a corresponding largest coding unit (LCU), such as LCU 172 in this example. For example, quadtree 150, by its structure, may describe splitting of the LCU into sub-CUs. Assume that LCU 172 has a size of 2N×2N. LCU 172, in this example, has four sub-CUs 176A-176C (sub-CUs 176) and 174, each of size N×N. Sub-CU 174 is further split into four sub-CUs 178A-178D (sub-CUs 178), each of size N/2×N/2. The structure of quadtree 150 corresponds to the splitting of LCU 172, in this example. That is, root node 152 corresponds to LCU 172, leaf nodes 156 correspond to sub-CUs 176, node 154 corresponds to sub-CU 174, and leaf nodes 158 correspond to sub-CUs 178.

Data for nodes of quadtree 150 may describe whether the CU corresponding to the node is split. If the CU is split, four additional nodes may be present in quadtree 150. In some examples, a node of a quadtree may be implemented similar to the following pseudocode:

```
quadtree_node {
    boolean split_flag(1);
    // signaling data
    if (split_flag) {
        quadtree_node child1;
        quadtree_node child2;
        quadtree_node child3;
        quadtree_node child4;
    }
}
```

The split_flag value may be a one-bit value representative of whether the CU corresponding to the current node is split. If the CU is not split, the split_flag value may be '0', while if the CU is split, the split_flag value may be '1'. With respect to the example of quadtree 150, an array of split flag values may be 101000000.

In some examples, each of sub-CUs 176 and sub-CUs 178 may be intra-prediction encoded using the same intra-prediction mode. Accordingly, video encoder 20 may provide an indication of the intra-prediction mode in root node 152. Moreover, certain sizes of sub-CUs may have multiple possible transforms for a particular intra-prediction mode. In accordance with the techniques of this disclosure, video encoder 20 may provide an indication of the transform to use for such sub-CUs in root node 152. For example, sub-CUs of size N/2×N/2 may have multiple possible transforms available. Video encoder 20 may signal the transform to use in root node 152. Accordingly, video decoder 30 may determine the transform to apply to sub-CUs 178 based on the intra-prediction mode signaled in root node 152 and the transform signaled in root node 152.

As such, video encoder 20 need not signal transforms to apply to sub-CUs 176 and sub-CUs 178 in leaf nodes 156 and leaf nodes 158, but may instead simply signal an intra-prediction mode and, in some examples, a transform to apply to certain sizes of sub-CUs, in root node 152, in accordance with the techniques of this disclosure. In this manner, these techniques may reduce the overhead cost of signaling transform functions for each sub-CU of an LCU, such as LCU 172.

In some examples, intra-prediction modes for sub-CUs 176 and/or sub-CUs 178 may be different than intra-prediction modes for LCU 172. Video encoder 20 and video decoder 30 may be configured with functions that map an intra-prediction mode signaled at root node 152 to an available intra-prediction mode for sub-CUs 176 and/or sub-CUs 178. The function may provide a many-to-one mapping of intra-prediction modes available for LCU 172 to intra-prediction modes for sub-CUs 176 and/or sub-CUs 178.

While FIG. 7A illustrates an example of a CU quadtree, it should be understood that a similar quadtree may be applied to TUs of a leaf-node CU. That is, a leaf-node CU may include a TU quadtree that describes partitioning of TUs for the CU. A TU quadtree may generally resemble a CU quadtree, except that the TU quadtree may signal intra-prediction modes for TUs of the CU individually.

Figure 8:
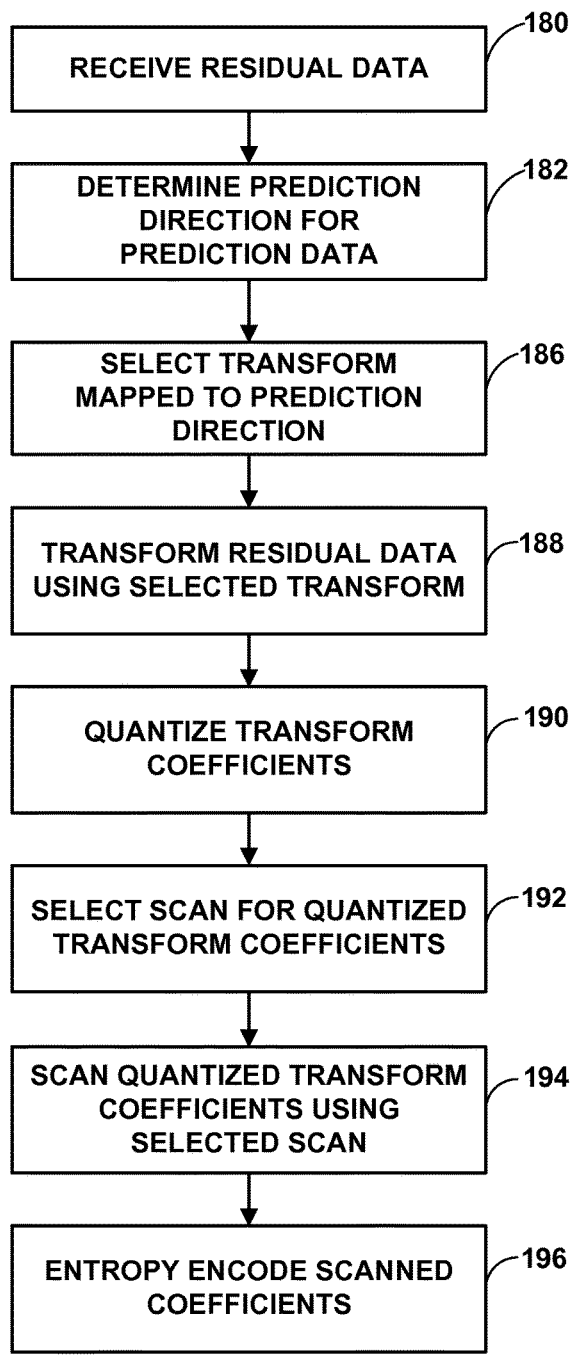
FIG. 8 is a flowchart illustrating an example method for selecting a transform and a scan to apply to a block based on an intra-prediction mode selected for the block.

FIG. 8 is a flowchart illustrating an example method for selecting a transform and a scan to apply to a block based on an intra-prediction mode selected for the block. Although generally described as performed by components of video encoder 20 (FIG. 2) for purposes of explanation, it should be understood that other video encoding units, such as processors, processing units, hardware-based coding units such as encoder/decoders (CODECs), and the like, may also be configured to perform the method of FIG. 8.

In the example of FIG. 8, transform unit 52 may initially receive residual data for a current TU (180). In addition, transform unit 52 may also receive an indication of an intra-prediction mode selected for the TU. From this indication, transform unit 52 may determine a prediction direction the TU (182). For example, transform unit 52 may determine an angle of the prediction direction for the indicated intra-prediction mode.

In any case, after determining the intra-prediction mode, transform unit 52 may select a transform to apply to the residual data based on a mapping from the intra-prediction mode to the transform (186). For example, transform unit 52 may select the transform to apply by querying mapping data 66 with the intra-prediction direction and determine the transform to which the intra-prediction direction is mapped. The transform may correspond to a discrete cosine transform or a directional transform, such as a mode dependent directional transform (MDDT). Transform unit 52 may then apply the selected transform to the residual data to transform the residual data (188). In some examples, mapping data 66 may further include an indication that transform unit 52 should apply two or more transforms, such as a rotational transform following the first transform, in which case transform unit 52 may further apply the indicated rotational transform.

By transforming the residual data, transform unit 52 may produce a two-dimensional matrix of transform coefficients having the same number of coefficients as the residual data.

In the example of FIG. 8, quantization unit 54 may then quantize the transform coefficients (190). In some examples, quantization unit 54 may scan the two-dimensional matrix of coefficients to produce a one-dimensional array, e.g., before or after quantizing the coefficients. Alternatively, entropy coding unit 56 may scan the two-dimensional matrix.

In this example, entropy coding unit 56 may query mapping data 66 to select a scan to apply to the quantized transform coefficients (192). In some examples, mapping data 66 may include data that maps intra-prediction modes to particular, predefined scan patterns. In some examples, mapping data 66 may include data that maps transforms to predefined scan patterns. In some examples, e.g., where mapping data 66 indicates that a rotational transform is to be applied to transform coefficients, mapping data 66 may further indicate that an adaptive scan should be performed, or a predefined scan to which the rotational transform is mapped. In examples for which an adaptive scan is performed, mapping data 66 may further include scan statistics, e.g., a high-dynamic-range table and a dynamically-updating scan table, mapped to the intra-prediction mode, an index of the first transform, an index of the rotational transform, a combination thereof, and/or other factors.

Entropy coding unit 56 may then scan the quantized transform coefficients using the selected scan (194), e.g., the predefined scan or the adaptive scan based on selected scan statistics. In some examples, entropy coding unit 56 may be configured with a scan position (which may be less than or equal to the number of transform coefficients) after which entropy coding unit 56 may zero out the coefficient values in the array. After scanning a number of coefficients equal to the scan position, entropy coding unit 56 may set remaining array values equal to zero. Zeroing out transform coefficients may occur before or after the scan, in some examples.

In some examples, entropy coding unit 56 may then entropy encode the scanned coefficients in the array following the scan (196). Alternatively, in some examples, entropy coding unit 56 may entropy encode the coefficients as they are scanned. In any case, entropy coding unit 56 may utilize either CABAC or CAVLC to entropy encode the coefficients.

When using CABAC, and when performing an adaptive scan, entropy coding unit 56 may entropy encode syntax elements including significant coefficient flags and last coefficient flag. Entropy coding unit 56 may select context models for entropy encoding significant coefficient flags based on a block type (intra or inter), a selected intra-prediction mode (assuming that the block is predicted in an intra-mode), and/or a type of transform applied (e.g., DCT or directional/KLT). Entropy coding unit 56 may select context models for entropy encoding last coefficient flags based on the order index in the adaptive scan, block type, spatial prediction direction, and/or a selected transform.

In this manner, the method of FIG. 8 represents an example of a method including calculating a residual block for a block of video data based on a predicted block formed using an intra-prediction mode, and transforming the residual block using a transform mapped to the intra-prediction mode.

Figure 9:
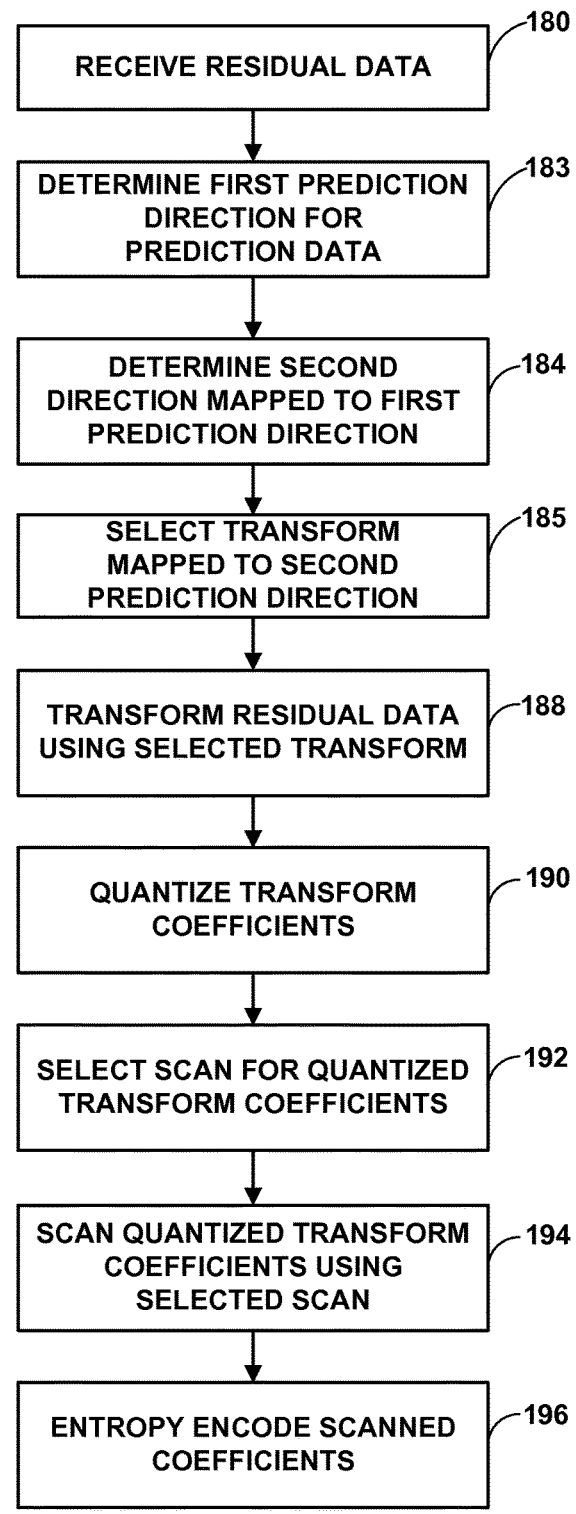
FIG. 9 is a flowchart illustrating another example method for selecting a transform and scan to apply to a block based on an intra-prediction mode selected for the block.

FIG. 9 is a flowchart illustrating another example method for selecting a transform and scan to apply to a block of residual data. In general, FIG. 9 conforms substantially to FIG. 8. However, in the example of FIG. 9, after receiving the residual data (180) and the indication of an intra-prediction mode selected for the TU, transform unit 52 may determine a first prediction direction for predicting the TU (183). For example, transform unit 52 may determine an angle of the prediction direction for the indicated intra-prediction mode.

Transform unit 52 may then determine a second direction mapped to the first prediction direction (184). For example, transform unit 52 may query mapping data 66 to determine a second intra-prediction mode to which the first intra-prediction mode is mapped. In some examples, transform unit 52 may determine an angle that approximates the angle of the indicated intra-prediction mode, and select a second intra-prediction mode corresponding to the determined angle. Transform unit 52 may then select a transform mapped to the second prediction data (185). After selecting the transform, which may correspond to selecting multiple transforms, video encoder 20 generally performs the remaining steps of FIG. 9 in a manner similar to the corresponding steps described with respect to FIG. 8.

In this manner, the method of FIG. 9 is an example of a method including receiving an indication of a first intra-prediction mode in a first set of intra-prediction modes for a block of video data, determining a second intra-prediction mode from a smaller set of intra-prediction modes to which the first intra-prediction mode is mapped, determining a directional transform to which the second intra-prediction mode is mapped, and applying the directional transform to residual data of the block.

Figure 10:
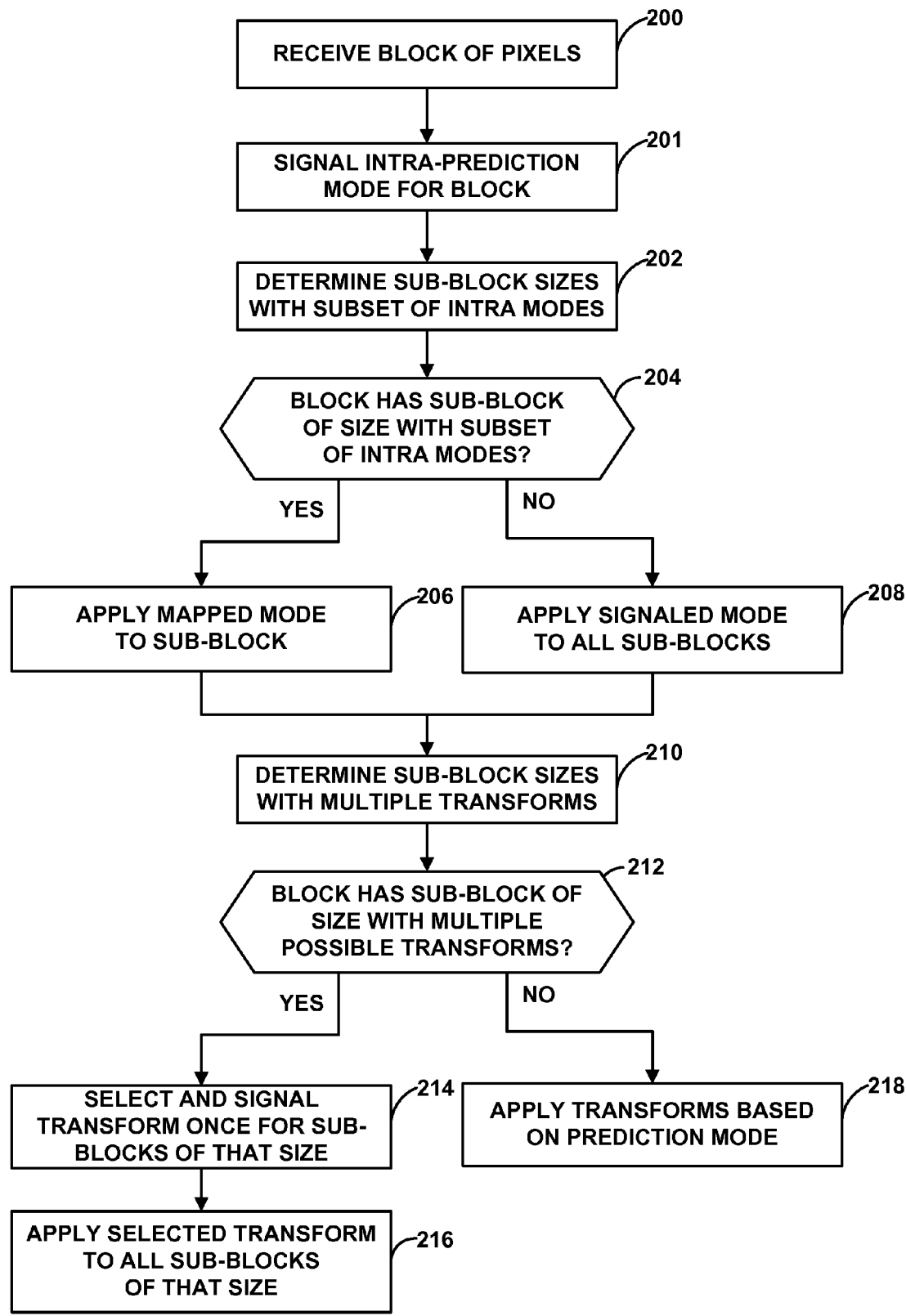
FIG. 10 is a flowchart illustrating an example method for applying an intra-prediction mode and transform to particular-sized sub-CUs.

FIG. 10 is a flowchart illustrating an example method for applying an intra-prediction mode and transform to particular-sized sub-CUs. Although generally described as performed by components of video encoder 20 (FIG. 2) for purposes of explanation, it should be understood that other video encoding units, such as processors, processing units, hardware-based coding units such as encoder/decoders (CODECs), and the like, may also be configured to perform the method of FIG. 10. It should also be understood that in other examples, similar methods may include additional or alternative steps to those illustrated in FIG. 10, or may perform the illustrated steps in a different order, without departing from the described techniques.

Techniques for selecting and applying a transform as described with respect to FIG. 10 may correspond to steps 186 and 188 of FIG. 8. Techniques for applying various intra-prediction modes to blocks of various sizes as described with respect to FIG. 10 may be performed prior to step 180 of FIG. 8.

Intra-prediction unit 46 may receive a block of pixels, e.g., an LCU (200). Intra-prediction unit 46 may then determine an intra-prediction mode to apply to the LCU and signal the determined intra-prediction mode for the LCU (201), e.g., at a root node of a quadtree data structure corresponding to the LCU. Intra-prediction unit 46 may then determine sizes of sub-CUs for which only a subset of intra-prediction modes are available (202). Intra-prediction unit 46 may further partition LCU into one or more sub-CUs and determine whether any of the sub-CUs have a size for which only a subset of the intra-prediction modes are available (204).

If the LCU includes sub-CUs of a size for which only a subset of intra-prediction modes are available ("YES" branch of 184), intra-prediction unit 46 may intra-predict the sub-CUs using an intra-prediction mode to which the intra-prediction mode selected for the LCU is mapped (206). On the other hand, if the LCU does not include any sub-CUs that are of such a size ("NO" branch of 184), intra-prediction unit 46 may apply the mode signaled for the LCU to all sub-blocks of the LCU (208).

Video encoder 20 may then calculate residual values for sub-CUs of the LCU. Then, transform unit 52 may determine sub-CU sizes for which multiple transforms are possible based on the signaled intra-prediction mode for the LCU (210). Transform unit 52 may further determine whether any of the sub-CUs of the LCU are of a size for which multiple transforms are possible (212). If at least one sub-CU is of a size for which multiple transforms are possible ("YES" branch of 192), transform unit 52 may select and signal a transform to apply for sub-CUs of that size (214). For example, transform unit 52 may signal the transform to apply to sub-CUs of that size in the root node of the quadtree for the LCU. Transform unit 52 may also apply the signaled transform to all sub-blocks in the LCU of that size (216). On the other hand, if the LCU does not contain any sub-CUs for which multiple transforms are possible ("NO" branch of 192), transform unit 52 may apply transforms to sub-CUs of the LCU based purely on the signaled intra-prediction mode for the LCU (218), such that no signaling regarding transforms is necessary.

In this manner, the method of FIG. 10 is an example of a method including selecting an intra-prediction mode to use to encode a block of video data, determining whether the block includes a sub-block of a size for which multiple transforms are possible based on the size of the sub-block and the selected intra-prediction mode, when the block includes the sub-block of the size for which multiple transforms are possible based on the size of the sub-block and the selected intra-prediction mode selecting one of the multiple possible transforms, transforming the sub-block using the selected one of the multiple possible transforms, and providing an indication of the selected one of the multiple possible transforms for the size of the block.

Figure 11:
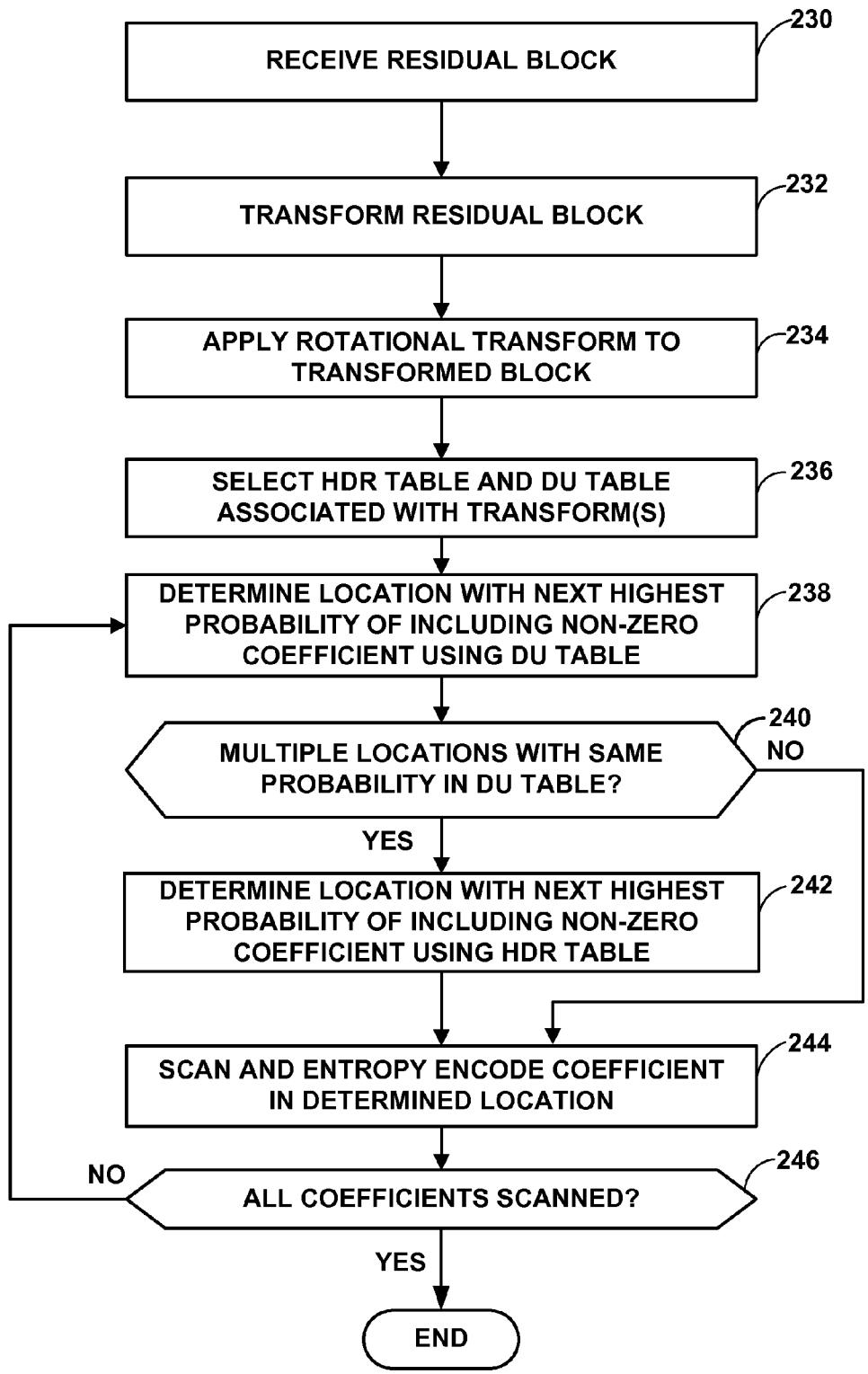
FIG. 11 is a flowchart illustrating an example method for performing an adaptive scan of transform coefficients based on a selected transform applied to a block of residual values.

FIG. 11 is a flowchart illustrating an example method for performing a adaptive scan based on a selected transform applied to a block. Although generally described as performed by components of video encoder 20 (FIG. 2) for purposes of explanation, it should be understood that other video encoding units, such as processors, processing units, hardware-based coding units such as encoder/decoders (CO-DECs), and the like, may also be configured to perform the method of FIG. 11.

It should also be understood that in other examples, similar methods may include additional or alternative steps to those illustrated in FIG. 11, or may perform the illustrated steps in a different order, without departing from the described techniques. Techniques for adaptively scanning coefficients following a cascaded transform as illustrated in FIG. 11 may correspond to steps 192 and 194 of FIG. 8. The techniques for adaptively scanning residual coefficients of FIG. 11 may be applied to residual data following intra-prediction or inter-prediction.

Initially, transform unit 52 of video encoder 20 may receive a residual block (230). The residual block may correspond to the residual following intra-prediction or inter-prediction of a CU. The residual block may be the same size or a different size than a corresponding prediction unit of the CU. Transform unit 52 may then transform the residual block (232). In some examples, transform unit 52 may apply a directional transform corresponding to an intra-prediction mode from a subset of intra-prediction modes, in accordance with techniques of this disclosure. In other examples, transform unit 52 may apply a discrete cosine transform.

Transform unit 52 may then apply a rotational transform to the transformed block (234). For transform units (TUs) of sizes 8×8 and larger to which transform unit 52 applies a DCT, transform unit 52 may apply the rotational transform to the lowest frequency 8×8 DCT coefficients. For TUs smaller than 8×8, transform unit 52 may apply the rotational transform to the entire TU. If the PU corresponding to the TU was intra-prediction encoded, transform unit 52 may select a rotational transform based on the intra-prediction mode used to predict the PU, e.g., where a subset of intra-prediction modes may be mapped to rotational transforms. These rotational transforms may be referred to as mode dependent rotational transforms (MDROTs). In some examples, transform unit 52 may cascade a rotational transform (or other secondary separable transform) following a mode dependent directional transform (MDDT), which may be a KLT.

Following the rotational transform, quantization unit 54 may quantize the transformed coefficients, in some examples. Then, entropy coding unit 56 may select a set of statistics to use to perform an adaptive scan of the transform coefficients. The set of statistics may include a high dynamic range (HDR) table and a dynamically updating (DU) table. Either or both of the HDR and DU tables may be selected for a particular scenario, e.g., whether intra-prediction or inter-prediction was used to predict a PU, a particular intra-prediction mode for the PU when intra-prediction is used, whether a DCT or KLT was applied to the TU corresponding to the PU, the index of the rotational transform used, or any combination thereof. In this manner, entropy coding unit 56 may select the HDR and/or DU tables for use during the adaptive scan (236).

As discussed above, the HDR table may include a predefined set of data indicating probabilities that coefficients of each location in a matrix are non-zero. The HDR table may be produced using a set of training data, and may remain the same throughout an entire bitstream. Entropy coding unit 56 may collect statistics individual to a frame, slice, group of pictures, or other unit of video data to calculate values for the DU table. The DU table may therefore also indicate probabilities that coefficients of each location in the matrix are non-zero.

To perform the adaptive scan, entropy coding unit 56 may first determine the location in the matrix having the highest probability of including a non-zero coefficient using the DU table (238). In some cases, there may be two or more locations in the matrix with equal probabilities of having non-zero coefficients. Thus, entropy coding unit 56 may determine whether there are multiple locations in the matrix with the same probabilities of including non-zero coefficients (240). If there are multiple locations in the matrix with the same probabilities of including non-zero coefficients ("YES" branch of 240), entropy coding unit 56 may determine the location in the matrix having the highest probability of including a non-zero coefficient using the HDR table (242).

Entropy coding unit 56 may then scan and entropy encode the coefficient in the determined location (244). Entropy coding unit 56 may also determine whether the scanned coefficient was in fact non-zero and set the value for a significant coefficient flag to indicate whether the scanned coefficient was non-zero, and hence significant. Entropy coding unit 56 may then determine whether all coefficients in the matrix have been scanned (246). If not ("NO" branch of 246), entropy coding unit 56 may determine the location in the matrix having the next highest probability of including a non-zero coefficient using the DU table (or possibly the HDR table), and scan the coefficient in this location.

After all coefficients have been scanned ("YES branch of 246), entropy coding unit may stop the scan. Moreover, in some examples, entropy coding unit 56 may set the value of a last coefficient flag for each coefficient to indicate whether the corresponding coefficient is the last coefficient in the flag. After determining that all coefficients have been scanned ("YES" branch of 246), entropy coding unit 56 may set the value for the last coefficient flag corresponding to the last scanned coefficient equal to one. Using the techniques of FIG. 12 as described below, entropy coding unit 56 may encode syntax elements including the significant coefficient flags and last coefficient flags.

In some examples, following the scan (whether adaptive or fixed), video encoder 20 may zero out coefficients in the array produced by the scan, e.g., all coefficients after position N in the array, where N is an integer between zero and the length of the array. In other examples, video encoder 20 may zero out coefficients in certain locations of the matrix following the transform(s) or quantization. These locations may correspond to an upper-left corner of the matrix, for example. In general, zeroing out these coefficients may result in zeroing out of higher frequency coefficients, which may improve coding efficiency without much impact on quality.

In this manner, the method of FIG. 11 is an example of a method including transforming residual data for a block of video data using a first transform to produce an intermediate, two-dimensional block of transform coefficients, transforming the intermediate, two-dimensional block of transform coefficients using a rotational transform to produce a two-dimensional block of transform coefficients, selecting a set of statistics associated with at least one of the first transform and the rotational transform, wherein the set of statistics provides likelihoods that locations in the two-dimensional block of transform coefficients will be non-zero, and adaptively scanning the two-dimensional block of transform coefficients based on the selected set of statistics.

Figure 12:
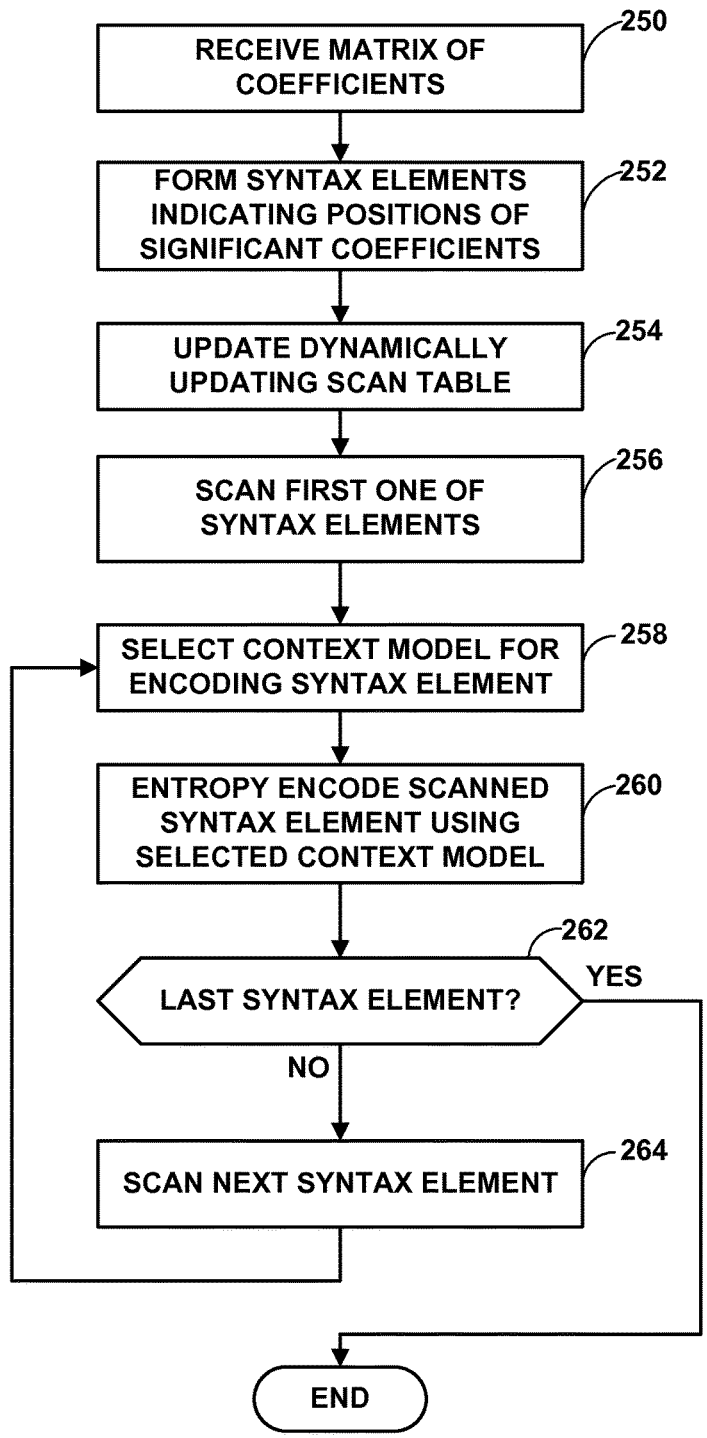
FIG. 12 is a flowchart illustrating an example method for selecting a context model to use when scanning and entropy encoding syntax elements that describe adaptively scanned coefficients.

FIG. 12 is a flowchart illustrating an example method for selecting a context model to use when scanning and entropy encoding syntax elements that describe adaptively scanned coefficients. Although generally described as performed by components of video encoder 20 (FIG. 2) for purposes of explanation, it should be understood that other video encoding units, such as processors, processing units, hardware-based coding units such as encoder/decoders (CODECs), and the like, may also be configured to perform the method of FIG. 12.

It should also be understood that in other examples, similar methods may include additional or alternative steps to those illustrated in FIG. 12, or may perform the illustrated steps in a different order, without departing from the described techniques. Techniques for selecting a context model to use when scanning and entropy encoding syntax elements that describe adaptively scanned coefficients as illustrated in FIG. 11 may correspond to steps 192-196 of FIG. 8. The techniques of FIG. 12 may be performed prior to, during, or after the adaptive scan of FIG. 11 is performed.

Entropy coding unit 56 may receive a matrix of quantized transform coefficients (250), e.g., from quantization unit 54. In general, using the example method of FIG. 12, entropy coding unit 56 may encode syntax elements that describe the received coefficients. The syntax elements may include, for each coefficient, a significant coefficient flag and a last coefficient flag. The significant coefficient flag may indicate whether the corresponding coefficient is significant, e.g., whether the value of the corresponding coefficient is greater than zero. The last coefficient flag may indicate whether the corresponding coefficient is the last coefficient of an adaptive scan.

Entropy coding unit 56 may determine positions of significant coefficients in the received matrix. Entropy coding unit 56 may form syntax elements indicating positions of significant coefficients in the received matrix (252). For example, for each coefficient in the matrix, entropy coding unit 56 may determine whether the coefficient is greater than zero, and if so, set a value in a syntax element matrix collocated with the coefficient equal to one, otherwise, entropy coding unit may set the value collocated with the coefficient equal to zero. Entropy coding unit 56 may then update a dynamically updating scan table using the syntax element matrix (254). For example, entropy coding unit 56 may add, to the current value of each element in the dynamically updating scan table, the value of the collocated syntax element in the syntax element matrix.

Entropy coding unit 56 may then scan a first one of the syntax elements in the syntax element matrix (256). Entropy coding unit 56 may apply a zig-zag scan, such as that shown in FIG. 6A, or a scan selected based on a block type (inter- or intra-predicted block), a spatial prediction direction if the block is an intra-prediction encoded block, and/or a type of transform used (e.g., DCT or directional transform). Next, entropy coding unit 56 may select a context model for encoding the scanned syntax element (258). In general, the context model may be selected based on the number of significant (e.g., non-zero) coefficients in the previously scanned N coefficients, where N is a non-zero integer value. N may be selected based on the size of the block.

After selecting the context model to use to encode the current syntax element, entropy coding unit 56 may entropy encode the scanned syntax element using the selected context model (260). Entropy coding unit 56 may then determine whether the encoded syntax element is the last syntax element to be encoded (262). If the syntax element is the last syntax element ("YES" branch of 262), entropy coding unit 56 may stop scanning coefficients. On the other hand, if the syntax element is not the last syntax element ("NO" branch of 262), entropy coding unit 56 may scan the next syntax element (264), and again select a context model for encoding the scanned syntax element, e.g., based on a number of significant coefficients in the previously scanned N coefficients.

The example of FIG. 12 is primary discussed with respect to syntax elements describing whether particular coefficients are significant or not. These syntax elements may include, for example, significant coefficient flags, e.g., one-bit flags indicative of whether corresponding coefficients are significant, e.g., non-zero. It should be understood that similar techniques may be applied with respect to syntax elements describing whether a particular coefficient is the last coefficient in the adaptive scan. For example, similar techniques may be applied to a last coefficient flag. When encoding last coefficient flags using CABAC, the context model may be based on the order index in the adaptive scan that is based on block type, spatial prediction direction, and/or a selected transform.

The techniques of FIG. 12 may be performed by a video encoding device, such as video encoder 20. A video decoder may perform an inverse scan using the syntax elements encoded according to FIG. 12. For example, video decoder 30 may receive an indication of an intra-prediction mode used to predict an encoded block, an indication of a rotational transform used to transform the encoded block, or other such data. Video encoder 20 and video decoder 30 may each be configured with the same high dynamic range table. In examples where video encoder 20 includes multiple high dynamic range tables, video encoder 20 and video decoder 30 may each be configured with the same set of high dynamic range tables. In such examples, video decoder 30 may use received information to select the same high dynamic range table as that used by video encoder 20 to perform the adaptive scan.

As noted above, video encoder 20 may perform the adaptive scan based on statistics indicative of the likelihood (or probability) that a coefficient in a particular position in a matrix is non-zero. Video encoder 20 may maintain a dynamically updating scan table that indicates this likelihood, updating the dynamically updating scan table for each scanned block. By encoding syntax elements indicative of which of the coefficients of a certain block are significant, and which coefficient is the last in the adaptive scan, video encoder 20 may provide video decoder 30 with information that can be used to inverse scan received coefficients.

For example, video decoder 30 may decode the syntax elements, then update a local version of the dynamically updating scan table using the syntax elements. Video decoder 30 may then entropy decode encoded coefficients and place the decoded coefficients in a corresponding position of a matrix having a next-highest probability of being significant (e.g., non-zero). In this manner, video decoder 30 may reconstruct a matrix of quantized transform coefficients from a received vector of entropy encoded coefficients using an adaptive inverse scan.

In this manner, the method of FIG. 12 is an example of a method including scanning a two-dimensional block of transform coefficients to produce a one-dimensional vector of the transform coefficients, determining values indicative of whether the transform coefficients in the one-dimensional vector are significant, and entropy encoding at least one of the values using a context model selected based on at least a percentage of significant coefficients in a predetermined number of the values encoded before the at least one of the values.

Figure 13:
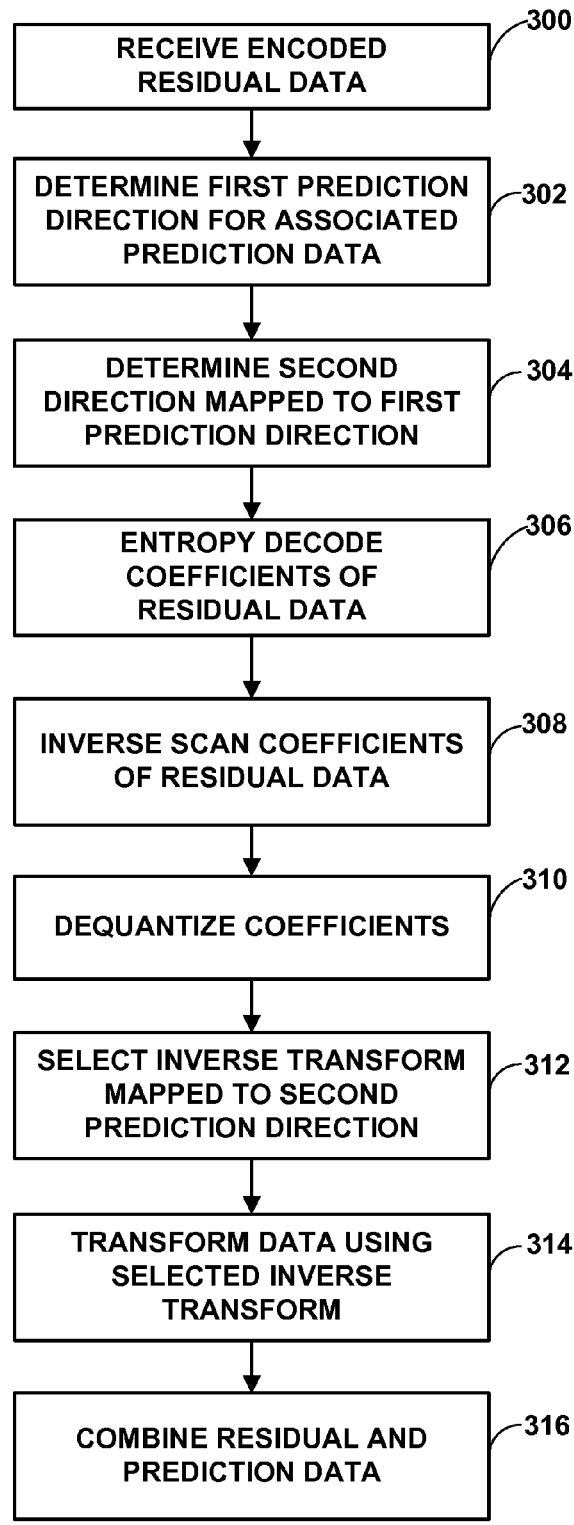
FIG. 13 is a flowchart illustrating an example method for decoding a transform unit that has been encoded using one or more of the techniques of this disclosure.

FIG. 13 is a flowchart illustrating an example method for decoding a TU that has been encoded using one or more of the techniques of this disclosure. Although generally described as performed by components of video decoder 30 (FIG. 3) for purposes of explanation, it should be understood that other video decoding units, such as processors, processing units, hardware-based coding units such as encoder/decoders (CODECs), and the like, may also be configured to perform the method of FIG. 13. It should also be understood that in other examples, similar methods may include additional or alternative steps to those illustrated in FIG. 13, or may perform the illustrated steps in a different order, without departing from the described techniques.

Initially, video decoder 30 may receive encoded residual data (300). In the example of FIG. 13, the residual data corresponds to the residual of a CU including one or more PUs predicted in an intra-prediction mode, for purposes of illustration. In accordance with the techniques of this disclosure, video decoder 30 may determine a first prediction direction for prediction data associated with the received residual data (302). The prediction direction may correspond to an intra-prediction mode signaled at the root of a quadtree corresponding to the CU.

Video decoder 30 may determine a second prediction direction mapped to the first prediction direction (304). For example, mapping data 84 may provide a many-to-one mapping of a set of intra-prediction modes to a smaller set, e.g., a subset, of intra-prediction modes. Accordingly, video decoder 30 may refer to mapping data 84 to determine the second prediction direction mapped to the first prediction direction. Entropy decoding unit 70 of video decoder 30 may then begin entropy decoding the received coefficients (306).

Entropy decoding unit 70 may also inverse scan the coefficients during or following entropy decoding (308). In some examples, entropy decoding unit 70 may inverse a fixed scan to which the second prediction direction is mapped, e.g., as indicated by mapping data 84. In other examples, e.g., when a first transform is cascaded by a rotational transform, entropy decoding unit 70 may inverse a dynamic scan. As discussed above, entropy decoding unit 70 may, in such examples, receive and decode syntax elements, such as significant coefficient flags and last coefficient flags, such that entropy decoding unit 70 can produce a dynamically updating table identical to that used by an encoder, such as video encoder 20, when the encoder adaptively scanned the residual data.

In any case, following the inverse scan, entropy decoding unit 70 may produce a two-dimensional matrix including quantized transform coefficients. Thus, inverse quantization unit 76 may inverse quantize the quantized transform coefficients of the matrix (310). Inverse transform unit 78 may select an inverse transform mapped to the second prediction direction (312) and inverse transform the transform coefficients using the selected inverse transform (314). For example, inverse transform unit 76 may refer to mapping data 84 to select the inverse transform. In some examples, mapping data 84 may indicate both an inverse rotational transform and another inverse transform to apply, in which case inverse transform unit 78 may first apply the inverse rotational transform then apply the other inverse transform to the transform coefficients.

In accordance with the techniques of this disclosure, in some examples, there may be a sub-block of the transform coefficients for which multiple inverse transforms are possible. In such examples, video decoder 30 may determine the inverse transform to apply using an indication of the transform applied by the video encoder. For example, video decoder 30 may receive an indication of the transform used for the sub-block in the root node of a quadtree corresponding to the block including the residual data.

After applying the inverse transform(s), video decoder 30 obtains residual blocks similar to those calculated by video encoder 20 during encoding of the video data. Intra-prediction unit 74 may provide a prediction unit for the residual data to summer 80, which may combine the prediction unit and the residual data to produce a decoded CU (316). Video decoder 30 may assemble a decoded frame including the decoded CU in reference frame store 82. The decoded frame can then be rendered for display and/or used for reference when decoding other frames.

In this manner, the method of FIG. 13 is an example of a method including receiving an indication of a first intra-prediction mode in a first set of intra-prediction modes for a block of encoded video data, determining a second intra-prediction mode from a smaller set of intra-prediction modes to which the first intra-prediction mode is mapped, determining an inverse directional transform to which the second intra-prediction mode is mapped, and applying the inverse directional transform to transformed residual data of the block.

The method of FIG. 13 is also an example of a method including receiving a first indication of an intra-prediction mode to use to decode a block of video data, determining whether the block includes a sub-block of a size for which multiple transforms are possible based on the size of the sub-block and the indicated intra-prediction mode, when the block includes the sub-block of the size for which multiple inverse transforms are possible based on the size of the sub-block and the indicated intra-prediction mode, receiving a second indication of one of the multiple possible inverse transforms, and inverse transforming the sub-block using the indicated one of the multiple possible inverse transforms.

The method of FIG. 13 is also an example of a method including receiving an indication that residual data for a block of video data was transformed using both a first transform and a rotational transform to produce a two-dimensional block of transform coefficients, selecting a set of statistics associated with at least one of the first transform and the rotational transform, wherein the set of statistics provides likelihoods that locations in the two-dimensional block of transform coefficients will be non-zero, and adaptively inverse scanning a received one-dimensional vector including an encoded version of the residual data for the block based on the selected set of statistics to produce a two-dimensional matrix of transform coefficients for the block.

The method of FIG. 13 is also an example of a method including receiving values indicative of whether encoded transform coefficients in a received one-dimensional vector of encoded transform coefficients are significant, entropy decoding at least one of the values using a context model selected based on at least a percentage of significant coefficients in a predetermined number of the values decoded before the at least one of the values, and inverse scanning the one-dimensional vector to produce two-dimensional block of the transform coefficients.

Figure 14:
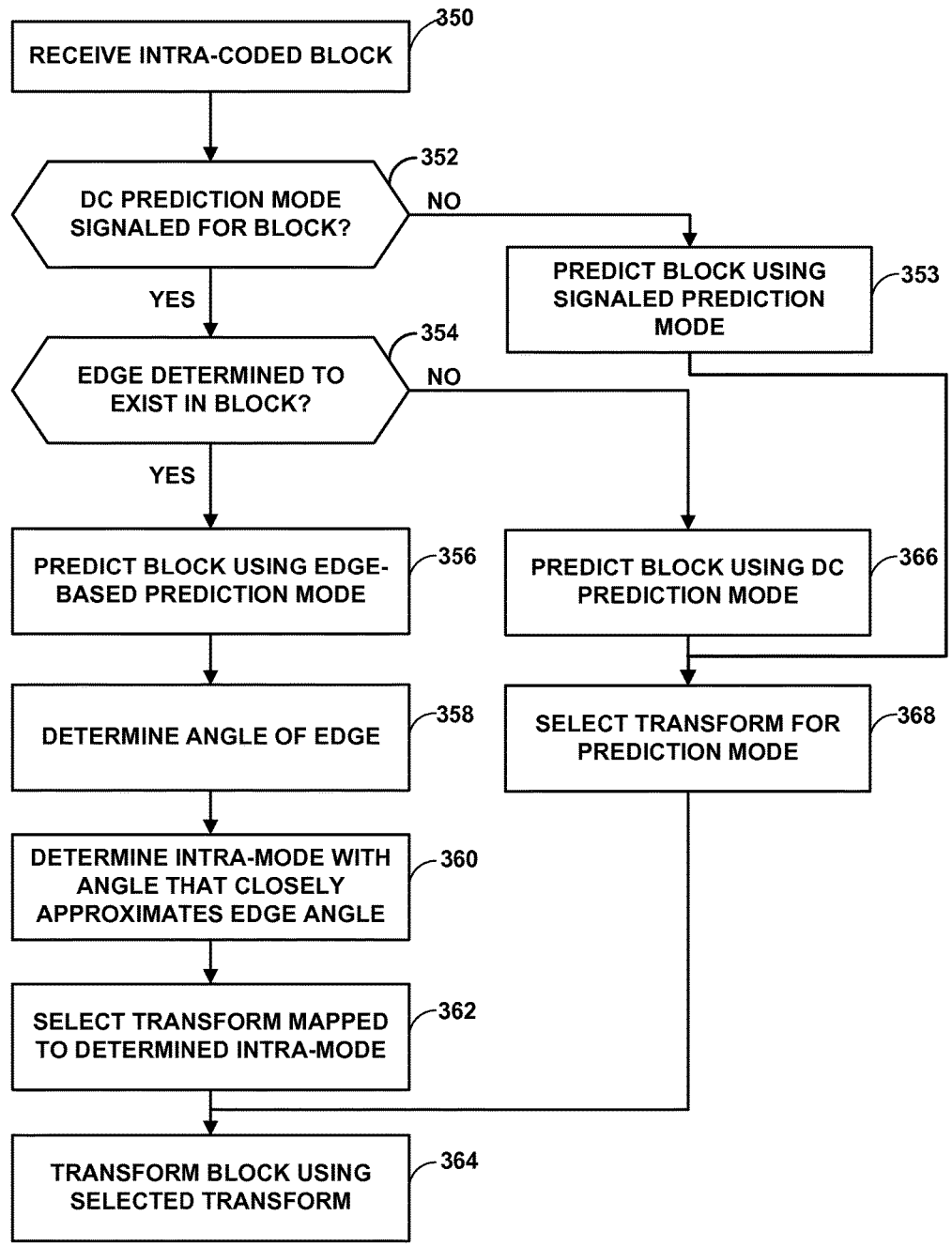
FIG. 14 is a flowchart illustrating an example method for selecting a transform to apply to an intra-coded block including an edge for which DC intra-prediction mode is signaled.

FIG. 14 is a flowchart illustrating an example method for selecting a transform to apply to an intra-coded block including an edge for which DC intra-prediction mode is signaled. Although described with respect to video decoder 30 of FIG. 3, it should be understood that similar (reciprocal) techniques may be applied by video encoder 20 of FIG. 2, or other video coding devices.

Video encoder 30 may receive an intra-coded block, e.g., a TU (180). The block may comprise a block of transform coefficients corresponding to a node in a TU quadtree. The TU quadtree node may include an indication of the intra-prediction mode to be applied to calculate a prediction value for the block. Accordingly, video decoder 30 may determine the prediction mode and whether DC prediction mode is signaled for the block (352). If DC prediction mode is signaled for the block ("YES" branch of 352), video decoder 30 may further determine whether an edge exists in the block (354). For example, as discussed above, video decoder 30 may examine neighboring, previously coded blocks to determine if an edge is detected in the previously coded blocks, and whether the edge intersects a boundary between the previously coded block and the current block.

If an edge is determined to exist in the block ("YES" branch of 354), video decoder 30 may calculate a predicted value for the block using an edge-based prediction mode (356). Furthermore, video decoder 30 may determine an angle of the edge (358) and determine an intra-mode with an angle that closely approximates the angle of the edge (360). For example, video decoder 30 may calculate differences between angles for one or more of the possible intra-prediction modes and the angle of the edge, and select the intra-prediction mode having the lowest difference.

Determining this prediction mode is generally performed only to determine the transform that is mapped to that prediction mode, though, as video decoder 30 generally predicts a value for the block using the edge-based prediction mode, in this example. That is, video decoder 30 may then select a transform mapped to the determined intra-prediction mode (362), that is, the intra-prediction mode having an angle that closely approximates the angle of the edge. Video decoder 30 may then transform the block using the selected transform (364).

On the other hand, if DC prediction mode was not signaled for the block ("NO" branch of 352), video decoder 30 may predict the block using the signaled mode (353). If an edge is not determined to exist in the block when DC prediction mode is signaled ("NO" branch of 354), video decoder 30 may predict the block using DC prediction mode, as signaled (366). Video decoder 30 may also select the transform mapped to the prediction mode (e.g., DC or directional, as signaled) (368) or in some examples a default transform, such as a DCT. Video decoder 30 may also transform the block using the selected transform in this case (364).

After transforming the block, which in this example corresponds to inverse transforming the block, video decoder 30 reproduces a block of residual values in the spatial domain. To decode the block, video decoder 30 may add the block of residual values to the predicted block (resulting from step 353, 356, or 366). The steps of adding the residual value to the predicted value are not shown in FIG. 14 for brevity, but may be performed after step 364.

In this manner, the method of FIG. 14 is an example of a method including receiving information indicating that an intra-prediction mode for a block of video data is a DC intra-prediction mode, determining an angle for an edge in the block of video data based on the indication of the DC intra-prediction mode for the block, inverse transforming the block using a directional inverse transform mapped to a directional intra-prediction mode having an angle that approximates the angle of the edge, and decoding the inverse transformed block.

As noted above, a similar method may be performed by, e.g., video encoder 20. Such a method may include determining that a block to be intra-prediction encoded contains an edge within the block, calculating a residual block for the block based on a prediction value calculated using an edge directed intra-prediction mode, transforming the residual block using a directional transform mapped to a directional intra-prediction mode having an angle that approximates an angle of the edge, and outputting information representative of the transformed residual block and information indicating that the block was predicted using a DC intra-prediction mode.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of encoding video data, the method comprising:
    scanning a two-dimensional block of transform coefficients to produce a one-dimensional vector of the transform coefficients;
    determining values for significant coefficient flag syntax elements of the two-dimensional block indicative of whether the transform coefficients in the one-dimensional vector are significant;
    for a current significant coefficient flag syntax element of the significant coefficient flag syntax elements of the transform coefficients in the one-dimensional vector:
        determining a set of the significant coefficient flag syntax elements of the transform coefficients in the one-dimensional vector that were encoded prior to the current significant coefficient flag syntax element of the transform coefficients in the one-dimensional vector, the set having a size equal to a predetermined number;
        determining a percentage of the set of significant coefficient flag syntax elements of the transform coefficients in the one-dimensional vector that the corresponding values indicate are significant;
        selecting a context model for entropy encoding the value of the current significant coefficient flag based on the percentage of the set of significant coefficient flag syntax elements of the transform coefficients in the one-dimensional vector that are significant as indicated by the corresponding values; and
        entropy encoding the value of the current significant coefficient flag syntax element using the determined context model.

2. The method of claim 1, wherein entropy encoding the value of the current significant coefficient flag syntax element comprises selecting the context model based on at least one of a prediction mode used to calculate residual data that was transformed into the two-dimensional block of transform coefficients or a type of transform used to transform the residual data into the two-dimensional block of transform coefficients in addition to the percentage of significant coefficients.

3. The method of claim 2, wherein the prediction mode comprises an intra-prediction mode, and wherein selecting the context model further comprises selecting the context model based on a direction for the intra-prediction mode.

4. The method of claim 1, wherein scanning comprises scanning the two-dimensional block using an adaptive scan based on block type, spatial prediction direction, and transform, the method further comprising encoding values indicative of whether the transform coefficients are the last transform coefficient in the one-dimensional vector using a context model selected based on an order index in the adaptive scan.

5. The method of claim 1, further comprising:
    transforming residual data using a first transform to produce an intermediate, two-dimensional block of transform coefficients; and
    transforming the intermediate, two-dimensional block of transform coefficients using a rotational transform to produce the two-dimensional block of transform coefficients.

6. An apparatus for encoding video data, the apparatus comprising:
    a memory configured to store video data; and
    a video encoder configured to:
        scan a two-dimensional block of transform coefficients of the video data to produce a one-dimensional vector of the transform coefficients,
        determine values for significant coefficient flag syntax elements of the two-dimensional block indicative of whether the transform coefficients in the one-dimensional vector are significant;
        for a current significant coefficient flag syntax element of the significant coefficient flag syntax elements of the transform coefficients in the one-dimensional vector:
            determine a set of the significant coefficient flag syntax elements of the transform coefficients in the one-dimensional vector that were encoded prior to the current significant coefficient flag syntax element of the transform coefficients in the one-dimensional vector, the set having a size equal to a predetermined number;

determine a percentage of the set of significant coefficient flag syntax elements of the transform coefficients in the one-dimensional vector that the corresponding values indicate are significant;

select a context model for entropy encoding the value of the current significant coefficient flag based on the percentage of the set of significant coefficient flag syntax elements of the transform coefficients in the one-dimensional vector that are significant as indicated by the corresponding values; and entropy encode the value of the current significant coefficient flag syntax element using the determined context model.

7. The apparatus of claim 6, wherein to entropy encode the value of the current significant coefficient flag syntax element, the video encoder is configured to select the context model based on at least one of a prediction mode used to calculate residual data that was transformed into the two-dimensional block of transform coefficients or a type of transform used to transform the residual data into the two-dimensional block of transform coefficients in addition to the percentage of significant coefficients.

8. The apparatus of claim 7, wherein the prediction mode comprises an intra-prediction mode, and wherein the video encoder is configured to select the context model based on a direction for the intra-prediction mode.

9. The apparatus of claim 6, wherein the video encoder is configured to scan the two-dimensional block using an adaptive scan based on block type, spatial prediction direction, and transform, and wherein the video encoder is configured to encode values indicative of whether the transform coefficients are the last transform coefficient in the one-dimensional vector using a context model selected based on an order index in the adaptive scan.

10. The apparatus of claim 6, wherein the video encoder is configured to transform residual data using a first transform to produce an intermediate, two-dimensional block of transform coefficients, and to transform the intermediate, two-dimensional block of transform coefficients using a rotational transform to produce the two-dimensional block of transform coefficients.

11. The apparatus of claim 6, wherein the apparatus comprises at least one of:
an integrated circuit;
a microprocessor; or
a wireless communication device that includes the video encoder.

12. An apparatus for encoding video data, the apparatus comprising:
means for scanning a two-dimensional block of transform coefficients to produce a one-dimensional vector of the transform coefficients;
means for determining values for significant coefficient flag syntax elements of the two-dimensional block indicative of whether the transform coefficients in the one-dimensional vector are significant;
means for determining, for a current significant coefficient flag syntax element of the significant coefficient flag syntax elements of the transform coefficients in the one-dimensional vector, a set of the significant coefficient flag syntax elements of the transform coefficients in the one-dimensional vector that were encoded prior to the current significant coefficient flag syntax element of the transform coefficients in the one-dimensional vector, the set having a size equal to a predetermined number;

means for determining a percentage of the set of significant coefficient flag syntax elements of the transform coefficients in the one-dimensional vector that the corresponding values indicate are significant;

means for selecting a context model for entropy encoding the value of the current significant coefficient flag based on the percentage of the set of significant coefficient flag syntax elements of the transform coefficients in the one-dimensional vector that are significant as indicated by the corresponding values; and means for entropy encoding the value of the current significant coefficient flag syntax element using the determined context model.

13. A non-transitory computer-readable storage medium having stored thereon instructions that, when executed, cause a processor of a device for encoding video data to:
scan a two-dimensional block of transform coefficients to produce a one-dimensional vector of the transform coefficients;
determine values for significant coefficient flag syntax elements of the two-dimensional block indicative of whether the transform coefficients in the one-dimensional vector are significant;
for a current significant coefficient flag syntax element of the significant coefficient flag syntax elements of the transform coefficients in the one-dimensional vector:
determine a set of the significant coefficient flag syntax elements of the transform coefficients in the one-dimensional vector that were encoded prior to the current significant coefficient flag syntax element of the transform coefficients in the one-dimensional vector, the set having a size equal to a predetermined number;
determine a percentage of the set of significant coefficient flag syntax elements of the transform coefficients in the one-dimensional vector that the corresponding values indicate are significant;
select a context model for entropy encoding the value of the current significant coefficient flag based on the percentage of the set of significant coefficient flag syntax elements of the transform coefficients in the one-dimensional vector that are significant as indicated by the corresponding values; and
entropy encode the value of the current significant coefficient flag syntax element using the determined context model.

14. A method of decoding video data, the method comprising:
receiving values for significant coefficient flag syntax elements indicative of whether encoded transform coefficients in a received one-dimensional vector of encoded transform coefficients are significant;
for a current significant coefficient flag syntax element of the significant coefficient flag syntax elements of the transform coefficients in the one-dimensional vector:
determining a set of the significant coefficient flag syntax elements of the transform coefficients in the one-dimensional vector that were decoded prior to the current significant coefficient flag syntax element of the transform coefficients in the one-dimensional vector, the set having a size equal to a predetermined number;

determining a percentage of the set of significant coefficient flag syntax elements of the transform coefficients in the one-dimensional vector that the corresponding values indicate are significant;

selecting a context model for entropy decoding the value of the current significant coefficient flag based on the percentage of the set of significant coefficient flag syntax elements of the transform coefficients in the one-dimensional vector that are significant as indicated by the corresponding values;

entropy decoding the value of the current significant coefficient flag syntax element using the determined context model; and inverse scanning the one-dimensional vector to produce a two-dimensional block of the transform coefficients.

15. The method of claim 14, wherein entropy decoding the value of the current significant coefficient flag syntax element comprises selecting the context model based on at least one of a prediction mode used to calculate residual data that was transformed into the two-dimensional block of transform coefficients or a type of transform used to transform the residual data into the two-dimensional block of transform coefficients in addition to the percentage of significant coefficients.

16. The method of claim 15, wherein the prediction mode comprises an intra-prediction mode, and wherein selecting the context model further comprises selecting the context model based on a direction for the intra-prediction mode.

17. The method of claim 14, wherein inverse scanning comprises inverse scanning the one-dimensional vector using an adaptive scan based on block type, spatial prediction direction, and transform, the method further comprising decoding values indicative of whether the encoded transform coefficients are the last transform coefficient in the one-dimensional vector using a context model selected based on an order index in the adaptive scan.

18. The method of claim 14, further comprising:
inverse transforming the two-dimensional block of transform coefficients using an inverse rotational transform to produce an intermediate, two-dimensional block of transform coefficients; and
inverse transforming the intermediate, two-dimensional block of transform coefficients using a second transform to produce the two-dimensional block of transform coefficients.

19. An apparatus for decoding video data, the apparatus comprising:
a memory configured to store video data; and
a video decoder configured to:
receive values for significant coefficient flag syntax elements indicative of whether encoded transform coefficients in a received one-dimensional vector of encoded transform coefficients of the video data are significant;
for a current significant coefficient flag syntax element of the significant coefficient flag syntax elements of the transform coefficients in the one-dimensional vector:
determine a set of the significant coefficient flag syntax elements of the transform coefficients in the one-dimensional vector that were decoded prior to the current significant coefficient flag syntax element of the transform coefficients in the one-dimensional vector, the set having a size equal to a predetermined number,
determine a percentage of the set of significant coefficient flag syntax elements of the transform coefficients in the one-dimensional vector that the corresponding values indicate are significant,
select a context model for entropy decoding the value of the current significant coefficient flag based on the percentage of the set of significant coefficient flag syntax elements of the transform coefficients in the one-dimensional vector that are significant as indicated by the corresponding values,
entropy decode the value of the current significant coefficient flag syntax element using the determined context model, and
inverse scan the one-dimensional vector to produce two-dimensional block of the transform coefficients.

20. The apparatus of claim 19, the video decoder is configured to select the context model based on at least one of a prediction mode used to calculate residual data that was transformed into the two-dimensional block of transform coefficients or a type of transform used to transform the residual data into the two-dimensional block of transform coefficients in addition to the percentage of significant coefficients.

21. The apparatus of claim 20, wherein the prediction mode comprises an intra-prediction mode, and wherein the video decoder is further configured to select the context model based on a direction for the intra-prediction mode.

22. The apparatus of claim 19, wherein the video decoder is configured to inverse scan the one-dimensional vector using an adaptive scan based on block type, spatial prediction direction, and transform, and wherein the video decoder is configured to decode values indicative of whether the encoded transform coefficients are the last transform coefficient in the one-dimensional vector using a context model selected based on an order index in the adaptive scan.

23. The apparatus of claim 19, wherein the video decoder is configured to inverse transform the two-dimensional block of transform coefficients using an inverse rotational transform to produce an intermediate, two-dimensional block of transform coefficients, and inverse transform the intermediate, two-dimensional block of transform coefficients using a second transform to produce the two-dimensional block of transform coefficients.

24. The apparatus of claim 19, wherein the apparatus comprises at least one of:
an integrated circuit;
a microprocessor; or
a wireless communication device that includes the video decoder.

25. An apparatus for decoding video data, the apparatus comprising:
means for receiving values for significant coefficient flag syntax elements indicative of whether encoded transform coefficients in a received one-dimensional vector of encoded transform coefficients are significant;
means for determining, for a current significant coefficient flag syntax element of the significant coefficient flag syntax elements of the transform coefficients in the one-dimensional vector, a set of the significant coefficient flag syntax elements of the transform coefficients in the one-dimensional vector that were decoded prior to the current significant coefficient flag syntax element of the transform coefficients in the one-dimensional vector, the set having a size equal to a predetermined number;
means for determining a percentage of the set of significant coefficient flag syntax elements of the transform coefficients in the one-dimensional vector that the corresponding values indicate are significant;

means for selecting a context model for entropy decoding the value of the current significant coefficient flag based on the percentage of the set of significant coefficient flag syntax elements of the transform coefficients in the one-dimensional vector that are significant as indicated by the corresponding values;

means for entropy decoding the value of the current significant coefficient flag syntax element using the determined context model; and means for inverse scanning the one-dimensional vector to produce two-dimensional block of the transform coefficients.

26. A non-transitory computer-readable storage medium having stored thereon instructions that, when executed, cause a processor of a device for decoding video data to:

receive values indicative of whether encoded transform coefficients for significant coefficient flag syntax elements in a received one-dimensional vector of encoded transform coefficients are significant;

for a current significant coefficient flag syntax element of the significant coefficient flag syntax elements of the transform coefficients in the one-dimensional vector:

determine a set of the significant coefficient flag syntax elements of the transform coefficients in the one-dimensional vector that were decoded prior to the current significant coefficient flag syntax element of the transform coefficients in the one-dimensional vector, the set having a size equal to a predetermined number;

determine a percentage of the set of significant coefficient flag syntax elements of the transform coefficients in the one-dimensional vector that the corresponding values indicate are significant;

select a context model for entropy decoding the value of the current significant coefficient flag based on the percentage of the set of significant coefficient flag syntax elements of the transform coefficients in the one-dimensional vector that are significant as indicated by the corresponding values;

entropy decode the value of the current significant coefficient flag syntax element using the determined context model; and inverse scan the one-dimensional vector to produce two-dimensional block of the transform coefficients.

27. The method of claim 1, wherein the two-dimensional block of transform coefficients comprises a first two-dimensional block of transform coefficients, the method further comprising:

transforming residual data for a block of video data using a first transform to produce an intermediate, two-dimensional block of transform coefficients;

transforming the intermediate, two-dimensional block of transform coefficients using a rotational transform to produce a second two-dimensional block of transform coefficients;

selecting a set of statistics associated with at least one of the first transform and the rotational transform, wherein the set of statistics provides likelihoods that locations in the two-dimensional block of transform coefficients will be non-zero; and adaptively scanning the second two-dimensional block of transform coefficients based on the selected set of statistics.

* * * * *